(12) United States Patent
Davidson

(10) Patent No.: US 9,671,890 B2
(45) Date of Patent: *Jun. 6, 2017

(54) ORGANIZATIONAL TOOLS ON A MULTI-TOUCH DISPLAY DEVICE

(75) Inventor: Philip L. Davidson, New York, NY (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 1071 days.

This patent is subject to a terminal disclaimer.

(21) Appl. No.: 13/404,926

(22) Filed: Feb. 24, 2012

(65) Prior Publication Data

US 2013/0093695 A1    Apr. 18, 2013

Related U.S. Application Data

(63) Continuation of application No. 12/785,134, filed on May 21, 2010, now Pat. No. 8,473,862.

(60) Provisional application No. 61/180,408, filed on May 21, 2009.

(51) Int. Cl.
*G06F 3/041*      (2006.01)
*G06F 3/0481*     (2013.01)
*G06F 3/0488*     (2013.01)
*G06F 3/01*       (2006.01)

(52) U.S. Cl.
CPC .......... *G06F 3/0416* (2013.01); *G06F 3/0488* (2013.01); *G06F 3/04886* (2013.01); *G06F 3/017* (2013.01); *G06F 3/0481* (2013.01); *G06F 3/04883* (2013.01)

(58) Field of Classification Search
CPC .. G06F 3/0481; G06F 3/0488; G06F 3/04883; G06F 3/017
See application file for complete search history.

(56) References Cited

U.S. PATENT DOCUMENTS

| | | | |
|---|---|---|---|
| 5,835,094 A | 11/1998 | Ermel et al. | |
| 5,838,317 A | 11/1998 | Bolnick et al. | |
| 5,847,707 A | 12/1998 | Hayashida | |
| 5,861,886 A | 1/1999 | Moran et al. | |
| 6,040,840 A | 3/2000 | Koshiba et al. | |
| 6,088,032 A | 7/2000 | Mackinlay | |
| 7,752,572 B1 | 7/2010 | Shahrbabaki et al. | |
| 2002/0036618 A1 | 3/2002 | Wakai et al. | |

(Continued)

OTHER PUBLICATIONS

United States Patent and Trademark Office, Office Action Issued in U.S. Appl. No. 13/404,473, Feb. 5, 2015, 4 pages.

(Continued)

*Primary Examiner* — Tuyetlien T Tran
(74) *Attorney, Agent, or Firm* — Alleman Hall Creasman & Tuttle LLP

(57) ABSTRACT

A process for enabling objects displayed on a multi-input display device to be grouped together is disclosed that includes defining a target element that enables objects displayed on a multi-input display device to be grouped together through interaction with the target element. Operations are invoked that establish a relationship between a particular displayed object and a position on the target element and that causes transformations applied to the target element also to be applied to the particular displayed object while maintaining the relationship between the particular displayed object and the position on the target element.

10 Claims, 65 Drawing Sheets

(a)

(b)

(56) References Cited

U.S. PATENT DOCUMENTS

| | | |
|---|---|---|
| 2002/0080180 A1 | 6/2002 | Mander et al. |
| 2004/0066414 A1 | 4/2004 | Czerwinski et al. |
| 2004/0155909 A1 | 8/2004 | Wagner |
| 2005/0080769 A1* | 4/2005 | Gemmell .......... G06F 17/30991 |
| 2005/0108620 A1 | 5/2005 | Allyn et al. |
| 2005/0138572 A1 | 6/2005 | Good et al. |
| 2005/0234981 A1 | 10/2005 | Manousos et al. |
| 2005/0240880 A1 | 10/2005 | Banks et al. |
| 2006/0004692 A1 | 1/2006 | Kaasten et al. |
| 2007/0192727 A1 | 8/2007 | Finley et al. |
| 2007/0226652 A1 | 9/2007 | Kikuchi et al. |
| 2007/0288860 A1 | 12/2007 | Ording et al. |
| 2008/0115081 A1 | 5/2008 | Sankaravadivelu et al. |
| 2008/0126979 A1 | 5/2008 | Abe et al. |
| 2008/0178126 A1* | 7/2008 | Beeck ..................... G06F 3/017 715/863 |
| 2008/0229256 A1 | 9/2008 | Shibaike |
| 2008/0307335 A1 | 12/2008 | Chaudhri et al. |
| 2008/0307359 A1 | 12/2008 | Louch et al. |
| 2008/0309644 A1 | 12/2008 | Arimoto |
| 2009/0119590 A1 | 5/2009 | Kondziela et al. |
| 2009/0307623 A1 | 12/2009 | Agarawala et al. |
| 2010/0083111 A1* | 4/2010 | de los Reyes ........ G06F 3/0482 715/702 |
| 2010/0095248 A1 | 4/2010 | Karstens |
| 2010/0162151 A1 | 6/2010 | Class et al. |
| 2010/0185965 A1 | 7/2010 | Davidson et al. |
| 2010/0229129 A1 | 9/2010 | Price et al. |
| 2010/0289753 A1 | 11/2010 | Coddington et al. |
| 2013/0055127 A1 | 2/2013 | Saito et al. |
| 2013/0169687 A1 | 7/2013 | Williamson et al. |
| 2015/0205775 A1 | 7/2015 | Berdahl et al. |

OTHER PUBLICATIONS

United States Patent and Trademark Office, Office Action Issued in U.S. Appl. No. 13/404,718, Mar. 20, 2015, 19 pages.

Agarawala, A. et al., "Keepin' It Real: Pushing the Desktop Metaphor with Physics, Piles and the Pen," Proceedings of the Sigchi Conference on Human Factors in Computing Systems (CHI '06), Apr. 2006, 10 pages.

United States Patent and Trademark Office, Office Action Issued in U.S. Appl. No. 13/404,439, Nov. 18, 2014, 19 Pages.

United States Patent and Trademark Office, Final Office Action Issued in U.S. Appl. No. 13/404,899, Nov. 30, 2015, 14 Pages.

United States Patent and Trademark Office, Non-Final Office Action Issued in U.S. Appl. No. 13/953,680, Dec. 2, 2015, 13 Pages.

United States Patent and Trademark Office, Notice of Allowance Issued in U.S. Appl. No. 13/404,473, Aug. 21, 2015, 8 pages.

United States Patent and Trademark Office, Final Office Action Issued in U.S. Appl. No. 13/404,439, May 29, 2015, 20 pages.

United States Patent and Trademark Office, Final Office Action Issued in U.S. Appl. No. 13/404,718, Jul. 13, 2015, 20 pages.

United States Patent and Trademark Office, Non Final Office Action Issued in U.S Appl. No. 13/404,899, Jul. 16, 2015, 20 pages.

United States Patent and Trademark Office, Non-Final Office Action Issued in U.S. Appl. No. 13/404,439, May 13, 2016, 25 Pages.

United States Patent and Trademark Office, Non-Final Office Action Issued in U.S. Appl. No. 13/404,473, Jun. 3, 2016, 27 Pages.

United States Patent and Trademark Office, Final Office Action Issued in U.S. Appl. No. 13/953,680, Jun. 13, 2016, 13 Pages.

United States Patent and Trademark Office, Notice of Allowance issued in U.S. Appl. No. 13/404,718, Jun. 16, 2016, 3 pages.

United States Patent and Trademark Office, Non-final Office Action issued in U.S. Appl. No. 13/404,899, Jul. 28, 2016, 15 pages.

United States Patent and Trademark Office, Final Office Action Issued in U.S. Appl. No. 13/404,473, Sep. 29, 2016, 26 Pages.

United States Patent and Trademark Office, Final Office Action Issued in U.S. Appl. No. 13/404,439, Oct. 31, 2016, 34 Pages.

United States Patent and Trademark Office, Final Office Action Issued in U.S. Appl. No. 13/404,899, Dec. 12, 2016, 16 Pages.

\* cited by examiner

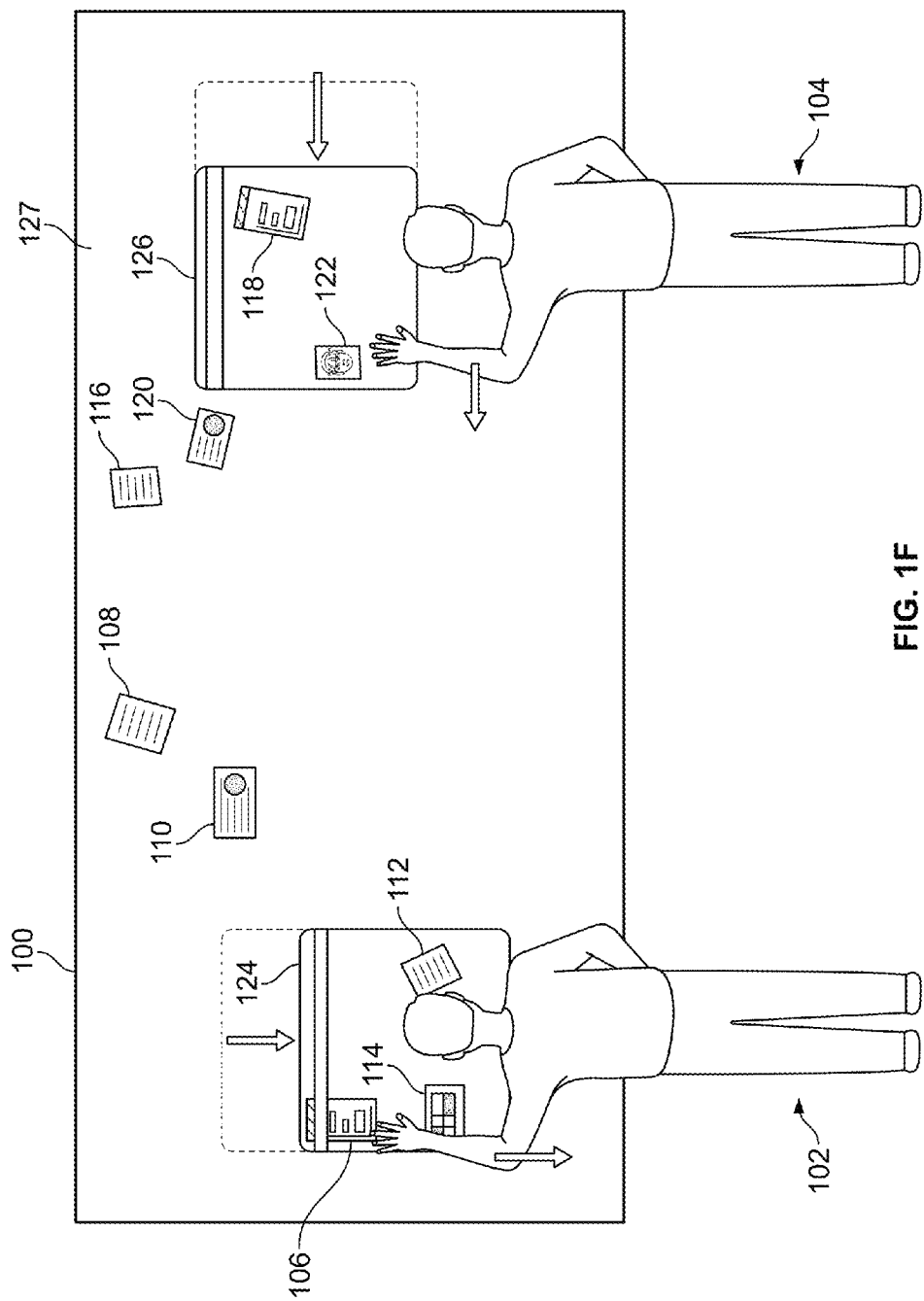

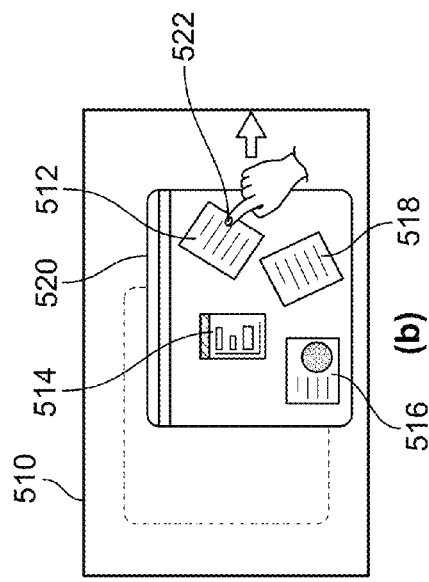
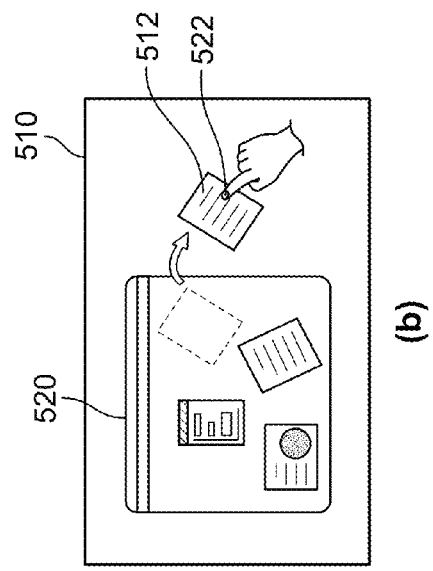
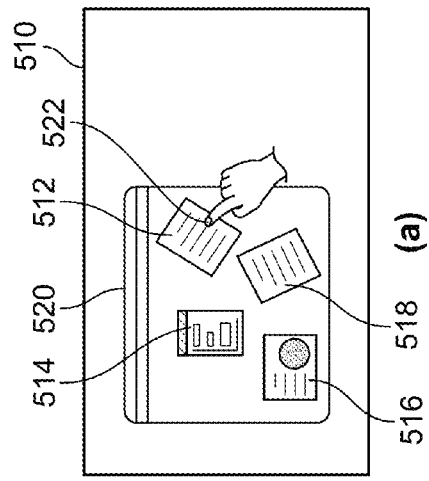
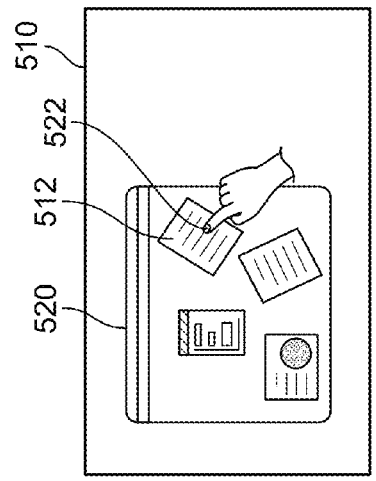
FIG. 5B
FIG. 5C

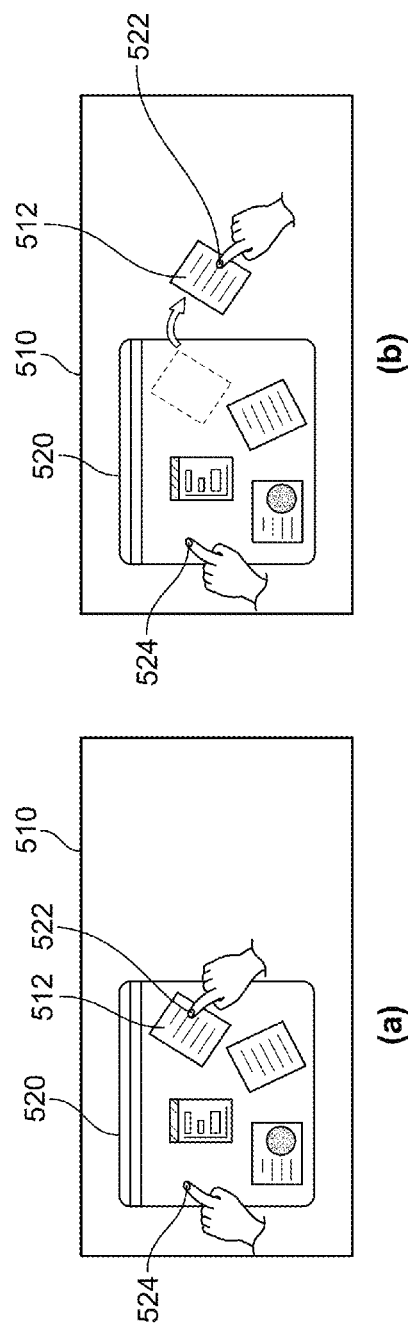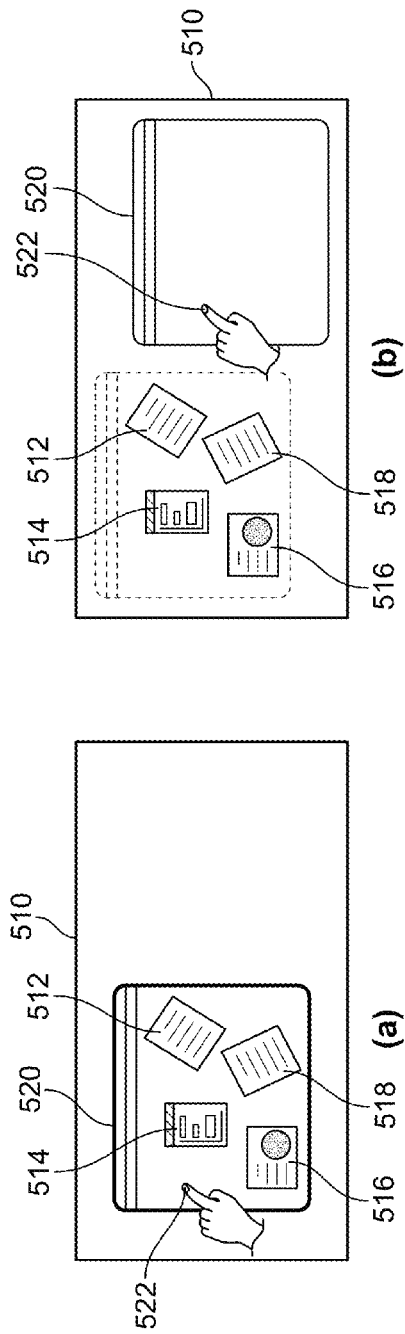
FIG. 5D
FIG. 5E

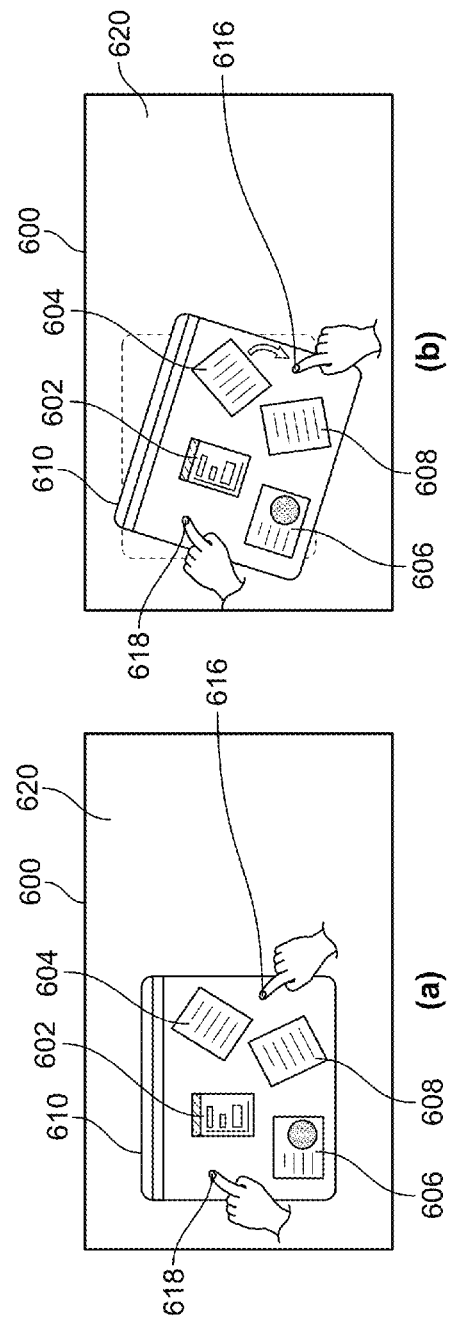
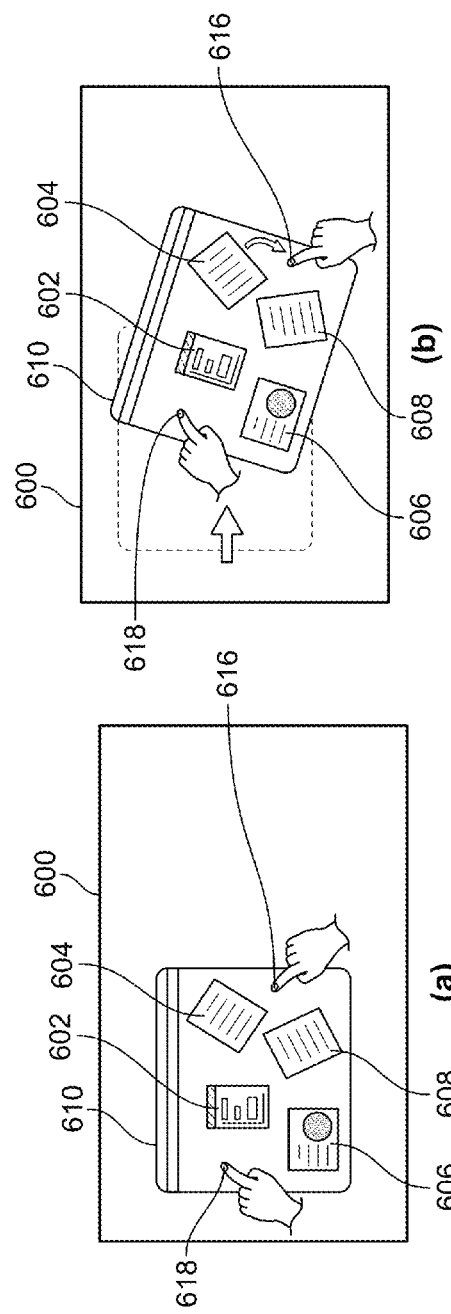
FIG. 6A
FIG. 6B (a)

(b)

(a)

(b)

(e)

(f)

(a)

(b)

(c)

(a)

(b)

(c)

(c)

(c)

(c)

(d)

(e)

(f)

ORGANIZATIONAL TOOLS ON A MULTI-TOUCH DISPLAY DEVICE

CROSS REFERENCE TO RELATED APPLICATION

This application claims the benefit of U.S. patent application Ser. No. 12/785,134, filed May 21, 2010, and titled "Organizational Tools on a Multi-touch Display Device," which claims priority to U.S. Provisional Application No. 61/180,408, filed May 21, 2009, and titled "Organizational Tools on a Multi-touch Display Device", the disclosures of which are considered part of (and are incorporated by reference in) the disclosure of this application.

TECHNICAL FIELD

This disclosure relates to organizational tools on a multi-touch display device.

BACKGROUND

Multi-touch display devices often adopt many of the characteristics of touch-screen display devices, and yet they are generally more sophisticated than traditional touch-screen display devices in that they are capable of detecting the presence and location of multiple touches on, within, or within the vicinity of the surface of the display area at the same time. Specifically, multi-point input computing systems receive, recognize, and act upon multiple inputs at the same time. Because multi-point input computing systems are capable of receiving, recognizing, and acting upon multiple inputs at the same time, multi-point input computing systems may enable multiple users to interact with individual systems at the same time, thereby providing for collaboration between the multiple users.

Like traditional touch-screen display devices, some multi-touch display devices require that a user physically touch the surface of the display area with one or more fingers, styluses, and/or other mechanisms in order to engage the surface of the multi-touch display device, while other multi-touch display devices are capable of receiving input by detecting that one or more fingers, styluses, and/or other input mechanisms have engaged the surface of the multi-touch display device by hovering around, or otherwise in the vicinity of, the surface of the display area without requiring that the input mechanism actually make physical contact with the surface of the touch-screen display device.

SUMMARY

In a general aspect, a method for previewing an entirety of an extent of a target element displayed on a multi-input display device when the extent of the target element extends beyond boundaries of a visual display of the target element on the multi-input display device in disclosed that includes defining a target element that enables objects displayed on a multi-input display device to be grouped together through interaction with the target element, the target element having a one-dimensional extent and defining a set of objects. The method also includes invoking processes that establish associations between constituent objects of the set and corresponding positions along the one dimensional extent of the target element that cause the associations between the constituent objects of the set and the corresponding positions along the target element to be maintained when transformations are applied to the target element such that transformations applied to the target element also are applied to the constituent objects of the set, the positions along the one-dimensional extent of the target element with which constituent objects of the set are associated defining spatial relationships between the constituent objects of the set. The method also includes defining an area of a display of the multi-input display device for displaying the target element. The method also includes displaying, within the defined area, a specific portion of the target element that includes less than all of the one-dimensional extent of the target element, a subset of less than all of the constituent objects of the set being associated with positions along the one-dimensional extent of the target element that fall within the specific portion of the target element. The method also includes, as a consequence of displaying the specific portion of the target element, displaying the subset of the objects associated with positions along the one-dimensional extent of the target element that fall within the specific portion of the target element in a manner that is consistent with the spatial relationships between the objects of the subset defined by the positions along the one-dimensional extent of the target element with which the individual objects of the subset are associated without displaying the constituent objects of the set not included within the subset of less than all of the constituent objects. The method also includes displaying a visual representation of the entire one-dimensional extent of the target element that depicts the spatial relationships between all of the constituent objects of the set of objects defined by the positions along the one-dimensional extent of the target element with which the constituent objects are associated and that identifies both the specific portion of the target element that is displayed as well as the subset of objects that are displayed as a consequence of displaying the specific portion of the target element.

In some implementations, displaying the visual representation of the entire one-dimensional extent of the target element may include displaying the visual representation of the entire one-dimensional extent of the target element in an area of the multi-input display device that is smaller than the defined area of the display device for displaying the target element.

In some implementations, the method may further include invoking processes that establish an association between the visual representation of the entire one-dimensional extent of the target element and the displayed portion of the target element that cause the association between the visual representation of the entire one-dimensional extent of the target element and the displayed portion of the target element to be maintained when the displayed portion of the target element is relocated to a different position on the multi-input display device such that the visual representation of the entire one-dimensional extent of the target element is relocated when the displayed portion of the target element is relocated. The method may further include detecting user interaction with the displayed portion of the target element. The method may further include, in response to detecting the user interaction with the displayed portion of the target element, relocating the displayed portion of the target element to a different position on the multi-input display device. The method may further include, as a consequence of relocating the displayed portion of the target element to the different position on the multi-input display device and the associations between constituent objects of the set of displayed objects and the corresponding positions along the one dimensional extent of the target element, relocating the constituent objects of the set of displayed objects to corresponding different positions on the multi-input display device such that the associations between the constituent objects of the set of displayed objects and the corresponding positions along the target element are maintained and the spatial relationships between the constituent objects of the set of displayed objects are maintained. The method may further include, as a consequence of relocating the displayed portion of the target element to the different position on the multi-input display device and relocating the constituent objects of the set of displayed objects and the association between the visual representation of the entire one-dimensional extent of the target element and the displayed portion of the target element, relocating the visual representation of the entire one-dimensional extent of the target element to a corresponding new position on the multi-input display device.

In some implementations, the method may further include invoking processes that establish an association between the visual representation of the entire one-dimensional extent of the target element and the displayed portion of the target element that cause the association between the visual representation of the entire one-dimensional extent of the target element and the displayed portion of the target element to be maintained when the displayed portion of the target element is rotated on the multi-input display device such that the visual representation of the entire one-dimensional extent of the target element is correspondingly rotated when the displayed portion of the target element is relocated. The method may further include detecting user interaction with the displayed portion of the target element. The method may further include, in response to detecting the user interaction with the displayed portion of the target element, rotating the displayed portion of the target element on the multi-input display device. The method may further include, as a consequence of rotating the displayed portion of the target element on the multi-input display device, correspondingly rotating the visual representation of the entire one-dimensional extent of the target element.

In some implementations, the method may further include detecting user interaction with the displayed portion of the target element. The method may further include, in response to the detected user interaction with the displayed portion of the target element, translating the target element and the constituent objects of the set of displayed objects within the defined area of the display of the multi-input display device such that a different portion of the target element and a different subset of objects associated with positions along the different portion of the target element are displayed within the defined area of the display of the multi-input display device. The method may further include, as a result of translating the target element and the constituent objects of the set of displayed objects, updating the display of the visual representation of the entire one-dimensional extent of the target element to identify both the different portion of the target element that is displayed as well as the different subset of objects that are displayed as a consequence of displaying the different portion of the target element.

In some implementations, the method may further include detecting user interaction with the displayed portion of the target element. The method may further include, in response to the detected user interaction with displayed portion of the target element, decreasing the scale of the displayed portion of the target element within the defined area of the display of the multi-input display device such that a larger portion of the target element and a different subset of objects associated with positions along the larger portion of the target element are displayed within the defined area of the display of the multi-input display device. The method may further include, as a result of decreasing the scale of the displayed portion of the target element within the defined area of the multi-input display device, updating the display of the visual representation of the entire one-dimensional extent of the target element to identify the larger portion of the target element and the different subset of objects associated with positions along the larger portion of the target element as presently being displayed.

In some implementations, the method may further include detecting user interaction with the displayed portion of the target element. The method may further include, in response to the detected user interaction with displayed portion of the target element, increasing the scale of the displayed portion of the target element within the defined area of the display of the multi-input display device such that a smaller portion of the target element and a different subset of objects associated with positions along the smaller portion of the target element are displayed within the defined area of the display of the multi-input display device. The method may further include, as a result of increasing the scale of the displayed portion of the target element within the defined area of the multi-input display device, updating the display of the visual representation of the entire one-dimensional extent of the target element to identify the smaller portion of the target element and the different subset of objects associated with positions along the larger portion of the target element as presently being displayed.

In some implementations, the method may further include detecting that an input mechanism has engaged a particular one of the objects of the subset of displayed objects associated with positions along the one-dimensional extent of the target element that fall within the specific portion of the target element. The method may further include, as a consequence of detecting that the input mechanism has engaged the particular displayed object, updating the visual representation of the entire one-dimensional extent of the target element to visually distinguish the visual representation of the particular object from the visual representations of the other constituent objects of the set to reflect that the particular object has been detected to be engaged by an input mechanism.

In some implementations, the method may further include defining a new displayed object on the multi-input display device. The method may further include detecting that an input mechanism has engaged the new displayed object. The method may further include, in response to detecting that the input mechanism has engaged the new displayed object, monitoring movement of the input mechanism while the input mechanism remains engaged with the new displayed object. The method may further include transforming the new displayed object as a function of the monitored movement of the input mechanism while the input mechanism remains engaged with the new displayed object. The method may further include, after transforming the new displayed object, detecting that the input mechanism has disengaged the new displayed object. The method may further include, in response to detecting that the input mechanism has disengaged the new displayed object and as a consequence of transforming the new displayed object, determining that at least a portion of the new displayed object is overlapping the displayed portion of the target element. The method may further include, as a consequence of determining that at least a portion of the new displayed object is overlapping the displayed portion of the target element, invoking a process that establishes a relationship between the new displayed object and a corresponding position on the target element that is overlapped by the new displayed object that causes the relationship between the new displayed object and the corresponding position on the target element to be maintained when transformations are applied to the target element such that transformations applied to the target element also are applied to the new displayed object. The method may further include as a consequence of invoking the process that establishes the relationship between the new displayed object and the corresponding position on the target element that is overlapped by the new displayed object, updating the visual representation of the entire one-dimensional extent of the target element to visually distinguish the visual representation of the new displayed object from the visual representations of the other constituent objects of the set to reflect that a relationship between the new displayed object and the target element has been newly established.

In some implementations, the method may further include detecting that an input mechanism has engaged a particular one of the constituent objects of the set of displayed objects. The method may further include, in response to detecting that the particular object has been engaged by the input mechanism, invoking a process to determine if future movements by the input mechanism while the input mechanism remains engaged with the particular object are to terminate the relationship between the particular object and the corresponding position on the target element. The method may further include, based on results of the process to determine if future movements by the input mechanism while the input mechanism remains engaged with the particular object are to terminate the relationship between the particular object and the corresponding position on the target element, determining that future movements by the input mechanism are to terminate the relationship between the particular object and the corresponding position on the target element. The method may further include, after determining that future movements by the input mechanism are to terminate the relationship between the particular object and the corresponding position on the target element, detecting movement of the input mechanism while the input mechanism remains engaged with the particular object. The method may further include, as a consequence of detecting movement of the input mechanism while the input mechanism remains engaged with the particular object, terminating the relationship between the target element and the particular object such that the relationship between the particular object and the corresponding position on the target element is no longer maintained when transformations are applied to the target element. The method may further include, as a consequence of terminating the relationship between the target element and the particular object, updating the visual representation of the entire one-dimensional extent of the target element to visually distinguish the visual representation of the particular object from the visual representations of the other constituent objects of the set of displayed objects to reflect that the relationship between the particular object and the target element has been newly terminated.

DESCRIPTION OF DRAWINGS

FIGS. 1A-1J are diagrams of a multi-touch display device configured to provide rectangular two-dimensional organizational tools to users of the multi-touch display device to enable the users to organize objects displayed by the multi-touch display device.

FIGS. 5B-5F illustrate five variations of the detachment process illustrated in FIG. 5A.

FIG. 6A is a diagram illustrating a multi-touch display device performing transformations to an organizational tool and its attached object when the attached objects are attached to the organizational tool at two or more points.

FIG. 6B is a diagram illustrating a multi-touch display device performing transformations to an organizational tool and its attached object when the attached objects are attached to the organizational tool at only one point.

DETAILED DESCRIPTION

A multi-touch display device provides one or more organizational tools that enable a user to organize objects displayed by the multi-touch display device. Such objects displayed by the multi-touch display device may include, for example, images, videos, and/or documents. The multi-touch display device may be configured to concurrently provide multiple organizational tools such that each of the multiple organization tools may be used concurrently by one or multiple users of the multi-touch display device. The concurrent provision of multiple organizational tools on the same multi-touch display device (or on multiple logically related multi-touch display devices) may facilitate collaboration between (or at least concurrent use by) multiple users by, for example, providing each of the multiple users with one or more personal organizational tools for organizing displayed objects with which the user is working.

FIGS. 1A-1J are illustrations of a multi-touch display device 100 configured to provide organizational tools to users 102 and 104 of the multi-touch display device 100 to enable the users to organize objects displayed by the multi-touch display device 100. Furthermore, FIGS. 1A-1J illustrate examples of different user interactions with the organizational tools provided by the multi-touch display device 100.

Figure 1A:
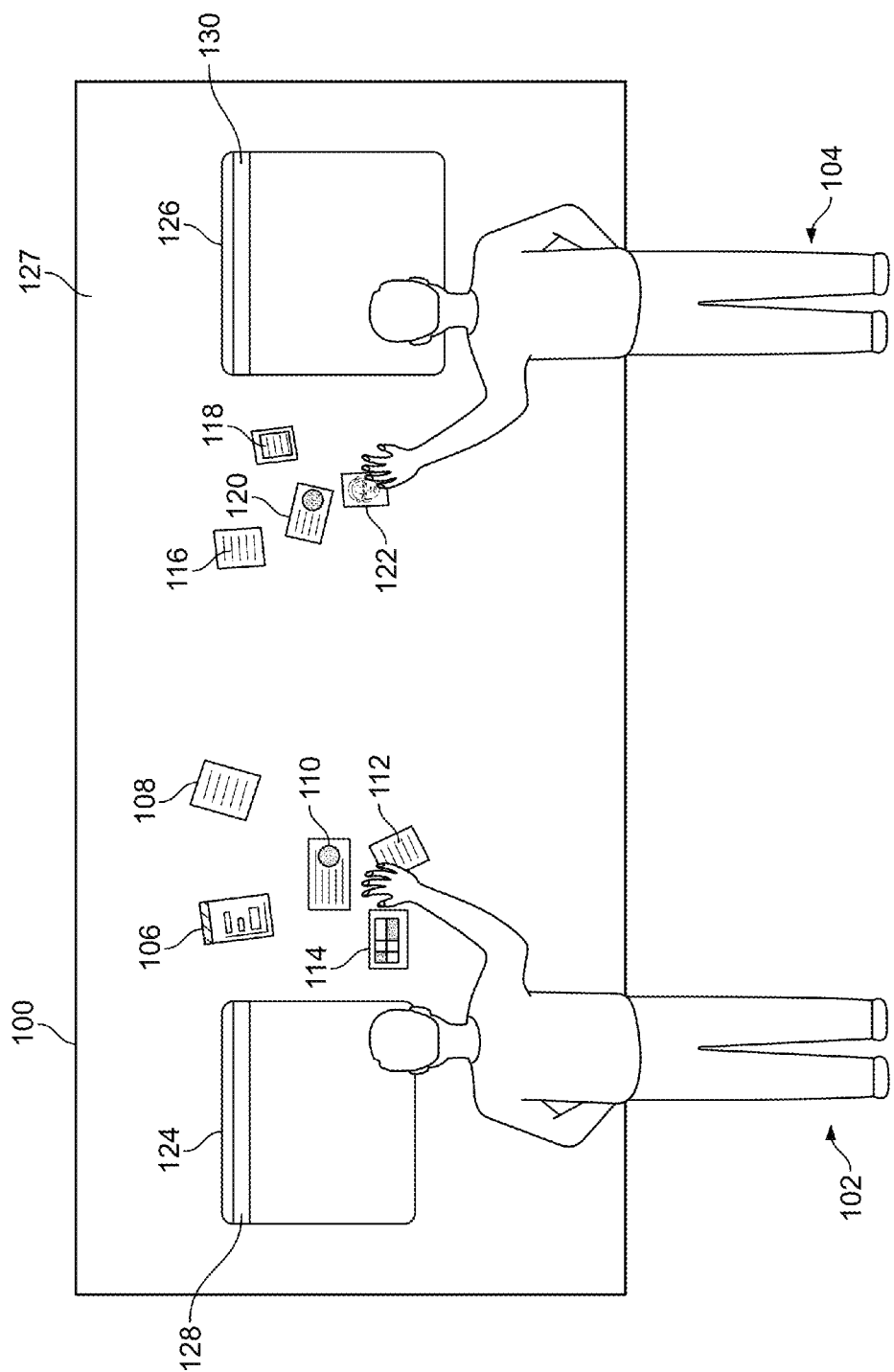

Referring to FIG. 1A users 102 and 104 are interacting with multi-touch display device 100, which is displaying objects 106, 108, 110, 112, 114, 116, 118, 120, and 122 and organizational tools 124 and 126 on a canvas 127. Each of users 102 and 104 may manipulate objects 106, 108, 110, 112, 114, 116, 118, 120, and 122, organizational tools 124 and 126, and canvas 127 by engaging the surface of the multi-touch display device 100 with, for example, his/her fingers. Among other manipulations, users 102 and 104 may move, resize, annotate, or edit objects 106, 108, 110, 112, 114, 116, 118, 120, and 122, organizational tools 124 and 126, or canvas 127.

Figure 1B:
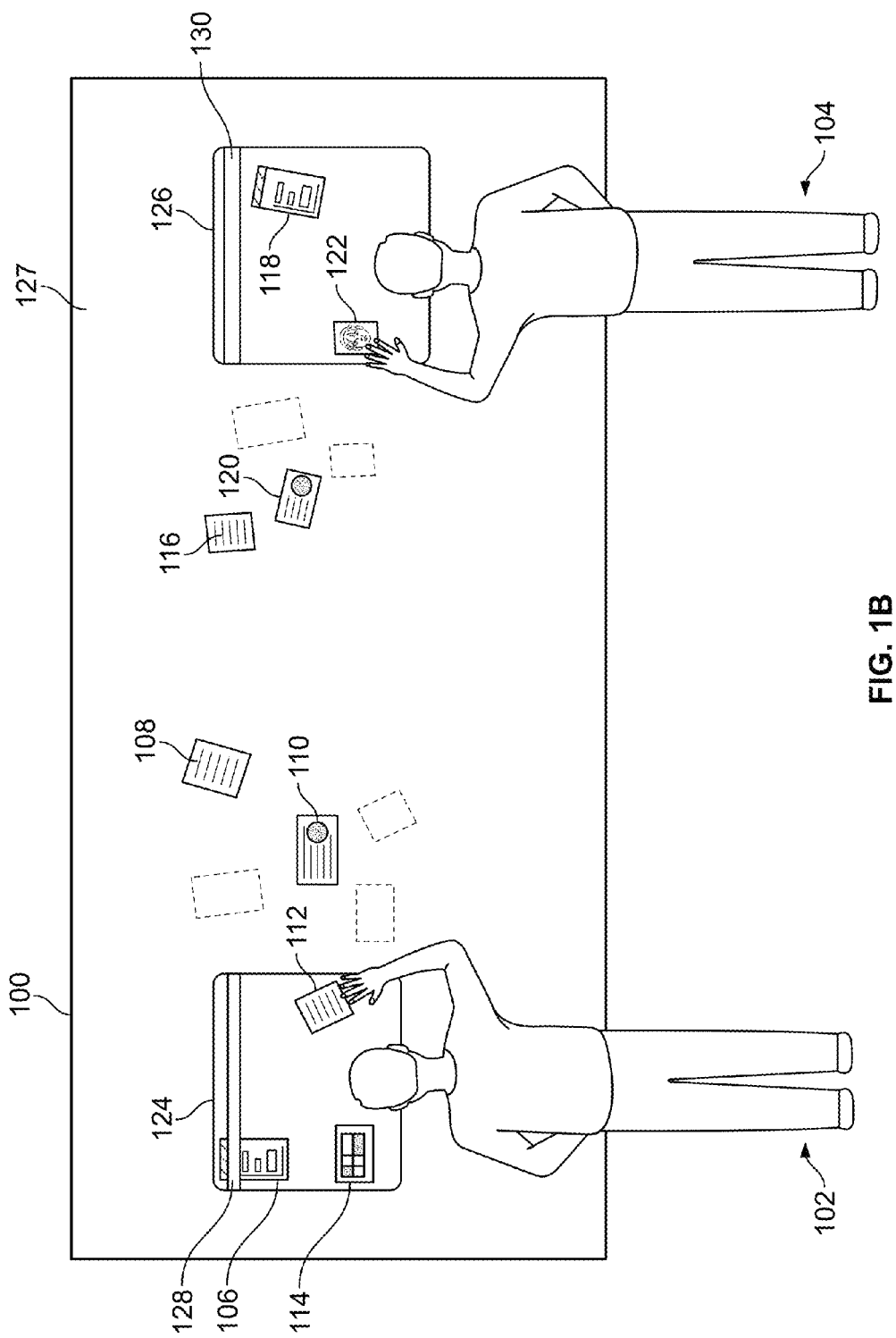

Organizational tools 124 and 126 provide a personalized virtual palette upon which users may attach and organize objects in a manner that enables manipulations similar to functionality provided by a corkboard. However, organizational tools 124 and 126 provide several additional features. For example, each organizational tool 124 and 126 includes a control strip 128 and 130, respectively. In one implementation, objects attached to the organization tool will be displayed as though they are positioned behind the control strip, or at a visual level further from the surface of multi-touch display device 100 than the control strip 128. Thus, object 106, which is attached to organizational tool 124 in FIG. 1B, is shown behind control strip 128 in that figure. As a result, the control strip is displayed no matter how many objects are attached to the organizational tool or how cluttered the organizational tool becomes. In this way, a user will be able to interact with and manipulate the organizational tool despite the current number and position of attached objects. By engaging the control strip of the organizational tool, a user may manipulate the organizational tool by, for example, moving, rotating, or resizing the organizational tool through interaction with its control strip.

As discussed above, displayed objects may be attached by users to the organizational tools 124 and 126 provided by the multi-touch display device 100, for example, to facilitate organization of the canvas 127 and/or to store such attached objects for later access. For example, referring again to FIG. 1B, the multi-touch display device 100 shows objects 106 and 114 attached to organizational tool 124 in response to input received from user 102 by the multi-touch display device 100. Similarly, the multi-touch display device 100 shows object 118 attached to organizational tool 126 in response to input received from user 104 by the multi-touch display device 100.

Figure 1C:
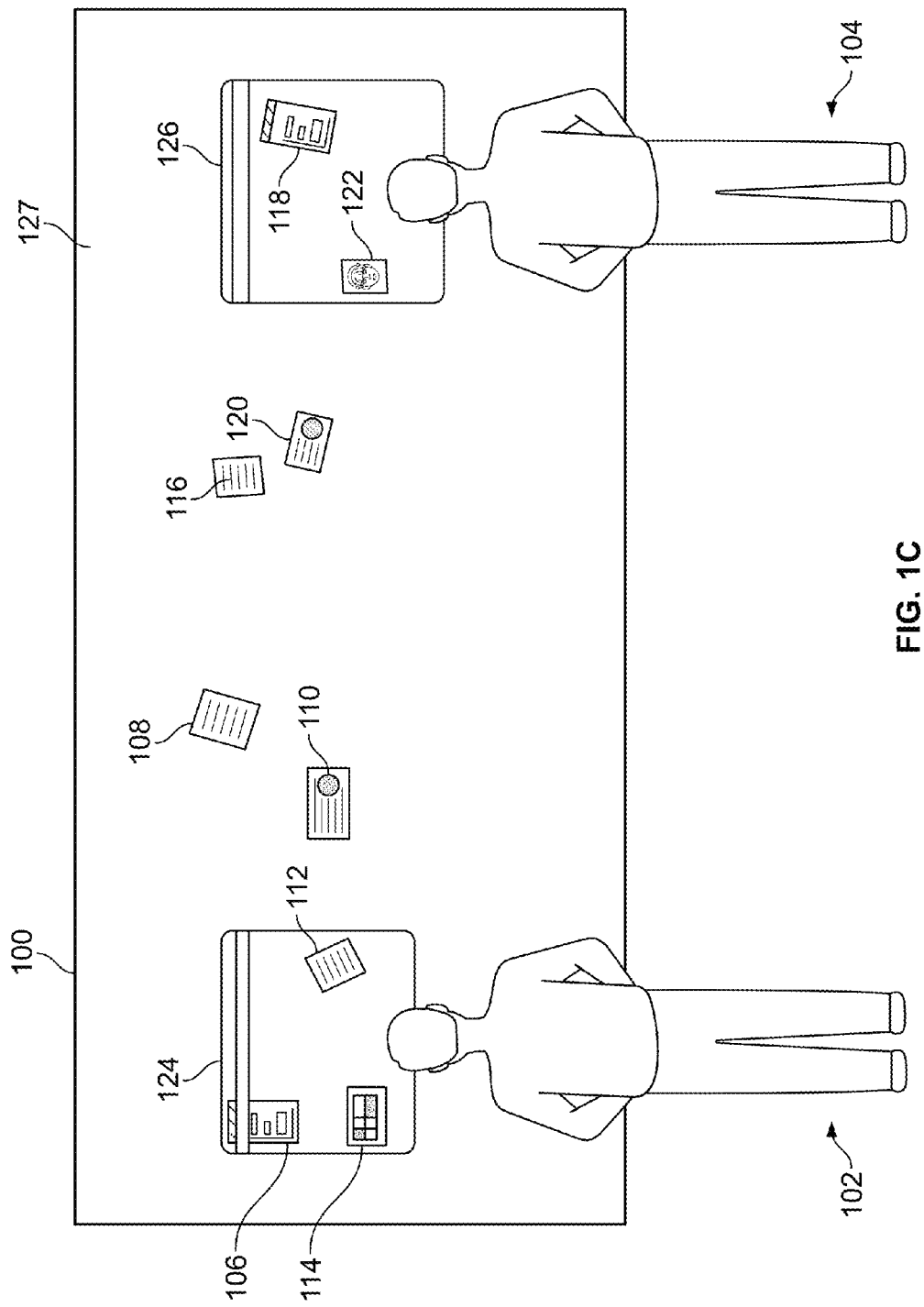

In some implementations, attaching displayed objects to organizational tools involves moving the displayed objects into the vicinity of the organizational tools. For example, FIG. 1B shows user 102 engaging the multi-touch display device 100 and moving object 112 over organizational tool 124 in order to attach object 112 to organizational tool 124 while user 104 is engaging the multi-touch display device 100, and it shows user 104 engaging the multi-touch display device 100 and moving object 122 over organizational tool 126 to attach object 122 to organizational tool 126. Similarly, as shown in FIG. 1C, in response to users 102 and 104 moving objects 112 and 122 over organizational tools 124 and 126, respectively, multi-touch display device 100 shows objects 112 and 122 attached to organizational tools 124 and 126, respectively. Various techniques for attaching objects to organizational tools, such as organizational tools 124 and 126, are described in greater detail below.

In some implementations, canvas 127 may be infinite or at least have an extent that is larger than the visual display of the multi-touch display device 100. As such, the multi-touch display device 100 may provide controls to users of the multi-touch display device 100 that enable the users to instruct the multi-touch display device 100 to translate and/or scale the canvas 127 to modify the region of the canvas 127 that is visually displayed by the multi-touch display device 100. In such implementations, organizational tools provided by the multi-touch display device 100 and their attached objects may be immune to (e.g., unaffected by) certain transformations applied to the canvas 127. Consequently, such organizational tools may serve as convenient mechanisms for storing objects at a desired position on the multi-touch display device 100 when transformations are applied to the canvas 127.

Figure 1D:
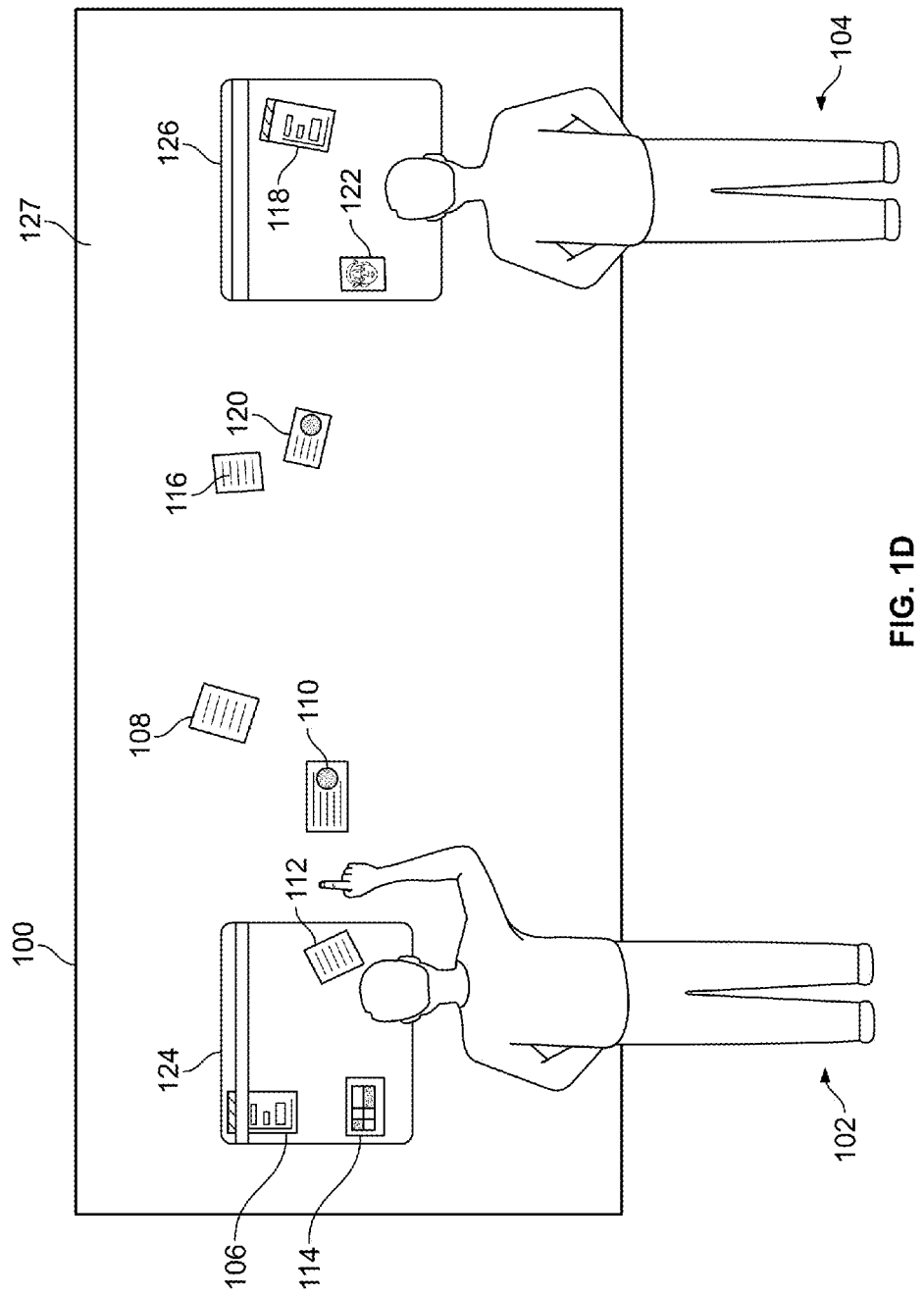
Figure 1E:
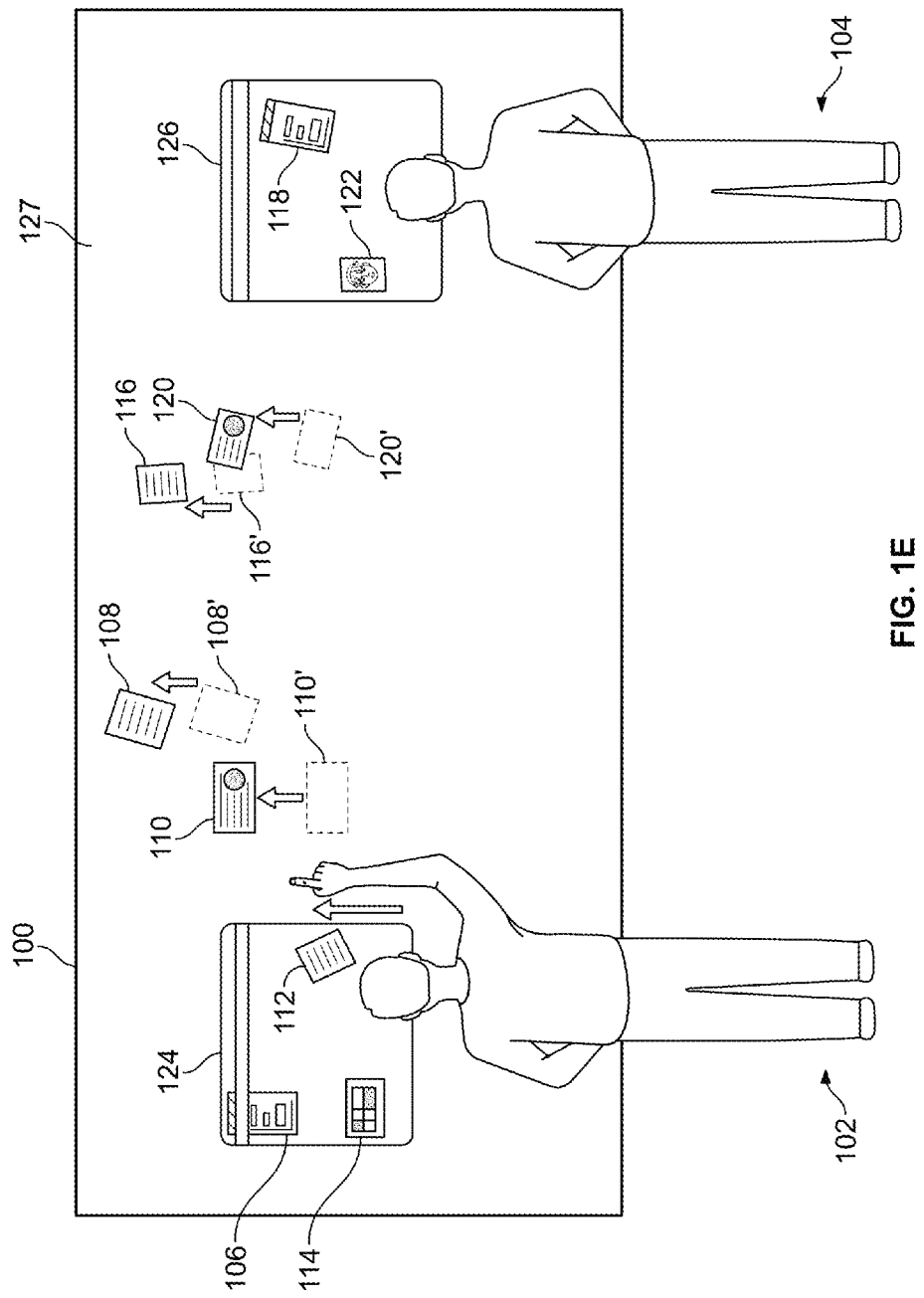

FIGS. 1D-1E illustrate the use of organizational tools 124 and 126 as mechanisms for maintaining displayed objects at desired positions while manipulations are performed on canvas 127. In them, objects 108, 110, 116, and 120 are not attached to either of the organizational tools 124 and 126. Consequently, the multi-touch display device 100 treats objects 108, 110, 116, and 120 as if they are attached to canvas 127. As such, when the multi-touch display device 100 performs transformations on canvas 127, the multi-touch display device 100 also may perform the same (or similar) transformations on objects 108, 110, 116, and 120 so as to maintain the spatial relationships between objects 108, 110, 116, and 120 and canvas 127 as the canvas 127 is manipulated.

In FIG. 1D, user 102 is engaging the surface of the multi-touch display device 100 at a point on the canvas 127 (i.e., a point on the multi-touch display device 100 where the multi-touch display device 100 is not displaying an object or organizational tool.) As a result, the multi-touch display device 100 detects that user 102 is touching the multi-touch display device 100, interprets this touch as an input corresponding to canvas 127 at the contact point, and associates the input with canvas 127. While continuing to engage the surface of the multi-touch display device 100 with his finger, user 102 may drag his finger across the surface of the device to cause the multi-touch display device 100 to translate the canvas 127.

As illustrated in FIG. 1E, user 102 is dragging his finger in a vertical direction along the surface toward the top of multi-touch display device 100. Having already associated the input with canvas 127, the multi-touch display device 100 detects the vertical movement of the user's finger, from a first point as shown in FIG. 1D to a second point as shown in FIG. 1E, interprets this input as a request by user 102 to translate canvas 127 by a distance corresponding to the distance from the first point to the second point, and visually translates canvas 127 and objects 108, 110, 116, and 120 by the detected distance or some function of the distance. Notably, the multi-touch display device 100 translates objects 108, 110, 116, and 120 in a manner that is visually consistent with the translation of canvas 127. Thus, objects 108, 110, 116, and 120 are moved in a vertical direction (indicated by the illustrated arrows) from original positions 108', 110', 116', and 120'.

In this example, organizational tools 124 and 126 are not associated with canvas 127, and, therefore, the multi-touch display device 100 holds organizational tools 124 and 126 stationary while translating canvas 127 and objects 108, 110, 116, and 120. Preserving the positions of organizational tools 124 and 126 while translating the canvas 127 allows the users 102 and 104 to access various areas of the canvas 127 while providing the users 102 and 104 with convenient access to the objects they have attached to the organizational tools 124 and 126.

In some alternative implementations, the multi-touch display device 100 may associate organizational tools 124 and 126 with canvas 127 in a manner similar to objects 108, 110, 116, and 120 such that, when transformations are applied to the canvas, the multi-touch display device 100 also applies the same (or similar) translations to the organizational tools 124 and 126 and the objects attached to them. For example, when multi-touch display device 100 translates canvas 127, multi-touch display device 100 may translate organizational tools 124 and 126, which are associated with canvas 127, by a predetermined factor of the translation applied to canvas 127. In other words, multi-touch display device 100 may translate organizational tools 124 and 126 by half of the translation applied to canvas 127. Thus, a user may drag his finger from one side of the screen to the other, and multi-touch display device 100 will translate objects 108, 110, 116, and 120 the distance the user dragged his finger, but will translate organizational tools 124 and 126 only half that distance.

The multi-touch display device 100 may provide controls for performing transformations (e.g., rotate, scale, translate) on organizational tools 124 and 126. FIGS. 1F-1K illustrate transformations being applied to organizational tools 124 and 126.

In FIG. 1F, user 102 has engaged the surface of multi-touch display device 100 at a point corresponding to organizational tool 124 and is dragging his finger along the multi-touch display device 100 in a downward direction. Multi-touch display device 100 detects this input by user 102, associates the input with organizational tool 124, interprets the input as a request to translate organizational tool 124, and translates organizational tool 124 as a function of the movement of the user's finger. Because objects 106, 112, and 114 are attached to organizational tool 124, multi-touch display device 100 translates objects 106, 112, and 114 along with organizational tool 124.

As also illustrated in FIG. 1F, user 104 has engaged the surface of multi-touch display device 100 at a point corresponding to organizational tool 126 and is dragging his finger across the multi-touch display device 100 in a leftward direction. Multi-touch display device 100 detects the input of user 104, associates the input with organizational tool 126, interprets the input as a request to move organizational tool 126, and translates organizational tool 126 as a function of the movement of the user's finger. Again, since objects 118 and 122 are attached to organizational tool 126, multi-touch display device 100 translates objects 118 and 122 along with organizational tool 126. As a consequence, user 104 may interact with multi-touch display device 100 to reposition organizational tool 126 near the particular section of canvas 127 that he is working with at any given time.

Notably, objects 108, 110, 116, and 118, which are not associated with either organizational tool 124 or organizational tool 126 remain unaffected by the manipulations illustrated in FIG. 1F.

By enabling user to translate organizational tools 124 and 126, the multi-touch display device provides a user with the ability to keep important objects in continued close proximity to the user, even as the user moves about with relation to the multi-touch display device.

Figure 1G:
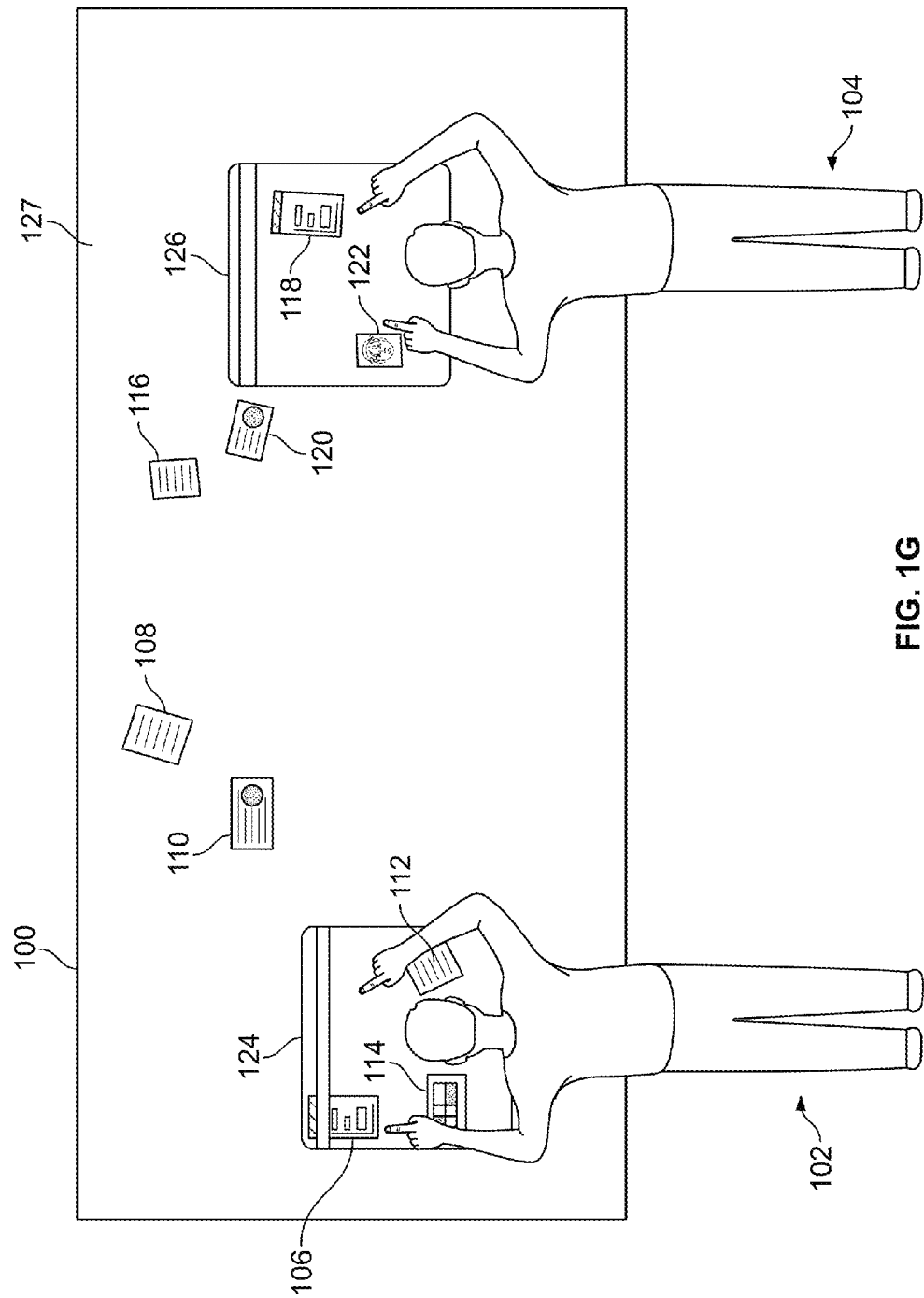
Figure 1H:
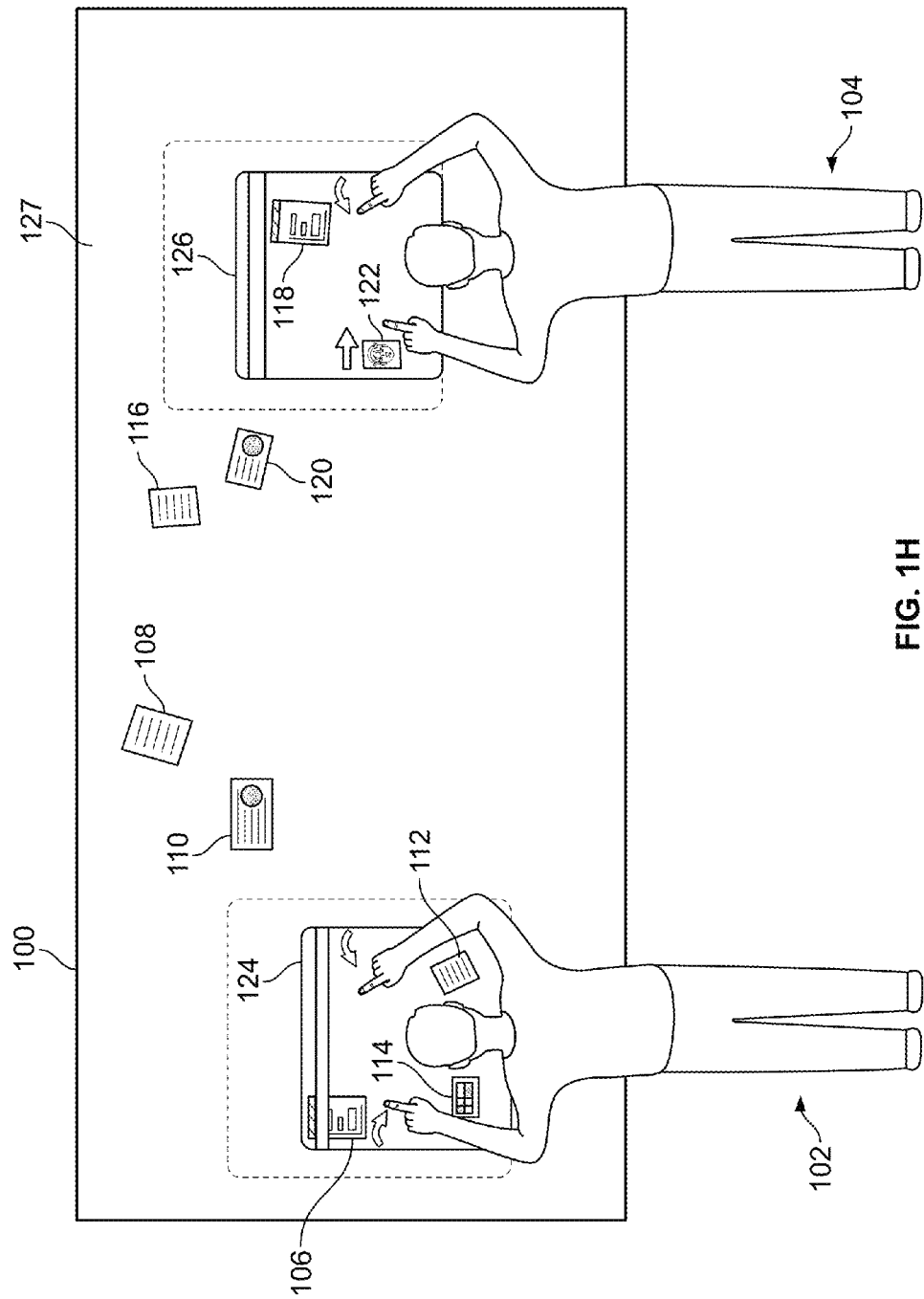

As illustrated in FIGS. 1G-1H, the multi-touch display device 100 may provide controls for scaling organizational tools 124 and 126. User 102 is engaging the surface of multi-touch display device 100 with two fingers at distinct points along the surface of the multi-touch display device 100, each such point corresponding to a point on the surface of organizational tool 124. The multi-touch display device 100 detects these two concurrent inputs by user 102 and associates them with organizational tool 124. Likewise, user 104 is engaging the surface of multi-touch display device 100 with two fingers at distinct points along the surface of the multi-touch display device 100, each such point corresponding with a point on the surface of organizational tool 126. The multi-touch display device 100 detects these two concurrent inputs by user 104 and associates them with organizational tool 126.

As illustrated in FIG. 1H, as user 102 drags his fingers toward each other, multi-touch display device 100 detects the movements of the user's fingers and interprets it as a request to scale organizational tool 124. As a result, multi-touch display device 100 scales the size of organizational tool 124 as a function of the detected movement. The closer user 102 drags his fingers together, the smaller multi-touch display device 100 displays organizational tool 124. Because objects 106, 112, and 114 are attached to organizational tool 124, multi-touch display device 100 also scales objects 106, 112, and 114 while scaling organizational tool 124. Therefore, as multi-touch display device 100 decreases the size of organizational tool 124, it also decreases the size of objects 106, 112, and 114 proportionally while maintaining the spatial relationship between objects 106, 112, and 114 on organizational tool 124.

The multi-touch display device 100 performs a similar process as user 104 drags his fingers toward each other along the surface of multi-touch display device 100. Multi-touch display device 100 detects the input of user 104, interprets it as a request to scale organizational tool 126, and decreases the visual size of organizational tool 126 as a function of the detected movement of the user's fingers. Because objects 118 and 122 are attached to organizational tool 126, when the multi-touch display device 100 scales organizational tool 126, the multi-touch display device 100 also decreases the size of objects 118 and 122 proportionally, while maintaining the spatial relationships between objects 118 and 122 on organizational tool 126.

Scaling organizational tools 124 and 126 may be useful for a number of reasons. For example, user 102 may prefer to focus on only a few objects at a time. After attaching the objects that user 102 is not currently working with to organizational tool 124, multi-touch display device 100 may minimize organizational tool 124 and provide user 102 with a cleaner and less distracting workspace. Accordingly, multi-touch display device 100 may provide a mechanism for minimizing the display of a vast number of objects while keeping them easily accessible to the user. As soon as the user wants to access one of the attached objects, multi-touch display device 100 may enable the organizational tool to be increased in size in a comparable manner to the method described above for reducing the size of organizational tool 124 and 126.

In alternative implementations, the multi-touch display device 100 may scale the objects attached to organizational tools 124 and 126 without altering the size of organizational tools 124 and 126 themselves. Thus, in FIG. 1H, as user 102 drags his fingers toward each other along the surface of multi-touch display device 100, multi-touch display device 100 may decrease the visual size of objects 106, 112, and 114 without changing the size of organizational tool 124. Such a scaling mechanism may serve as a convenient way to create more free space on an organizational tool without scaling the organizational tool itself.

Figure 1I:
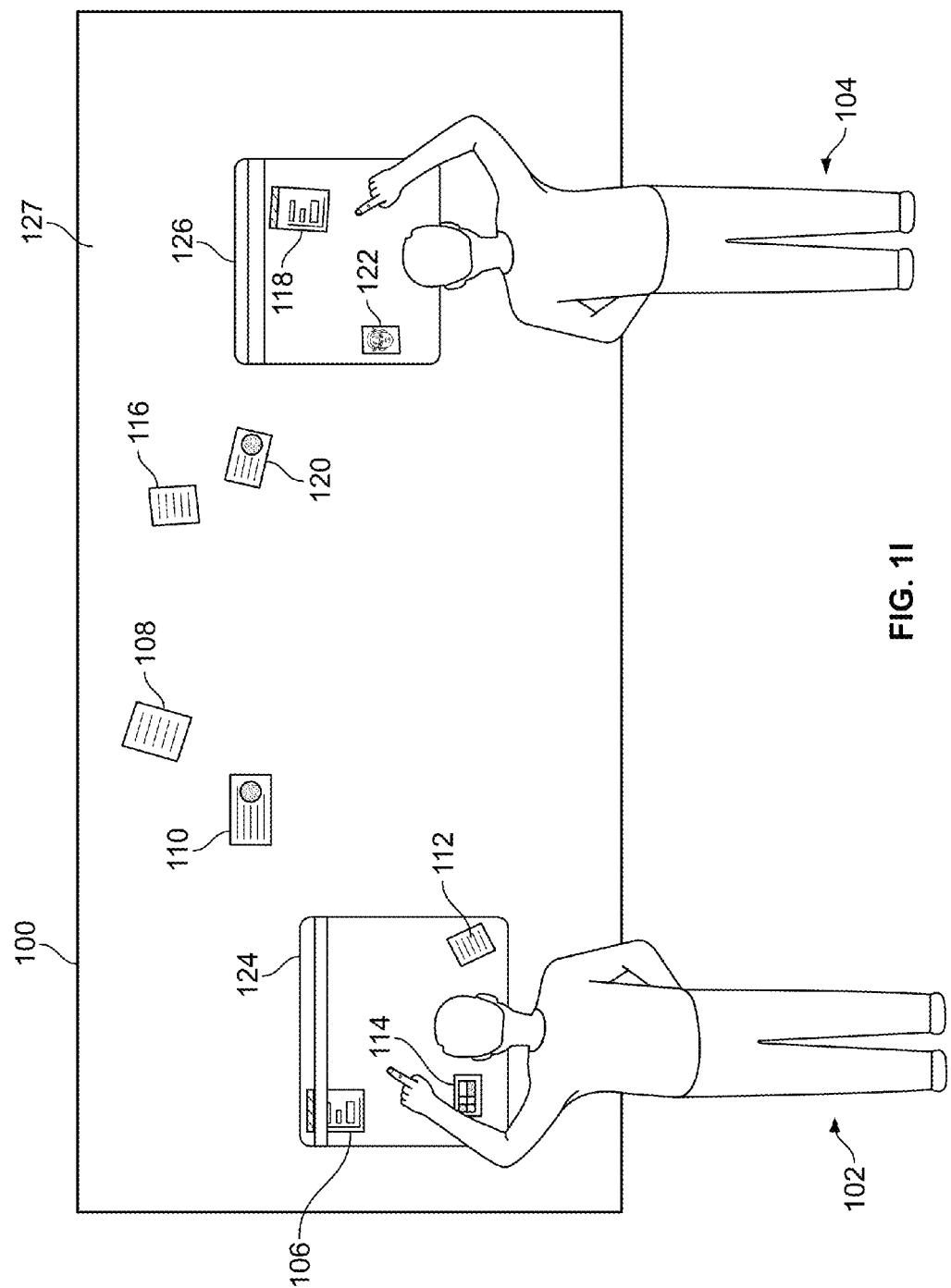
Figure 1J:
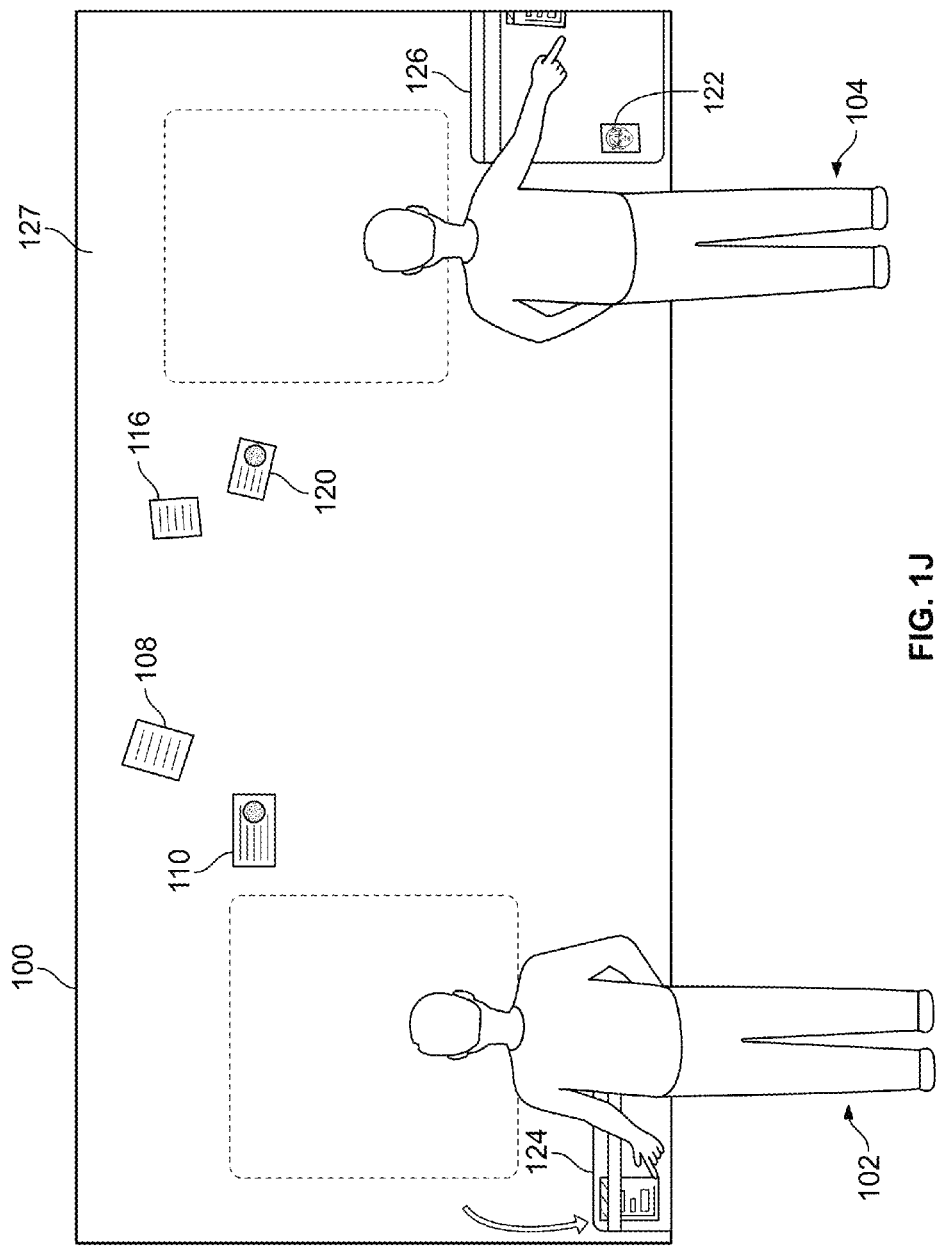

While reducing the size of organizational tools 124 and 126 is one approach for minimizing the interference with the users' workspace caused by organizational tools 124 and 126, one additional or alternative approach is to translate organizational tools 124 and 126 to regions of the canvas 127 where they are not interfering with the work of users 102 and 104. For example, the multi-touch display device 100 may enable organizational tools 124 and 126 to be translated to positions on the canvas 127 that are partially or completely outside of the visual display of the multi-touch display device 100. FIGS. 1I and 1J are illustrative.

In FIG. 1I, user 102 is engaging the surface of multi-touch display device 100 at a point where organizational tool 124 is displayed. Multi-touch display device 100 detects this input by user 102 and associates the input with organizational tool 124. Similarly, user 104 is engaging the surface of multi-touch display device 100 at a point where organizational tool 126 is displayed. Consequently, multi-touch display device 100 detects the input by user 104 and associates the input with organizational tool 126.

As illustrated in FIG. 1J, multi-touch display device 100 detects that user 102 is dragging his finger along the multi-touch display device 100 in a downward direction, from a first point as shown in FIG. 1I to a second point as shown in FIG. 1J, multi-touch display device 100 interprets the detected movement as a request to translate organizational tool 124 by a distance corresponding to the distance from the first point to the second point, and, consequently, translates organizational tool 124 the detected distance or a function of the detected distance such that a portion of the organizational tool 124 is translated to a region of the canvas 127 outside of the visual display of the multi-touch display device 100. As a result, while organizational tool 124 continues to exist in its entirety, only a portion of organizational tool 124 remains visually displayed by the multi-touch display device 100. Because objects 106, 112, and 114 are attached to organizational tool 124, multi-touch display device translates objects 106, 112, and 114 along with organizational tool 124.

The multi-touch display device 100 performs a similar process in response to user 104 dragging his finger in a rightward direction along the surface of multi-touch display device 100. Multi-touch display device 100 detects the input of user 104, from a first point as shown in FIG. 1I to a second point as shown in FIG. 1J, interprets it as a request to translate organizational tool 126 by a distance corresponding to the distance from the first point to the second point, and translates organizational tool 124 the detected distance or a function of the detected distance toward the right edge of the surface. Ultimately, the multi-touch display device translates a portion of organizational tool 126 to a region of the canvas 127 that is outside of the visual display of the multi-touch display device 100. Because objects 118 and 122 are attached to organizational tool 126, as the multi-touch display device 100 translates organizational tool 126, the multi-touch display device also translates objects 118 and 122 along with organizational tool 126.

By enabling organizational tools 124 and 126 to be translated to positions on the canvas 127 that are partially or completely outside of the visual display of the multi-touch display device 100, the multi-touch display device 100 may provide a less cluttered workspace for users 102 and 104. In so doing, multi-touch display device 100 may more prominently display those objects most pertinent to users 102 and 104, while maintaining easy access to those objects attached to organizational tools 124 and 126.

A variety of different organizational tools may be provided by a multi-touch display device. For example, as discussed above in connection with FIGS. 1A-1J, a multi-touch display device may provide a rectangular two-dimensional organizational tool that enables manipulations similar to functionality provided by a cork bulletin board. Additionally or alternatively, a multi-touch display device may provide a one-dimensional, linear organizational tool that enables manipulations similar to functionality provided by a clothesline or a short-order cook ticket line, and/or a multi-touch display device may provide a two-dimensional rotary organizational tool that enables manipulations similar to functionality provided by a Lazy Susan.

Figure 2:
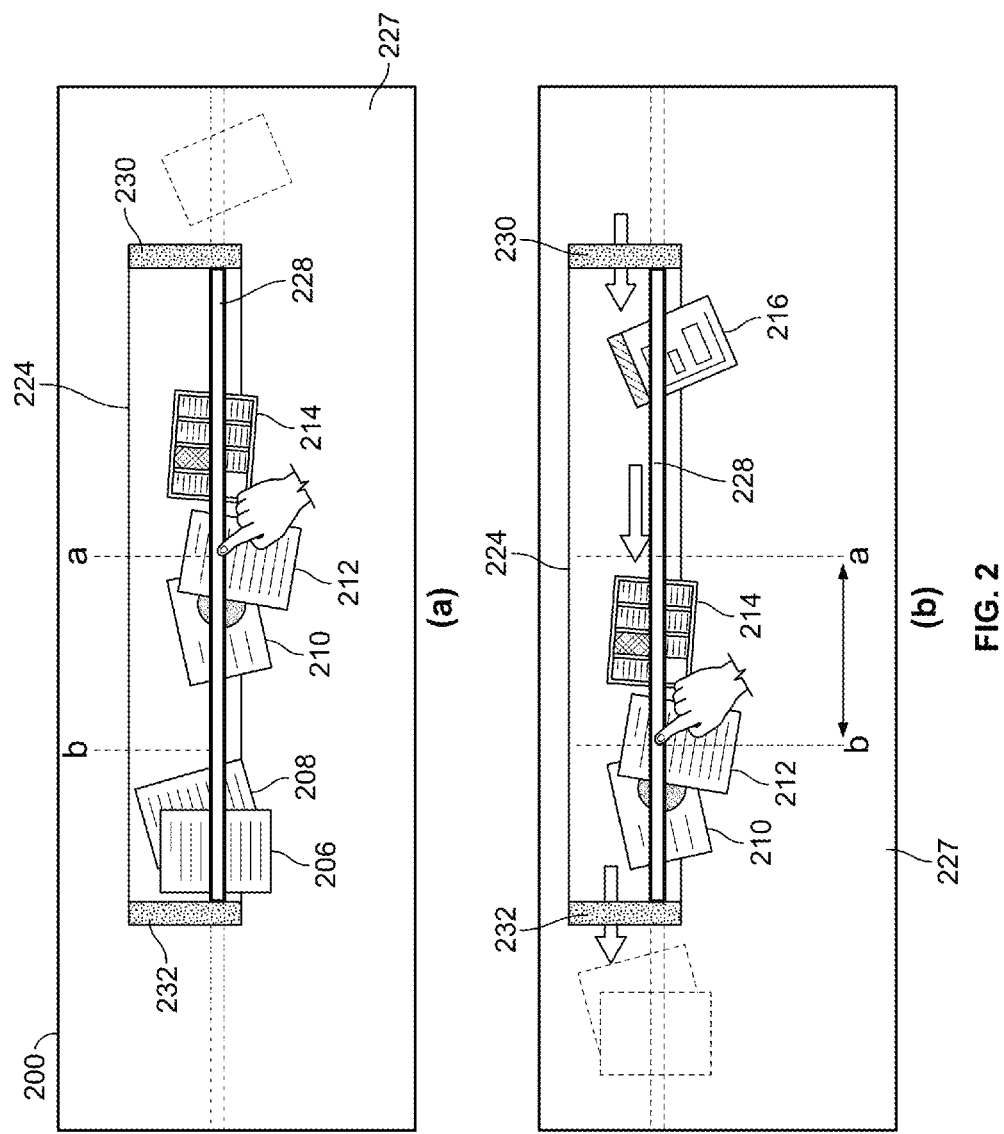
FIG. 2 is a diagram of a multi-touch display device configured to provide one-dimensional linear organizational tools to users of the multi-touch display device to enable the users to organize objects displayed by the multi-touch display device.

FIGS. 2(a) and 2(b) are illustrations of a multi-touch display device 200 providing a one-dimensional organizational tool that enables manipulations similar to functionality provided by a clothes line or a short-order cook ticket line. As illustrated in FIGS. 2(a) and 2(b), organizational tool 224 includes an attachment strip 228 and boundary handles 230 and 232. As will be described in greater detail below, the attachment strip 228 provides a mechanism for attaching objects to organizational tool 224. For example, as illustrated in FIGS. 2(a) and 2(b), objects 206, 208, 210, 212, 214, and 216 are attached to organizational tool 224 via attachment strip 228.

In some implementations, the extent of organizational tool 224 may be greater than the visual display of organizational tool 224. For example, boundary handles 230 and 232 define the boundaries of the visual display of organizational tool 224, but, as illustrated by the dashed lines in FIGS. 2(a) and 2(b), the extent of organizational tool 224 extends beyond boundary handles 230 and 232 even though the visual display of organizational tool 224 is confined to the region between boundary handles 230 and 232.

For example, referring to FIG. 2(a), object 216 is attached to organizational tool 224 via attachment strip 228, but is not displayed because it is attached to the attachment strip 228 of organizational tool 224 at a position that is outside of the visual display of organizational tool 224 defined by boundary handles 230 and 232. Similarly, referring to FIG. 2(b), objects 206 and 208 are attached to organizational tool 224 via attachment strip 228, but not displayed because they are attached to the attachment strip 228 of organizational tool 224 at a position that is outside of the visual display of organizational tool 224 defined by boundary handles 230 and 232.

In some implementations, attachment strip 228 may be of infinite extent. In alternative implementations, attachment strip 228 may have a finite extent. In order to enable a user to access portions of organizational tool 224 that fall outside of the visual display of organizational tool 224, multi-touch display device 200 provides controls for translating attachment strip 228 in a side-to-side fashion. Additionally or alternatively, one or more of boundary handles 230 and 232 can be manipulated to increase (or decrease) the extent of the visual display of organizational tool 224, thereby providing access to a larger (or smaller) number of attached objects.

Referring to FIG. 2(a), a user is engaging the surface of multi-touch display device 200 with a finger 202 at a point corresponding to attachment strip 228. Multi-touch display device 200 detects the input by the user at point "a" and associates the input with attachment strip 228 of organizational tool 224. Referring now to FIG. 2(b), as the user drags finger 202 to the left across the surface of multi-touch display device 200, multi-touch display device 200 detects the movement of the user's finger 202 from point "a" to point "b," interprets the detected movement as a request to translate attachment strip 228 by a distance corresponding to the distance from point "a" to point "b," and translates attachment strip 228 by the detected distance or some function of the detected distance. Because objects 206, 208, 210, 212, 214, and 216 are attached to organizational tool 200 via attachment strip 228, multi-touch display device 200 translates objects 206, 208, 210, 212, 214, and 216 along with attachment strip 228. In so doing, the multi-touch display device 200 preserves the spatial relationships between objects 206, 208, 210, 212, 214, and 216 along the attachment strip 228.

As a result of the translation of attachment strip 228, the portion of the attachment strip 228 that is located between boundary handles 230 and 232 has changed. In particular, the portion of attachment strip 228 to which objects 206 and 208 are attached no longer lies within boundary handles 230 and 232, while the portion of attachment strip 228 to which object 216 is attached now lies within boundary handles 230 and 232. Therefore, multi-touch display device 200 does not display objects 206 and 208 anymore but does display object 216.

Figure 3:
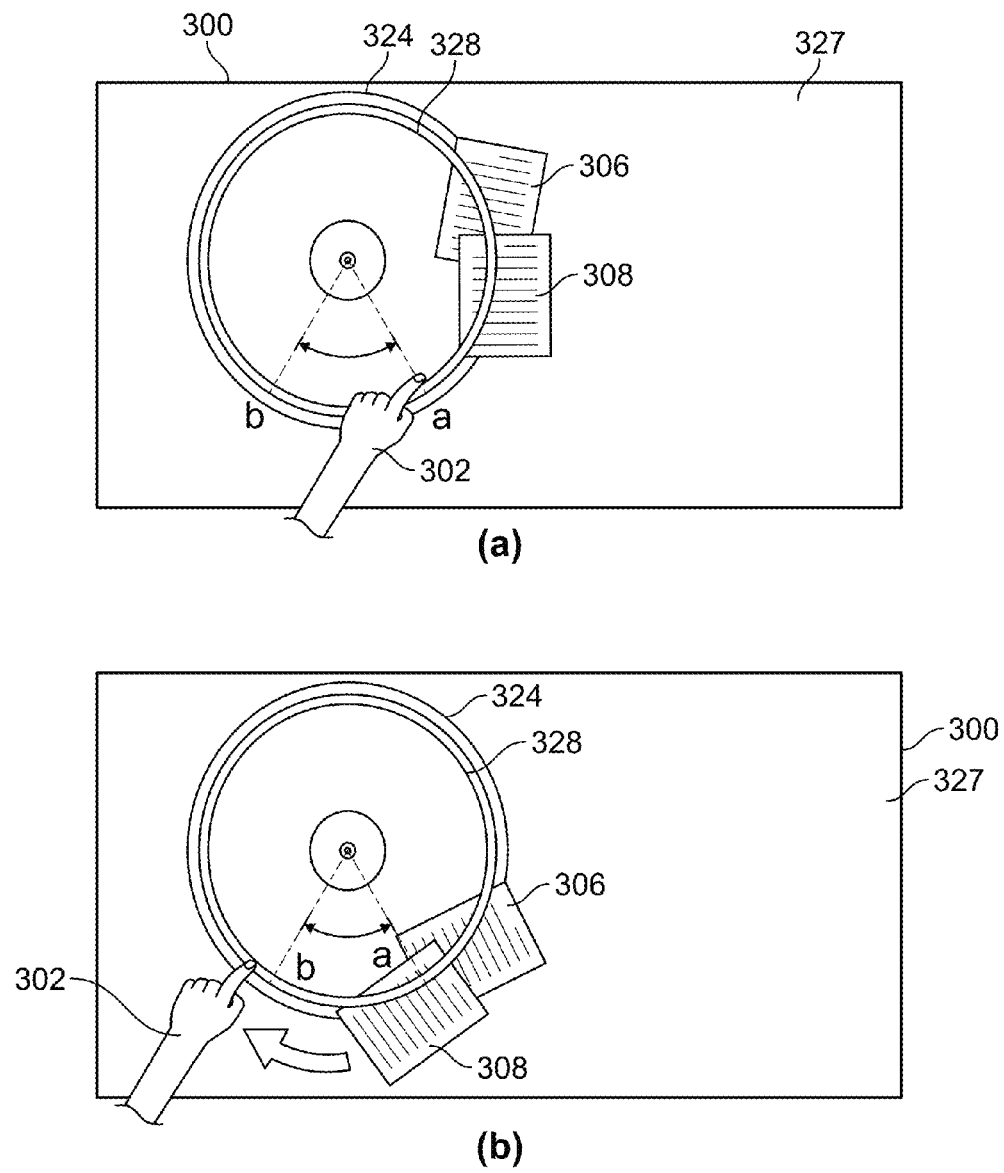
FIG. 3 is a diagram of a multi-touch display device configured to provide two-dimensional rotary organizational tools to users of the multi-touch display device to enable the users to organize objects displayed by the multi-touch display device.

As discussed above, a multi-touch display device may also provide a two-dimensional rotary organizational tool. FIGS. 3(a) and 3(b) are illustrations of a multi-touch display device 300 providing a two-dimensional rotary organizational tool that enables manipulations similar to functionality provided by a Lazy Susan. As illustrated in FIGS. 3(a) and 3(b), organizational tool 324 includes an control strip 328. As will be described in greater detail below, the control strip 328 provides a mechanism for manipulating organizational tool 324. Similar to the control strip described above with regard to the rectangular two-dimensional organizational tool, in some implementations, control strip 328 will appear on top of objects attached to organizational tool 324 in order to provide a convenient way to manipulate organizational tool 324. For example, as illustrated in FIGS. 3(a) and 3(b), objects 306 and 308 are attached to organizational tool 324 and appear under control strip 328.

In certain implementations, multi-touch display device 300 may interpret input associated with control strip 328 differently from input associated with other parts of organizational tool 324. For instance, multi-touch display device 300 may interpret a single, moving input associated with a part of organizational tool 324 other than control strip 328 as a request to move the entirety of organizational tool 324 in correspondence with the detected input, in a fashion similar to that discussed above with regard to FIG. 1F. However, multi-touch display device 300 may interpret a single, moving input associated with the control strip 328 of organizational tool 324 as a request to rotate organizational tool 324 about its center. An input need not be directly at a point corresponding to control strip 328 in order for multi-touch display device 300 to associate the input with the control strip 328. Rather, the input may correspond to a point within a predetermined distance of control strip 328.

Referring to FIG. 3(a), a user is engaging the surface of multi-touch display device 300 with a finger 302 at a point corresponding to control strip 328. Multi-touch display device 300 detects the input by the user at point "a" and associates the input with control strip 328 of organizational tool 324. Referring now to FIG. 3(b), as the user drags finger 302 in a counterclockwise fashion across the surface of multi-touch display device 300, multi-touch display device 300 detects the movement of the user's finger 302 from point "a" to point "b," interprets the detected movement as a request to rotate organizational tool 324, and rotates organizational tool 324 by the detected distance or some function of the detected distance. Because objects 306 and 308 are attached to organizational tool 324, multi-touch display device 300 translates objects 306 and 308 along with the rotation of organizational tool 324 such that objects 306 and 308 retain their position with respect to organizational tool 324. In so doing, the multi-touch display device 300 also preserves the spatial relationships between objects 306 and 308.

Rectangular Two-Dimensional Organizational Tool

The following section describes the rectangular two-dimensional organizational tool, described above in FIGS. 1A-1K, in greater detail. In particular, various methods for attaching objects to the organizational tool, detaching objects from the organizational tool, manipulating the organizational tool, and automatically arranging objects attached to the organizational tool will be discussed.

As discussed above, objects can be attached to a rectangular two-dimensional organizational tool, for example, for organizational and/or storage purposes. The multi-touch display device may provide various different techniques for attaching an object to the organizational tool.

Figure 4A:
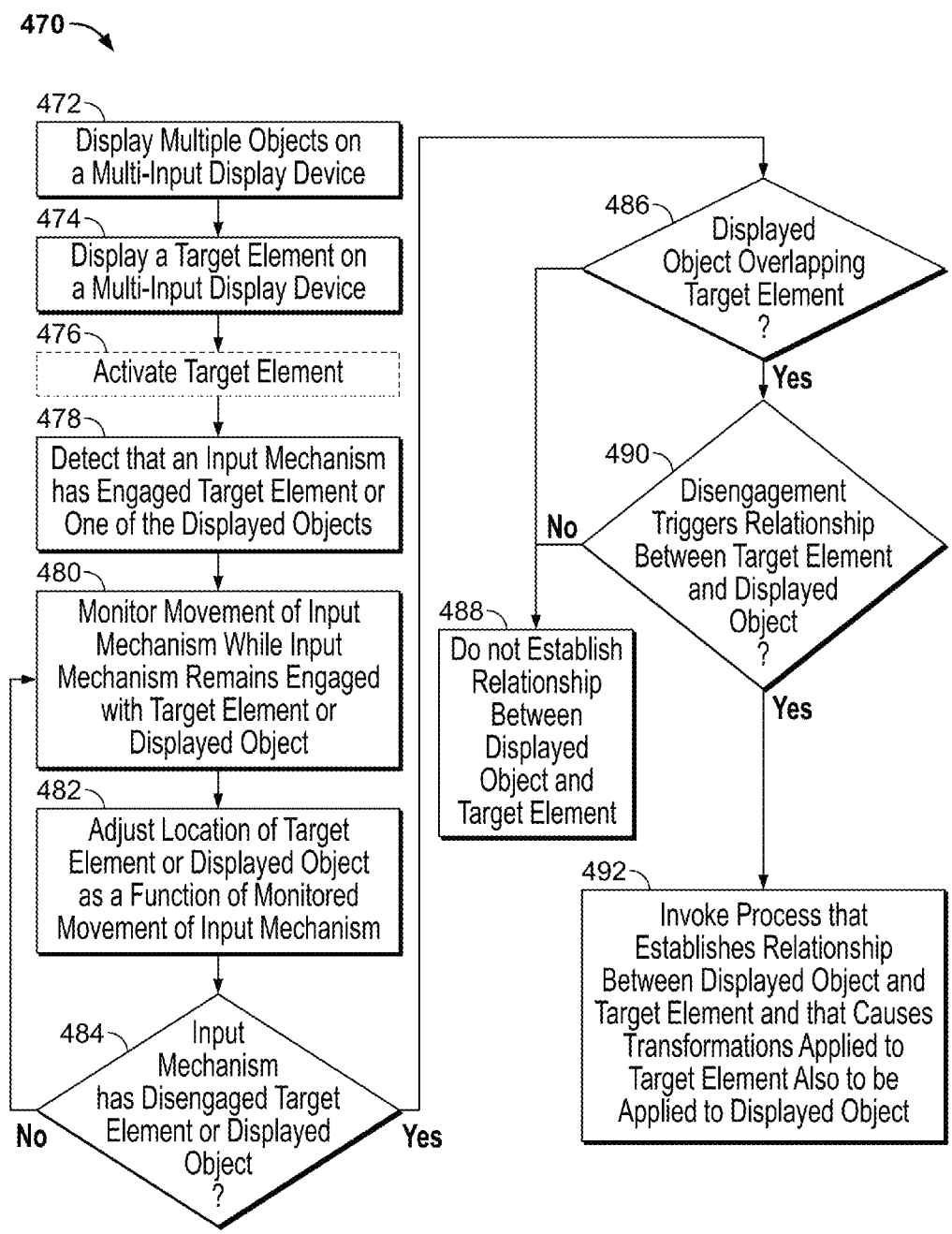
FIG. 4A is a flowchart of an example of a first process for attaching an object to a rectangular two-dimensional organizational tool.

FIG. 4A is a flowchart 470 of an example of a process for attaching an object to a rectangular two-dimensional organizational tool. The process illustrated in flowchart 470 may be performed by, for example, the multi-touch display device 100 of FIGS. 1A-1K, the multi-touch display device 200 of FIGS. 2(a)-2(b), or the multi-touch display device 300 of FIGS. 3(a)-3(b).

Multiple objects are displayed by a multi-touch display device (472). In addition, the multi-touch display device displays an organizational tool (i.e., a target element) to facilitate the organization and/or storage of one or more displayed objects (474).

Next, the organizational tool may be activated for attachment (476). When the organizational tool is not activated, the multi-touch display device may not permit objects to be attached to the organizational tool. In certain implementations, only when the multi-touch display device activates the organizational tool will the multi-touch display device attach objects to the organizational tool. In order to activate the organizational tool, the multi-touch display device may, for example, detect a predetermined sequence of inputs to a predetermined portion of the surface of the multi-touch display device (e.g., detecting an input to the surface of the multi-touch display device corresponding to a displayed button or detecting two quick tap inputs to the surface of the multi-touch display device corresponding to the control strip of the organizational tool being activated). Alternatively, a physical switch located either on the multi-touch display device itself or a remote control may be engaged in order for the multi-touch display device to activate the organizational tool. It is also contemplated that the organizational tool may always be activated for the purpose of attaching objects, in which case sub-process 476 need not be performed.

After the organizational tool has been activated for attachment, to the extent necessary, the multi-touch display device detects that an input mechanism has engaged the surface of the multi-touch display device at a point corresponding to where the organizational tool or one of the displayed objects is displayed (478). In response, the multi-touch display device monitors movement by the input mechanism while the input mechanism remains engaged with the surface (480).

As the input mechanism moves, the multi-touch display device interprets the detected movement as a request to translate the corresponding object or organizational tool, and updates the position of the object or organizational tool as a function of the detected movement (482). As long as the multi-touch display device continues to detect the input from the input mechanism, it will continue to monitor the movement of the input mechanism (484). When the multi-touch display device detects that the input mechanism has disengaged the surface of the multi-touch display device, the multi-touch display device determines whether the translated object overlaps the organizational tool or, in the case where the organizational tool is translated, whether any object not already attached to the organizational tool overlaps the organizational tool (486).

If no currently displayed objects visually overlap the organizational tool, no objects are attached to the organizational tool (488). In contrast, if one or more displayed objects are determined to be overlapping the organizational tool, the multi-touch display device determines whether the disengagement of the surface of the multi-touch display device by the input mechanism should trigger an attachment of the object(s) overlapping the organizational tool to the organizational tool (490).

In certain implementations, the determination of whether the disengagement should trigger an attachment is based on a stored rule or set of rules. For example, a rule may specify that a disengagement of the surface while the multi-touch display device concurrently detects an engagement by one or more separate input in a predetermined manner corresponding to the organizational tool will trigger an attachment of the object(s) overlapping the organizational tool to the organizational tool. Stated differently, the rule may require that the multi-touch display device detect that a user has continuously engaged the organizational tool through, for example, the control strip concurrent with an object being dragged over the organizational tool and released. An example of this rule is described in greater detail in connection with regard FIG. 4C, below.

Alternatively or additionally, a rule may specify that a disengagement of the surface preceded by an engagement of the surface at a pressure greater than a predetermined threshold and at a point corresponding to where the object overlaps the organizational tool will trigger an attachment of the object(s) overlapping the organizational tool to the organizational tool. Stated differently, the rule may require that the multi-touch display device detect that the user has engaged an object, dragged the object over the organizational tool, and pressed down with increased pressure on the surface of the multi-touch display device before disengaging the surface. An example of this rule is described in greater detail with regard to FIG. 4D, below.

Alternatively or additionally, a rule may specify that a disengagement of the surface preceded by an engagement associated with only the organizational tool and at a pressure greater that a predetermined threshold, such that the organizational tool is "pressed below" the level of the objects to be attached to the organizational tool, will trigger an attachment of the object(s) overlapping the organizational tool to the organizational tool. An example of this rule is described in greater detail with regard to FIG. 4E, below.

If the multi-touch display device determines that the object(s) that overlap the organizational tool should not be attached to the organizational tool, no objects will be attached to the organizational tool as a result of the disengagement of the surface of the multi-touch display device by the input mechanism. In contrast, if the multi-touch display device determines that the object(s) that overlap the organizational tool should be attached to the organizational tool, the multi-touch display device invokes a process to attach the object(s) that overlap the organizational tool to the organizational tool such that future manipulations applied to the organizational tool also may be applied to the attached object(s) as a consequence of their attachment to the organization tool (492).

Figure 4B:
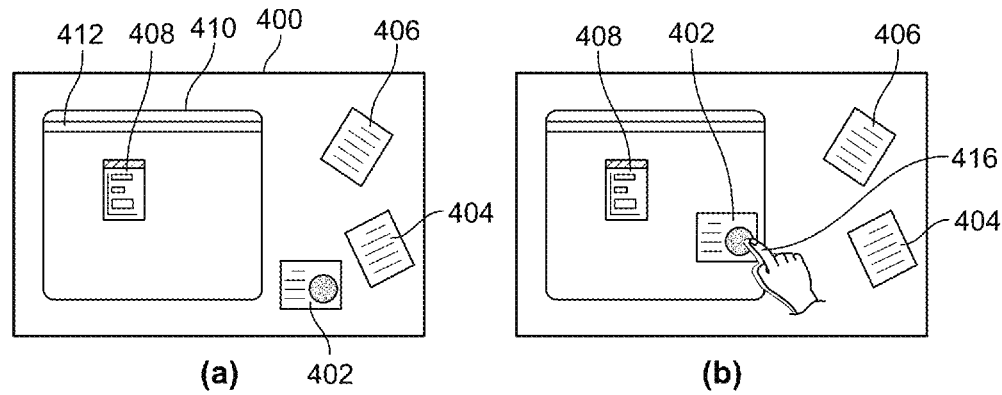
FIGS. 4B-4E illustrate four variations of the attachment process illustrated in FIG. 4A.

FIGS. 4B-4E illustrate four variations of attachment process 470. In FIGS. 4B(a), 4C(a), 4D(a), and 4E(a), multi-touch display device 400 displays objects 402, 404, 406, and 408 and organizational tool 410. Organizational tool 410 includes control strip 412. Furthermore, object 408 has already been attached to organizational tool 410.

In some implementations, the multi-touch display device may require some sort of affirmative action on behalf of a user before attaching an object to a grouping tool so as to avoid inadvertently attaching an object when such an attachment is not desired. In such implementations, absent detecting the required affirmative action, the multi-touch display device may not attach an object to the grouping tool even when the object is translated to a position overlapping the grouping tool and then released. Referring to FIG. 4B(b), a user engages the surface of multi-touch display device 400 at a point corresponding to object 402, drags finger 403 over the surface, and disengages the surface at a point where object 402 overlaps organizational tool 410.

Multi-touch display device 400 detects this input by finger 403, associates the input with object 402, interprets the input as a request to translate object 402, and translates object 402 as a function of the movement of the user's finger. In effect, multi-touch display device 400 updates the display of object 402 such that the finger 403 appears to remain engaged with the same point on the display even as the finger 403 moves about. After detecting the disengagement of finger 403, multi-touch display device 400 determines whether the translated object visually overlaps the organizational tool 410. Here, multi-touch display device 400 detects that object 402 overlaps organizational tool 410, and therefore determines whether the disengagement of finger 403 should trigger an attachment of the object 402 to organizational tool 410. In this example, multi-touch display device 400 employs a rule or set of rules to determine whether an attachment should be made. Additionally, the rule or set of rules have not been met, so multi-touch display device 400 does not attach object 402 to organizational tool 410.

Figure 4C:
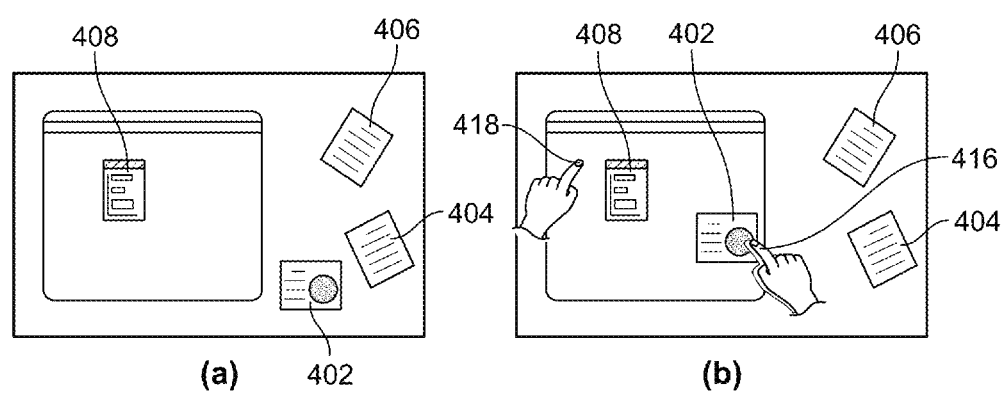

In some implementations, a multi-touch display device may employ an attachment rule whereby the multi-touch display device attaches an object to an organizational tool in response to detecting that that a user has relinquished control of the object while the object is located at a position over the organization tool and while the control strip is engaged by an input mechanism. Referring to FIGS. 4C(a)-4C(b), user 414 has engaged the surface of multi-touch display device 400 with finger 418 at a point corresponding to organizational tool 410. In addition, while continuing to engage organizational tool 410, user 414 also engages the surface of multi-touch display device 400 with finger 416 at a point corresponding to object 402 and drags finger 416 across the surface of the screen. The multi-touch display device 400 detects the movement of finger 416, and translates object 402 to a point where object 402 overlaps organizational tool 410 in response.

Thereafter, finger 416 disengages the surface of the multi-touch display device 400. In response to detecting that finger 416 has disengaged the surface of multi-touch display device 400, multi-touch display device 400 determines whether object 402 is overlapping organizational tool 410. As a consequence of detecting that object 402 overlaps organizational tool 410, multi-touch display device 400 then determines whether object 402 should be attached to organizational tool 410. Because finger 418 was engaging organizational tool 400 at the time when finger 416 relinquished control of object 402 (or within a threshold period of time within the time at which finger 416 relinquished control of object 402), multi-touch display device 400 determines that object 402 should be attached to organizational tool 410. Therefore, multi-touch display device 400 attaches object 402 to organizational tool 410.

Figure 4D:
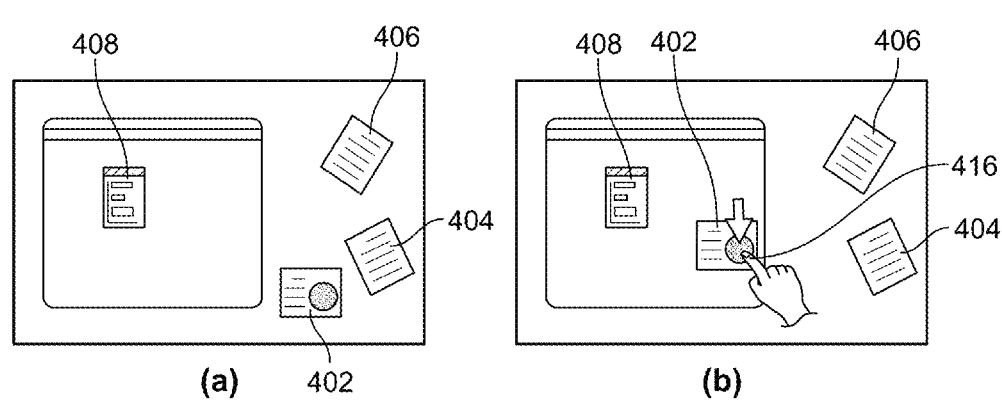

In some implementations, a multi-touch display device may employ an attachment rule whereby the multi-touch display device attaches an object to an organizational tool in response to detecting that that a user has relinquished control of the object while the object is located at a position over the organization tool and after pressing down on the surface of the multi-touch display device at a point where the object overlaps the organizational tool. Referring to FIGS. 4D(a)-4D(b), user 414 has engaged the surface of multi-touch display device 400 with finger 416 at a point corresponding to object 402 and drags finger 416 across the surface of the screen. The multi-touch display device 400 detects the movement of 416, and translates object 402 to a point where object 402 overlaps organizational tool 410 in response.

Thereafter, finger 416 presses down more firmly on the surface of multi-touch display device 400 and then disengages the surface. In response to detecting that finger 416 has disengaged the surface of multi-touch display device 400, multi-touch display device 400 determines whether object 402 is overlapping organizational tool 410. As a consequence of detecting that object 402 overlaps organizational tool 410, multi-touch display device 400 then determines whether object 402 should be attached to organizational tool 410. Because finger 416 more firmly engaged the surface of multi-touch display device 400 (e.g., where the absolute contact pressure or the differential in contact pressure between the initial engagement and the pressure when the object overlaps organizational tool 410 exceeds a predetermined threshold) before disengaging, multi-touch display device 400 determines that object 402 should be attached to organizational tool 410. Therefore, multi-touch display device 400 attaches object 402 to organizational tool 410.

Figure 4E:
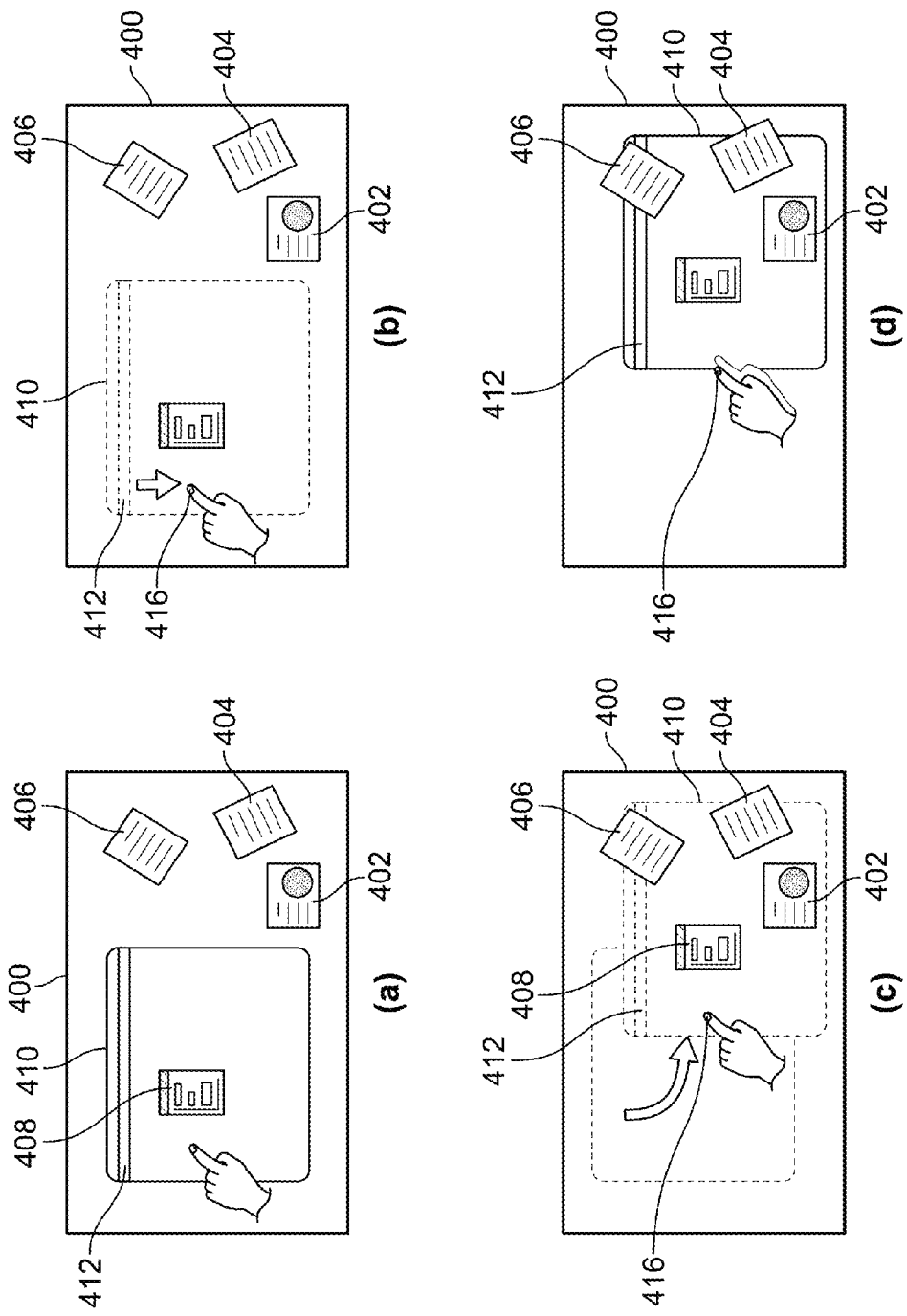

In some implementations, the multi-touch display device 400 may employ an attachment rule that enables objects to be attached to the organizational tool as a consequence of the translation of the organizational tool as opposed to the translation of the object(s) to be attached. For example, the multi-touch display device may provide for the attachment of objects to the organizational tool by enabling a user to depress the organizational tool to a visual layer that is beneath the layer at which the object to be attached is displayed and then "dragging" the organizational tool beneath the object to be attached. Referring to FIGS. 4E(a)-4E(d), user 414 has engaged the surface of multi-touch display device 400 with finger 416 at a point corresponding to organizational tool 410 and drags finger 416 across the surface of the screen. The multi-touch display device 400 detects the movement of 416, and translates organizational tool 410 to a point where objects 402, 404, and 406 overlap organizational tool 410 in response.

In certain implementations, multi-touch display device 400 may detect that the pressure with which finger 416 has engaged the surface exceeds a predetermined threshold in order to "drag" organizational tool 410 beneath objects 402, 404, and 406. If the multi-touch display device 400 detects that the pressure does not exceed the threshold, it will translate organizational tool 410 such that organizational tool 410 overlaps objects 402, 404, and 406, and no attachments will be made. In other implementations, anytime that organizational tool 410 is engaged, multi-touch display device 400 will "drag" organizational tool 410 beneath objects 402, 404, and 406, regardless of contact pressure.

After translating organizational tool 410, finger 416 disengages the surface of multi-touch display device 400. In response to detecting that finger 416 has disengaged the surface of multi-touch display device 400, multi-touch display device 400 determines whether any objects overlap organizational tool 410. As a consequence of detecting that object 402, 404, and 406 overlap organizational tool 410, multi-touch display device 400 then determines whether objects 402, 404, and 406 should be attached to organizational tool 410. Because finger 416 engaged the surface of multi-touch display device 400 at a pressure necessary to "drag" organizational tool 410 beneath the objects before disengaging, multi-touch display device 400 determines that objects 402, 404, and 406 should be attached to organizational tool 410. Therefore, multi-touch display device 400 attaches objects 402, 404, and 406 to organizational tool 410.

In some implementations, a multi-touch display device may enable a user to impart motion to a displayed object and, thereafter, the multi-touch display device may maintain the object in motion even after the user has relinquished control of the object by disengaging the multi-touch display device. Stated differently, the multi-touch display device may enable user to "flick" or "fling" an object across the multi-touch display device by initially engaging the surface of the multi-touch display device and then disengaging the surface of the multi-touch display device while the object is in motion. In such implementations, the multi-touch display device may employ an attachment rule whereby the multi-touch display device attaches objects to an organizational tool when the multi-touch display device detects that objects originally set into motion by a user have come to rest over an organizational tool. Furthermore, in such implementations, the multi-touch display device may apply friction to objects as they move across the multi-touch display device, and, in order to depict the organizational tools as "sticky" surfaces to which the objects can attach, the multi-touch display device may apply greater friction to objects as they move over an organizational tool than when the objects move over the canvas.

Figure 4F:
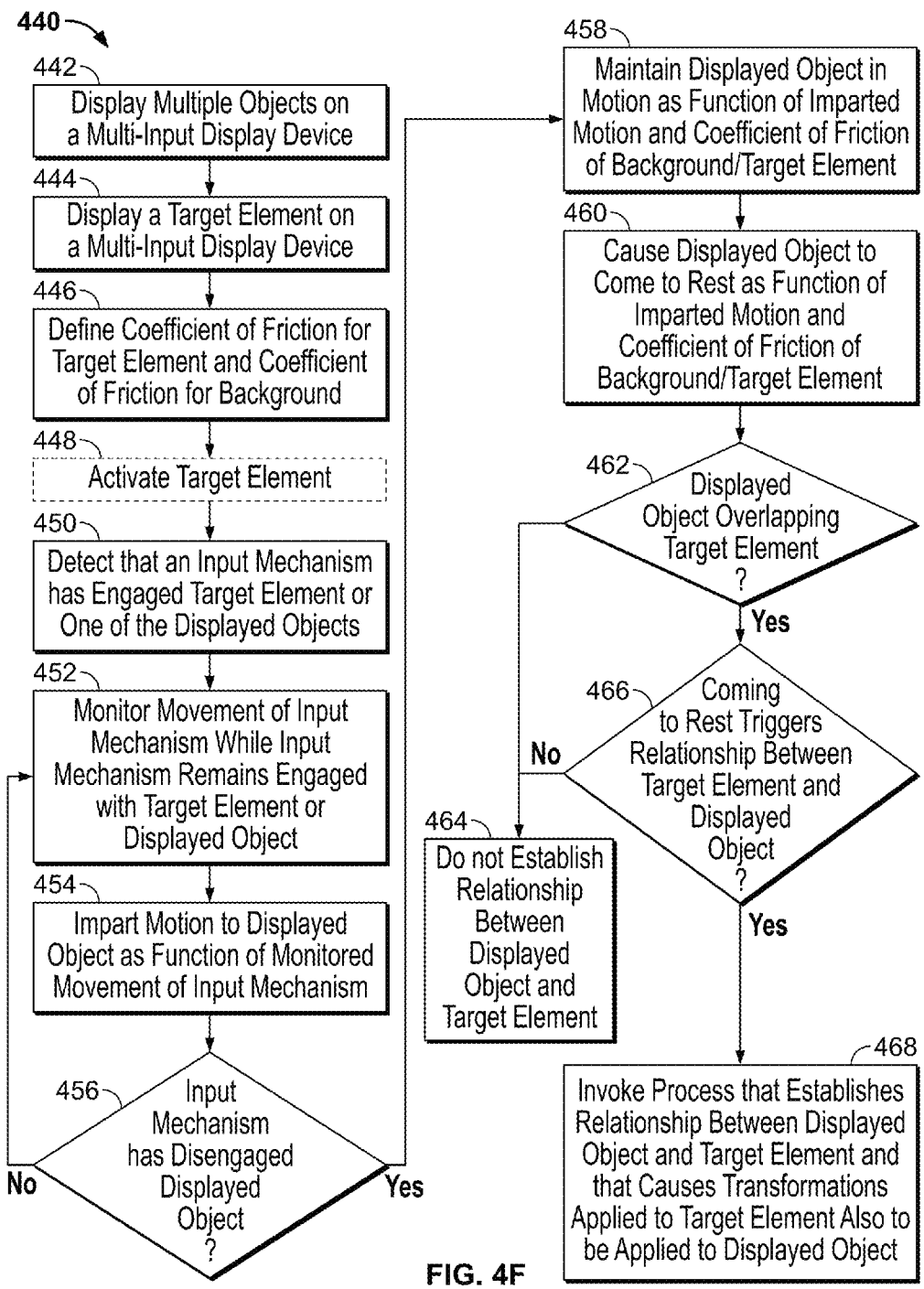
FIG. 4F is a flowchart of an example of a second process for attaching an object to a rectangular two-dimensional organizational tool.

FIG. 4F is a flowchart 440 of a process for attaching objects that have been set into motion to an organizational tool. The process illustrated in flowchart 440 may be performed by, for example, the multi-touch display device 100 of FIGS. 1A-1K, the multi-touch display device 200 of FIGS. 2(a)-2(b), the multi-touch display device 300 of FIGS. 3(a)-3(b), or the multi-touch display device 400 of FIGS. 4B-4E.

Multiple objects are displayed by a multi-touch display device (442). In addition, the multi-touch display device displays an organizational tool (i.e., a target element) to facilitate the organization and/or storage of one or more displayed objects (444). Moreover, the multi-touch display device defines a coefficient of friction for each of the organizational tool and the canvas (446). These coefficients of friction are used to determine the movement of objects across the screen, described in greater detail below. In certain embodiments, the multi-touch display device defines a greater coefficient of friction for the organizational tool than the canvas in order to simulate that organizational tool is "stickier" than the canvas.

Next, the organizational tool may be activated for attachment (448). The multi-touch display device may activate the organizational tool for attachment utilizing methods similar to those discussed above with regard to step sub-process 476. It is also contemplated that the organizational tool may always be activated for the purpose of attaching objects, in which case step sub-process 448 need not be performed.

After the organizational tool has been activated for attachment, to the extent necessary, the multi-touch display device detects that an input mechanism has engaged the surface of the multi-touch display device at a point corresponding to where the organizational tool or one of the displayed objects is displayed (450). In response, the multi-touch display device monitors movement by the input mechanism while the input mechanism remains engaged with the surface (452).

As the input mechanism moves, the multi-touch display device interprets the detected movement as a request to translate the corresponding object or organizational tool, and updates the position of the object or organizational tool as a function of the detected movement (454). As long as the multi-touch display device continues to detect the input from the input mechanism, it will continue to monitor the movement of the input mechanism (456). When the multi-touch display device detects that the input mechanism has disengaged the surface of the multi-touch display device, the multi-touch display device maintains the motion of the object as a function of the motion imparted by the input and the coefficient of friction of the surface(s) that the object overlaps (458). Stated differently, upon detecting the disengagement, the multi-touch display device continues updating the position of the object with the velocity the object had immediately prior to the disengagement, while slowing the velocity of the object based on the coefficient of friction of the surface(s) that the object overlaps. While the object is in motion, the multi-touch display device continuously determines the coefficient of friction to apply to the motion based on whether the object overlaps the canvas and/or the organizational tool. If the object solely overlaps either of the canvas or the organizational tool, the corresponding coefficient of friction is applied. If the object overlaps both the canvas and the organizational tool, the greater of the two coefficients of friction is applied.

The multi-touch display device continuously decreases the stored velocity of the moving object with regard to the applied coefficient of friction, while continuously updating the display of the object with regard to the velocity, until the velocity reaches zero (460). Once the object comes to rest, the multi-touch display device determines whether the translated object visually overlaps the organizational tool (462). If the translated object does not visually overlap the organizational tool, no objects are attached to the organizational tool (464). In contrast, if the translated object is determined to be overlapping the organizational tool, the multi-touch display device determines whether the object coming to rest should trigger an attachment of the object (466). In certain implementations, the determination of whether the disengagement should trigger an attachment is based on a stored rule or set of rules. Rules similar to those discussed above with regard to 470 may be utilized.

If the multi-touch display device determines that the object(s) that overlap the organizational tool should not be attached to the organizational tool, no objects will be attached to the organizational tool as a result of the disengagement of the surface of the multi-touch display device by the input mechanism. In contrast, if the multi-touch display device determines that the object(s) that overlap the organizational tool should be attached to the organizational tool, the multi-touch display device invokes a process to attach the object(s) that overlap the organizational tool to the organizational tool such that future manipulations applied to the organizational tool also may be applied to the attached object(s) as a consequence of their attachment to the organization tool (468).

Figure 4G:
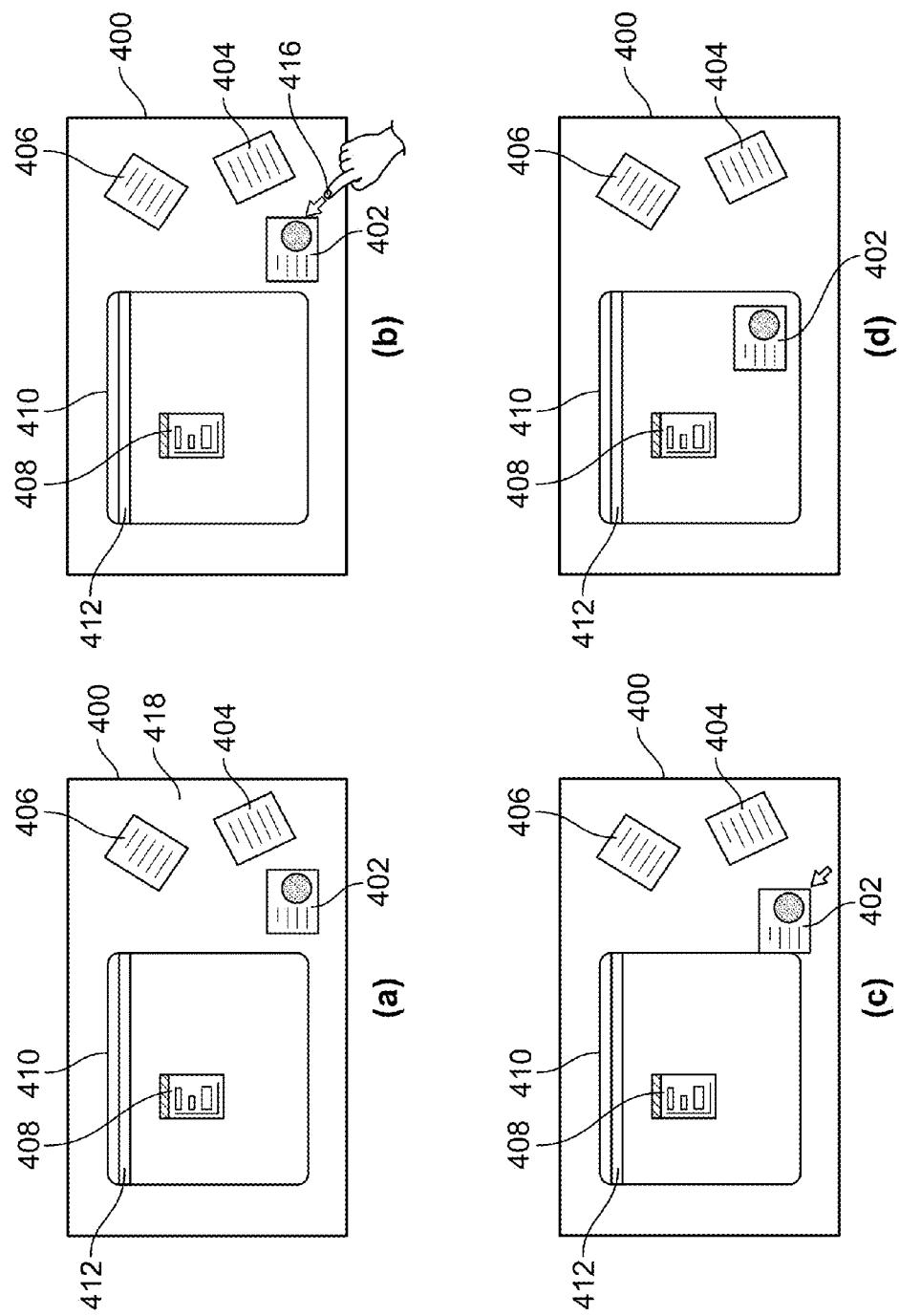
FIGS. 4G and 4H illustrate two variations of the attachment process illustrated in FIG. 4F.
Figure 4H:
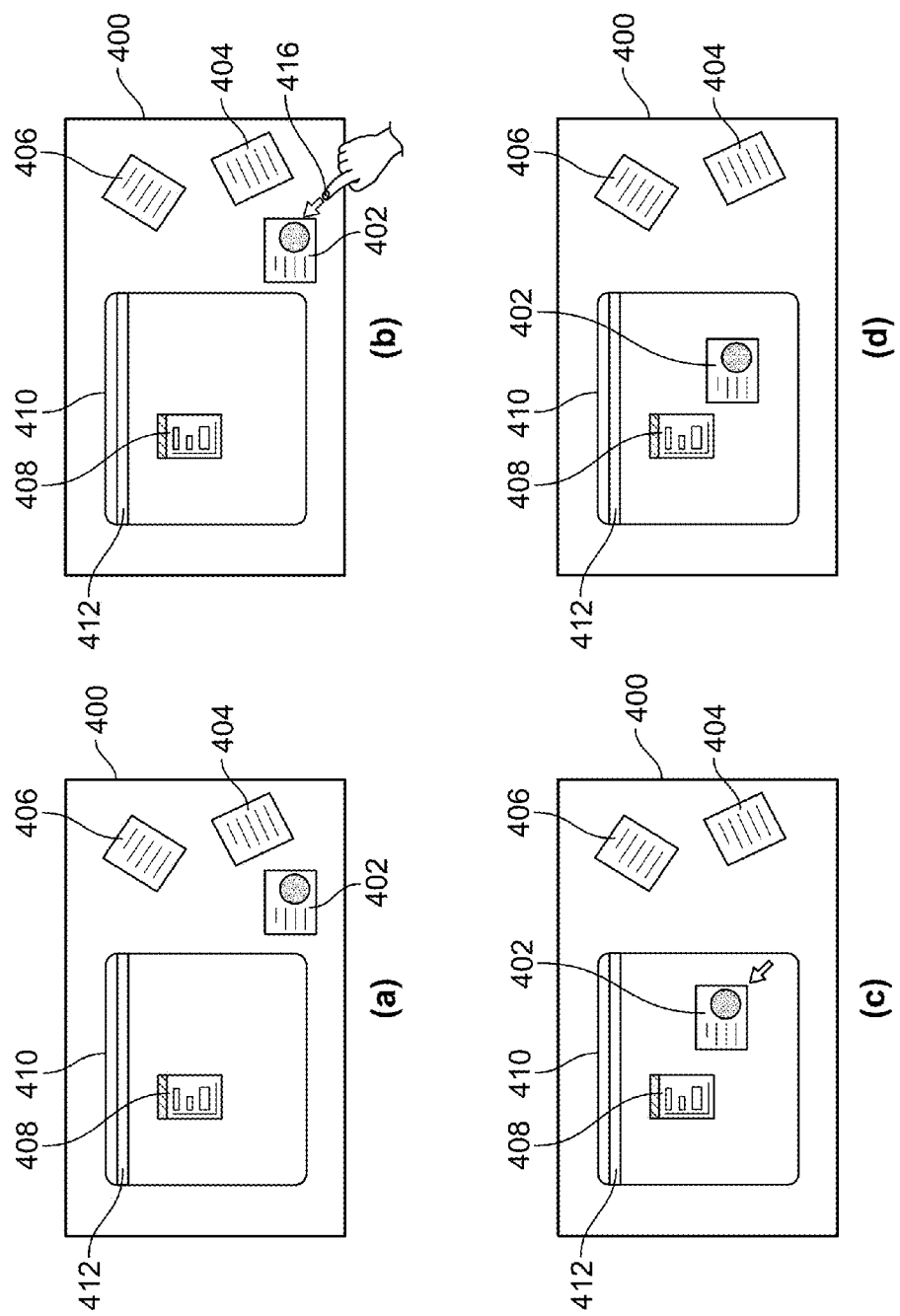

FIGS. 4G-4H illustrate two variations of attachment process 440. In FIGS. 4G(a) and 4H(a), multi-touch display device 400 displays objects 402, 404, 406, and 408 and organizational tool 410 on canvas 418. Object 408 has already been attached to organizational tool 410.

In some implementations, the multi-touch display device 400 may define a greater coefficient of friction for the organizational tool than for the canvas in order to simulate that the organizational tool is "stickier" than the canvas. Thus, as an object in motion that has been released begins to overlap the organizational tool, multi-touch display device 400 slows the motion of the object at a greater rate, as if the object were encountering a stickier surface. Referring to FIG. 4G(b), a user engages the surface of multi-touch display device 400 at a point corresponding to object 402, drags finger 416 over the surface, and disengages the surface at a point where object 402 only overlaps canvas 418.

Multi-touch display device 400 detects this input by finger 416, associates the input with object 402, interprets the input as a request to translate object 402, and translates object 402 as a function of the movement of the user's finger. In effect, multi-touch display device 400 updates the display of object 402 such that the point at which the user originally engages the object 402 continues to be displayed at the point at which the input is currently detected. After detecting the disengagement of finger 416, multi-touch display device 400 maintains the motion of object 402 as a function of the velocity imparted by the input prior to disengagement and the coefficient of friction of canvas 418, which object 402 currently visually overlaps. Thus, multi-touch display device 400 slows object 402 with regard to the defined coefficient of friction of canvas 418. Referring to FIG. 4G(c), as object 402 encounters organizational tool 410, beginning to visually overlap it, multi-touch display device 400 begins to update the motion of object 402 with regard to the coefficient of friction of organizational tool 410, because this coefficient of friction is greater than that of the canvas 418. Thus, multi-touch display device 400 slows object 402 at an even faster rate.

Referring to FIG. 4G(d), once object 402 has come to rest, multi-touch display device 400 determines whether object 402 visually overlaps the organizational tool 410. Here, multi-touch display device 400 detects that object 402 overlaps organizational tool 410, and therefore determines whether object 402 coming to rest should trigger an attachment of the object 402 to organizational tool 410. As described above, in certain implementations, multi-touch display device 400 employs a rule or set of rules to determine whether an attachment should be made. In this example, the rule to determine whether an attachment should be made is simply whether the object overlaps the organizational tool. Because object 402 overlaps organizational tool 410, multi-touch display device 400 determines that object 402 should be attached to organizational tool 410. Therefore, multi-touch display device 400 attaches object 402 to organizational tool 410.

In some implementations, the multi-touch display device 400 may define an equal coefficient of friction for both the organizational tool and the canvas. Thus, as an object in motion that has been released begins to overlap the organizational tool, multi-touch display device 400 will not change the rate at which the object is slowed. Referring to FIG. 4H(b), a user engages the surface of multi-touch display device 400 at a point corresponding to object 402, drags finger 416 over the surface, and disengages the surface at a point where object 402 only overlaps canvas 418.

Multi-touch display device 400 detects this input by finger 416, associates the input with object 402, interprets the input as a request to translate object 402, and translates object 402 as a function of the movement of the user's finger. In effect, multi-touch display device 400 updates the display of object 402 such that the point at which the user originally engages the object 402 continues to be displayed at the point at which the input is currently detected. After detecting the disengagement of finger 416, multi-touch display device 400 maintains the motion of object 402 as a function of the velocity imparted by the input prior to disengagement and the coefficient of friction of canvas 418, which object 402 currently visually overlaps. Thus, multi-touch display device 400 slows object 402 with regard to the defined coefficient of friction of canvas 418. Referring to FIG. 4H(c), as object 402 encounters organizational tool 410, beginning to visually overlap it, multi-touch display device 400 updates the motion of object 402 with regard to the coefficient of friction of organizational tool 410. However, because the coefficient of friction of canvas 418 and organizational tool 410 are the same, multi-touch display device 400 slows object 402 at the same rate. In this way, multi-touch display device 400 continues the motion of object 402 for a greater period of time than would have been the case with regard to FIG. 4G.

Referring to FIG. 4H(d), once object 402 has come to rest, multi-touch display device 400 determines whether object 402 visually overlaps the organizational tool 410. Because the coefficient of friction does not change between the surfaces, multi-touch display device 400 may continue the motion of object 402 past organizational tool 410, such that object 402 does not overlap organizational tool 410 when it comes to rest. Here, however, multi-touch display device 400 detects that object 402 overlaps organizational tool 410, and therefore determines whether object 402 coming to rest should trigger an attachment of the object 402 to organizational tool 410. As described above, in certain implementations, multi-touch display device 400 employs a rule or set of rules to determine whether an attachment should be made. In this example, the rule to determine whether an attachment should be made is simply whether the object overlaps the organizational tool. Because object 402 overlaps organizational tool 410, multi-touch display device 400 determines that object 402 should be attached to organizational tool 410. Therefore, multi-touch display device 400 attaches object 402 to organizational tool 410.

Figure 5A:
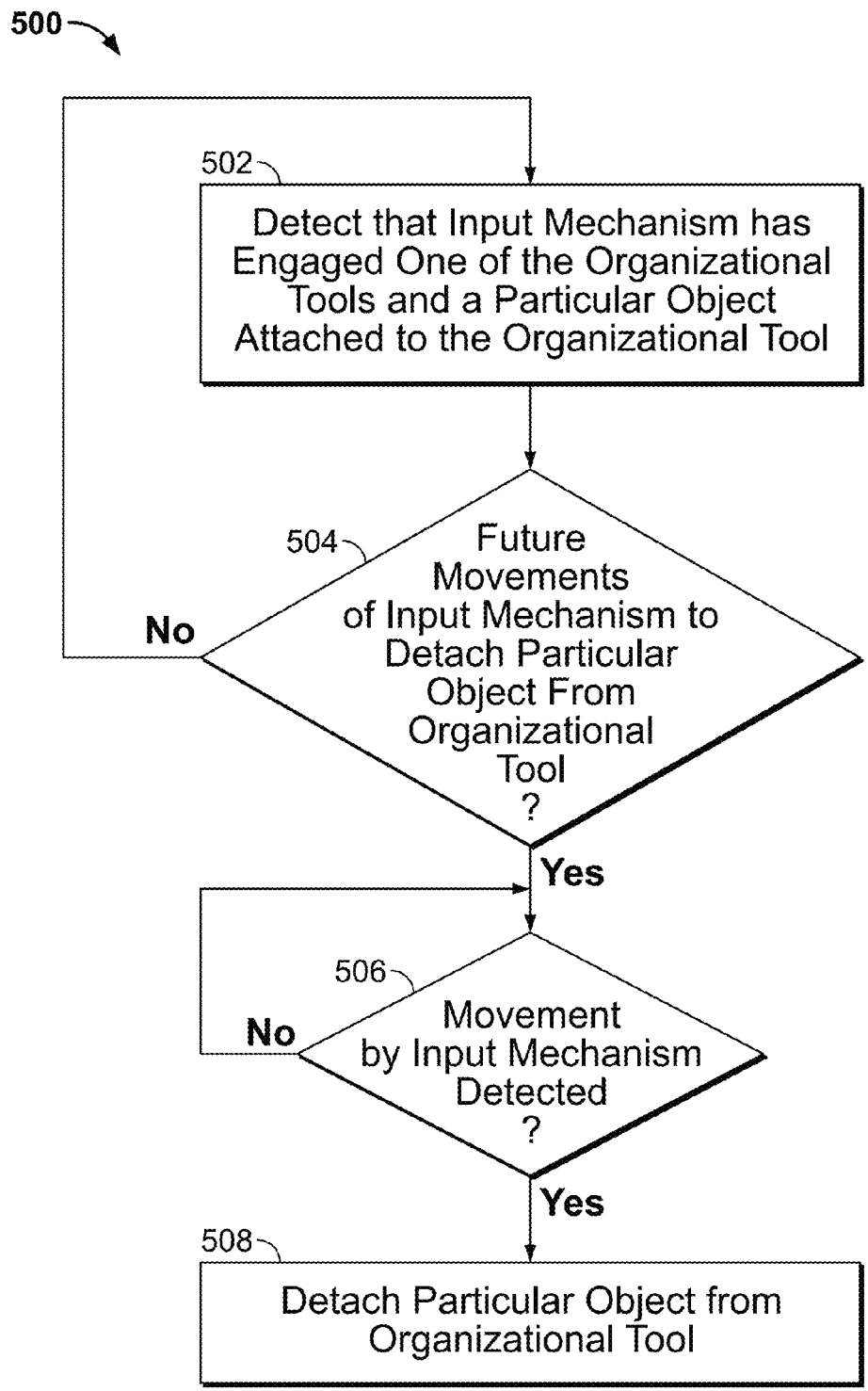
FIG. 5A is a flowchart of an example of a process for detaching an object from a rectangular two-dimensional organizational tool.

FIG. 5A is a flowchart 500 of an example of a process for detaching an object from a rectangular two-dimensional organizational tool. The process illustrated in flowchart 500 may be performed by, for example, the multi-touch display device 100 of FIGS. 1A-1K, the multi-touch display device 200 of FIGS. 2(a)-2(b), the multi-touch display device 300 of FIGS. 3(a)-3(b), or the multi-touch display device 300 of FIGS. 4B-4E and 4G-4H.

The multi-touch display device detects that an input mechanism has engaged the surface of the multi-touch display device at a point corresponding to where the organizational tool or one of the displayed objects is displayed (502). In response, the multi-touch display device determines whether any future movements of the input mechanism should trigger a detachment of the object(s) corresponding to the input (504).

In certain implementations, the determination of whether any future movements of the input mechanism should trigger a detachment is based on a stored rule or set of rules. For example, a rule may specify that an initial engagement of the surface corresponding to the organizational tool or one of the displayed objects while the multi-touch display device concurrently detects an engagement by one or more separate inputs in a predetermined manner corresponding to the organizational tool will trigger a detachment of the object(s) from the organization tool. Stated differently, the rule may require that the multi-touch display device detect that a user has continuously engaged the organizational tool through, for example, the control strip concurrent with an object being dragged over the organizational tool and released. An example of this rule is described in greater detail in connection with regard FIG. 5D, below.

Alternatively or additionally, a rule may specify that corresponding to the organizational tool at a pressure greater that a predetermined threshold, such that the organizational tool is "pressed below" the level of the objects attached to the organizational tool, will trigger a detachment of the object(s) attached to the organizational tool. An example of this rule is described in greater detail with regard to FIG. 5E, below.

If the multi-touch display device determines that the object(s) attached to the organizational tool should not be detached from the organizational tool, no objects will be detached from the organizational tool as a result of the engagement of the surface of the multi-touch display device by the input mechanism. In contrast, if the multi-touch display device determines that the object(s) attached to the organizational tool should be detached from the organizational tool, the multi-touch display device monitors the movement of input mechanism while the input mechanism remains engaged with the surface (506). As long as the multi-touch display device continues to detect the input from the input mechanism, it will continue to monitor the movement of the input mechanism. Once it detects a predetermined type and amount of movement of the input mechanism, the multi-touch display device invokes a process to detach the object(s) attached to the organizational tool such that future manipulations applied to the organizational tool will not be applied to the object(s) as a consequence of their detachment from the organization tool (508).

FIGS. 5B-5F illustrate five variations of detachment process 500. In FIGS. 5B(a), 5C(a), 5D(a), 5E(a), and 5F(a) multi-touch display device 510 displays objects 512, 514, 516, and 518 and organizational tool 520. Object 512, 514, 516, and 518 are all attached to organizational tool 520.

In some implementations, the multi-touch display device may require some sort of affirmative action on behalf of a user before detaching an object from an organizational tool so as to avoid inadvertently detaching the object when such a detachment is not desired. In such implementations, absent detecting the required affirmative action, the multi-touch display device may not detach an object from the organizational tool even when an input corresponds to the object and is moved away from the organizational tool. Referring to FIG. 5B(b), a user engages the surface of multi-touch display device 510 at a first point corresponding to object 512, and drags finger 522 over the surface, from the first point to a second point.

Multi-touch display device 510 detects this input by finger 522 and associates the input with object 512. After detecting the engagement of finger 522, multi-touch display device 510 determines whether any future movements of finger 522 should trigger a detachment of object 512. In this example, multi-touch display device 510 employs a rule or set of rules to determine whether an detachment should be made, however, the rule or set of rules have not been met, so multi-touch display device 510 does not detach object 512 from organizational tool 520. Because multi-touch display device 510 does not detach object 512, multi-touch display device 510 interprets movement of the detected input as a request to translate object 512 by a distance corresponding to the distance from the first point to the second point. However, as object 512 continues to be attached to organizational tool 520, multi-touch display device 510 will translate organizational tool 520, and any other objects attached to it, in correspondence with any translation of object 512.

In some implementations, a multi-touch display device may employ a detachment rule whereby the multi-touch display device detaches an object from an organizational tool in response to detecting that a user has engaged the object in a predetermined manner. The predetermined manner of input may include, for example, a single point engagement of the surface of the multi-touch display device at a point corresponding to an attached object, or a predefined series of inputs at a predetermined point on an attached object. Referring to FIG. 5C(a), a user has engaged the surface of multi-touch display device 510 with finger 522 at a first point corresponding to object 512. The multi-touch display device 510 detects the input of finger 522, and associates the input with object 512.

After detecting the engagement of finger 522, multi-touch display device 510 determines whether any future movements of the finger 522 should trigger a detachment of object 512. Because finger 522 engages attached object 512 as a singular input, multi-touch display device 510 determines that object 512 should be detached from organizational tool 520. Thereafter, in reference to FIG. 5C(b), the user drags finger 522 across the surface of the multi-touch display device 510 in a rightward motion from the first point to a second point. In response to detecting the movement of finger 522, multi-touch display device 510 translates object 512 by a distance corresponding to the distance from the first point to the second point. In some implementations, multi-touch display device 510 detaches object 512 from organizational tool 520 when multi-touch display device 510 detects that finger 522 disengages the surface of multi-touch display device 510 and determines that object 512 no longer overlaps organizational tool 520. In other implementations, the multi-touch display device 510 detaches object 512 from organizational tool 520 when multi-touch display device 510 detects any movement of finger 522 after determining that the movement should trigger a detachment of object 512.

In some implementations, a multi-touch display device may employ an detachment rule whereby the multi-touch display device detaches an object from an organizational tool in response to detecting that that a user has engaged the object while the object is attached to the organization tool and while the control strip is engaged by another input mechanism. Referring to FIG. 5D(a), a user has engaged the surface of multi-touch display device 510 with finger 522 at a first point corresponding to organizational tool 520. In addition, while continuing to engage organizational tool 520, the user also engages the surface of multi-touch display device 510 with finger 524 at a point corresponding to object 512. The multi-touch display device 510 detects the input of finger 522 and associates it with organizational tool 520, and detects the input of finger 524 and associates it with object 512.

After detecting the engagement of finger 524, multi-touch display device 510 determines whether any future movements of the finger 524 should trigger a detachment of object 512. Because finger 522 was engaging organizational tool 510 at the time when finger 524 engaged object 512 (or within a threshold period of time within the time at which finger 524 engaged object 512), multi-touch display device 510 determines that object 512 should be detached from organizational tool 520. Thereafter, in reference to FIG. 5D(b), the user drags finger 524 across the surface of the multi-touch display device 510 in a rightward motion from the first point to a second point. In response to detecting the movement of finger 524, multi-touch display device 510 translates object 512 by a distance corresponding to the distance from the first point to the second point, and detaches object 512.

In some implementations, the multi-touch display device 510 may employ an detachment rule that enables objects to be detached from the organizational tool as a consequence of the translation of the organizational tool as opposed to the translation of the object(s) to be detached. For example, the multi-touch display device may provide for the detachment of objects from the organizational tool by enabling a user to depress the organizational tool to a visual layer that is beneath the layer at which the object(s) attached to the organizational tool are displayed and then "dragging" the organizational tool from under the object(s) to be detached. Referring to FIG. 5E(a), a has engaged the surface of multi-touch display device 510 with finger 522 at a first point corresponding to organizational tool 520. The multi-touch display device 510 detects the input of finger 522, and associates the input with organizational tool 520.

After detecting the engagement of finger 522, multi-touch display device 510 determines whether any future movements of the finger 522 should trigger a detachment of the objects 512, 514, 516, and/or 518. In certain implementations, multi-touch display device 510 may detect whether the pressure with which finger 522 has engaged the surface exceeds a predetermined threshold in order to determine if any future movements of the finger 522 should trigger a detachment of the objects 512, 514, 516, and/or 518. If the multi-touch display device 510 detects that the pressure does not exceed the threshold, it may translate organizational tool 510 without detaching objects 512, 514, 516, and 518, and may therefore translate objects 512, 514, 516, and 518 as well. In other implementations, anytime that organizational tool 520 is engaged, multi-touch display device 510 determines, regardless of the detected pressure, that any future movements of the finger 522 should trigger a detachment of the attached objects.

In this example, because multi-touch display device 510 detects that the pressure exceeds the predetermined threshold, multi-touch display device 510 determines that any future detected movements of finger 522 should trigger a detachment of the objects 512, 514, 516, and/or 518. Thereafter, in reference to FIG. 5E(b), the user drags finger 522 across the surface of the multi-touch display device 510 in a rightward motion from the first point to a second point. In response to detecting the movement of finger 524, multi-touch display device 510 translates organizational tool 520 by a distance corresponding to the distance from the first point to the second point. In certain implementations, once multi-touch display device 510 detects that finger 522 has disengaged the surface, multi-touch display device 510 may determine whether any objects not already attached to organizational tool 520 overlap organizational tool 520. If any non-attached objects do overlap organizational tool 520, multi-touch display device 510 may attach the objects overlapping organizational tool 520. In other implementations, once multi-touch display device 510 detects that finger 522 has disengaged the surface, multi-touch display device 510 will not attach any objects to organizational tool 520, regardless of whether they overlap organizational tool 520.

In some implementations, a multi-touch display device may employ an detachment rule whereby the multi-touch display device detaches object(s) from an organizational tool in response to detecting that that a user has engaged the organizational control at a specific point or region. Referring to FIG. 4F(a), a user has engaged the surface of multi-touch display device 510 with finger 522 at a point corresponding to organizational tool 520, and more specifically at a point corresponding to a predetermined input target or button (e.g., a "Release All" button) on organizational tool 520. Multi-touch display device 510 detects the input of finger 522 and associates it with organizational tool 520.

Figure 5F:
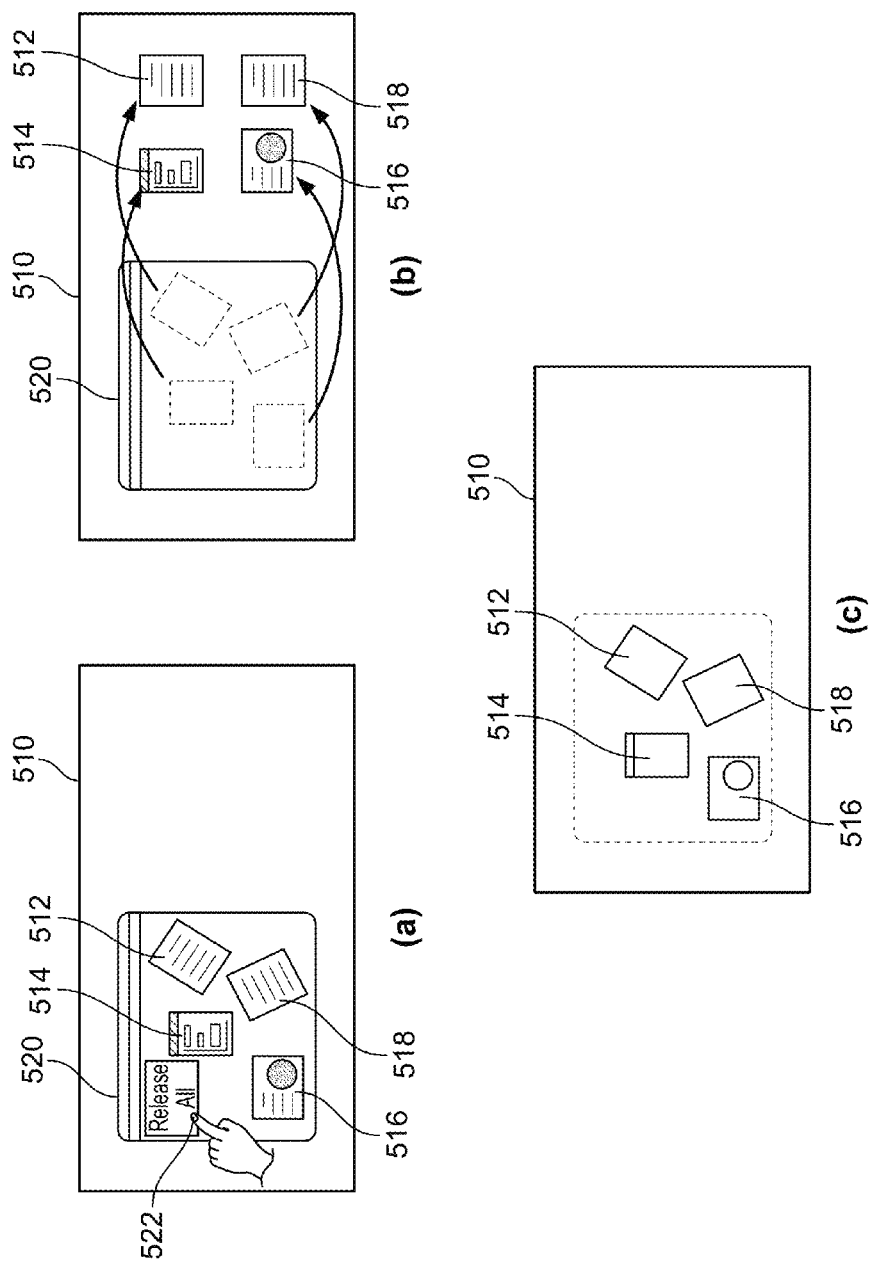

After detecting the engagement of finger 522, multi-touch display device 510 determines whether the engagement, disengagement, or future movement of finger 522 should trigger a detachment of the objects 512, 514, 516, and/or 518. Because finger 522 engages multi-touch display device 510 at a point corresponding to a "Release All" button, multi-touch display device 510 determines that the engagement of finger 522 should trigger a detachment of all attached objects 512, 514, 516, and 518. Referring to FIG. 5F(b), in certain implementations, as a result of triggering the detachment of all attached objects from organizational tool 520, multi-touch display device 510 may translate each of objects 512, 514, 516, and 518 to a predetermined location where each object does not overlap organizational tool 520. In such implementations, multi-touch display device 510 may also rotate each detached object such that the angular orientation of each detached object corresponds with the angular orientation of multi-display device 510.

In other implementations, as a result of triggering the detachment of all attached objects from organizational tool 520, multi-touch display device 510 detaches objects 512, 514, 516, and 518 without translating either organizational tool 520 or objects 512, 514, 516, and 518. Stated differently, objects 512, 514, 516, and 518 continue to overlap organizational tool 520, but are not attached to organizational tool 520 for purposes of manipulation of either organizational tool 520 or the objects themselves.

In additional implementations, as a result of triggering the detachment of all attached objects from organizational tool 520, multi-touch display device 510 may, as shown in FIG. 5F(c), detach objects 512, 514, 516, and 518, and delete organizational tool 520. In such an implementation, multi-touch display device 510 will continue to display 512, 514, 516, and 518 at the positions at which each object was displayed prior to being detached, however organizational tool 520 will no longer be displayed.

As discussed above, one effect of an object being attached to an organizational tool is that when the multi-touch display device applies transformations to the organizational tool, the multi-touch display device also may apply transformations to the objects attached to the organizational tool as a consequence of their attachment. However, when the multi-touch display device applies a transformation to an organization tool, the transformations that the multi-touch display device applies to objects attached to the organizational tool may depend upon how the objects are attached to the organizational tool.

In some cases, the multi-touch display device may attach an object to an organizational tool at only a single point. In such cases, transformations applied to the organizational tool only impact an attached object (i.e., cause a corresponding transformation to be applied to the attached object) if the transformations applied to the organizational tool impact the point upon the organizational tool at which the object is attached. Alternatively, in other cases, the multi-touch display device may attach an object to an organization tool at two or more points. In such cases, transformations applied to the organizational tool will be applied equally to the attached object.

The manner in which all objects are attached to a organizational tool may be set for a given organizational tool by the user or they may be automatically preset upon creation by the multi-touch display device. Alternatively, the manner in which objects are attached to a organizational tool may be detected separately for each object upon being attached to the organizational tool.

FIG. 6A illustrates a multi-touch display device performing transformations to an organizational tool and its attached object when the attached objects are attached to the organizational tool at two or more points. As illustrated in FIG. 6A(a), objects 602, 604, 606, and 608 each are attached to organizational tool 610 at two or more points. Therefore, when the multi-touch display device 600 rotates organizational tool 610 in response to detecting input by fingers 616 and 618 engaging the organizational tool, as shown in FIG. 6A(b), the multi-touch display device 600 corresponding rotates each of displayed objects 602, 604, 606, and 608 as well.

FIG. 6B illustrates a multi-touch display device performing transformations to an organizational tool and its attached object when the attached objects are attached to the organizational tool at only one point. As illustrated in FIG. 6B(a), objects 602, 604, 606, and 608 each are attached to organizational tool 610 at one point. Therefore, when the multi-touch display device 600 rotates organizational tool 610 in response to detecting input by fingers 616 and 618 engaging the organizational tool, as shown in FIG. 6B(b), the multi-touch display device 600 corresponding translates each of displayed objects 602, 604, 606, and 608 only with regard to whether and how the rotation of organizational tool 610 impacts the point upon the organizational tool 610 at which objects 602, 604, 606, and 608 are attached.

In some implementations, a multi-touch display device may provide controls for further organizing objects attached to an organizational tool provided by the multi-touch display device even after the objects have been attached to the organizational tool. For example, the multi-touch display device may attach an object to the organizational tool such that the object is attached to the organizational tool at the position occupied by the object on the organizational tool at the point in time when the multi-touch display device determined to attach the object to the organizational tool irrespective of how many other objects also are attached to the organizational tool at the same or similar positions. Furthermore, the multi-touch display device may preserve the angular orientation of the an object upon attaching the object to an organizational tool. This may lead to a cluttering of the organizational tool as more and more objects are attached to the organizational tool. Therefore, the multi-touch display device may provide controls for rearranging the objects attached to an organizational tool into a more organized fashion.

Figure 7A:
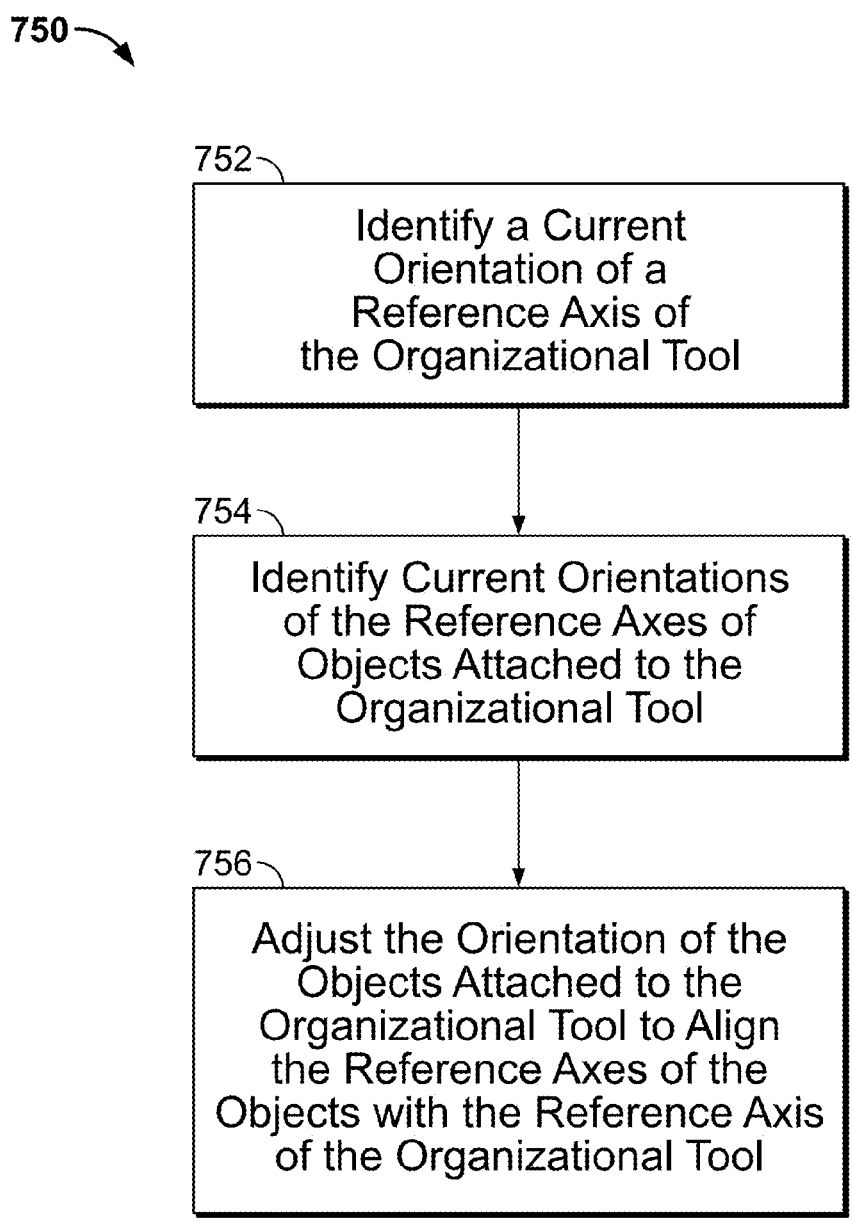
FIG. 7A is a flowchart of an example of a process for organizing objects attached to a rectangular two-dimensional organizational tool.

FIG. 7A is a flowchart 750 of an example of a process for organizing objects attached to a rectangular two-dimensional organizational tool. The process illustrated in flowchart 750 may be performed by, for example, the multi-touch display device 100 of FIGS. 1A-1K, the multi-touch display device 200 of FIGS. 2(a)-2(b), the multi-touch display device 300 of FIGS. 3(a)-3(b), the multi-touch display device 300 of FIGS. 4B-4E and 4G-4H, the multi-touch display device 510 of FIGS. 5B-5F, or the multi-touch display device 600 of FIGS. 6A-6B.

The multi-touch display device identifies a current orientation of a reference axis of the organizational tool (752). In some implementations, the multi-touch display device may determine the reference axis based on a vertical and/or horizontal axis of the organizational tool, stored and updated by the multi-touch display device. Alternatively, the multi-touch display device may determine the reference axis based on a comparison of multiple predetermined points of the organizational tool with regard to multiple predetermined points of the display surface of the multi-touch display device. Alternatively, the multi-touch display device may determine the reference axis by detecting an input from a user indicating the reference axis.

Subsequently, the multi-touch display device identifies a current orientation of the reference axis of each object attached to the organizational tool (754). In order to determine the reference axis for a given object, the multi-touch display device may utilize similar methods as discussed above with regard to determining the reference axis of the organizational tool. Next, the multi-touch display device adjusts the orientation of each object attached to the organizational tool being organized, such that the reference axes of the attached objects align with the reference axis of the organizational tool (756). The multi-touch display device may align the reference axis of a given object with the reference axis of the organizational tool by, for example, rotating the object until the reference axis of the object and the reference axis of the organizational tool are parallel. Alternatively, the multi-touch display device may, for example, rotate the object until the reference axis of the object and the reference axis of the organizational tool are offset by a predefined angle.

Figure 7B:
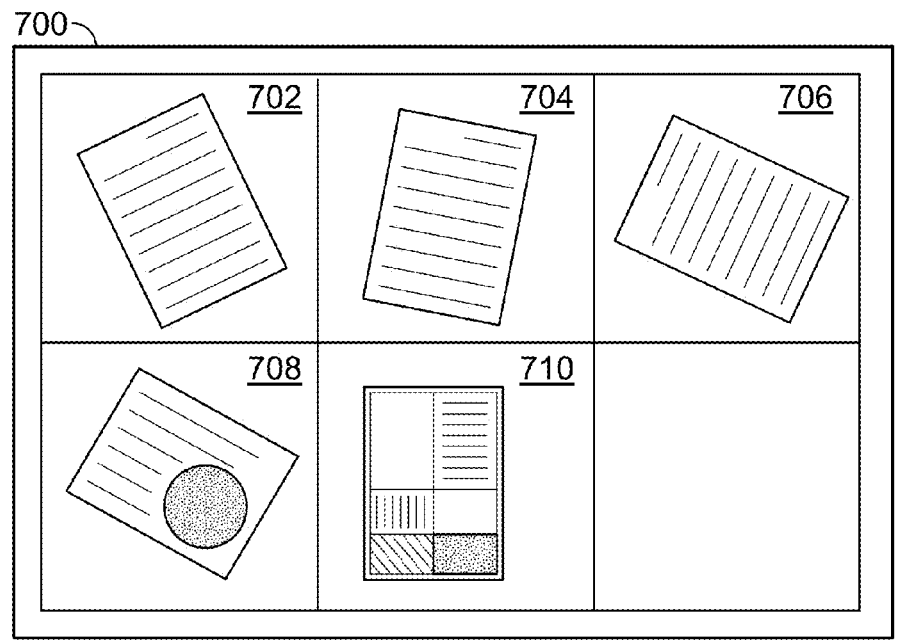
FIGS. 7B and 7C illustrate two variations of the organizing process illustrated in FIG. 7A.
Figure 7B:
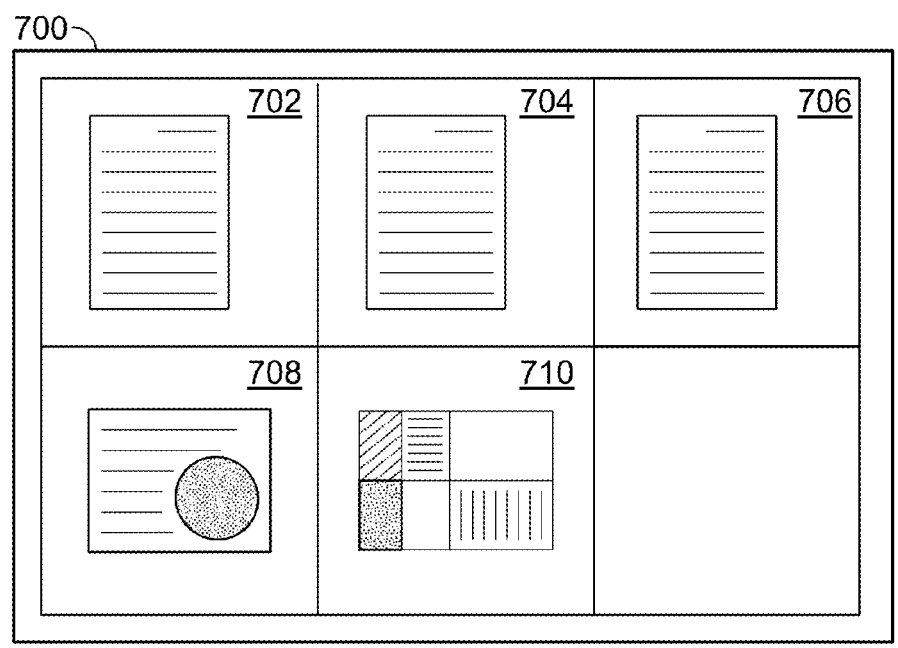

Referring to FIG. 7B, multi-touch display device 700 partitions organizational tool 701 into enough sections to accommodate the number of attached objects. Multi-touch display device 700 assigns each attached object a section. As multi-touch display device 700 attaches a new object, multi-touch display device 700 may automatically move the newly attached object to the closest free section, if one is available. Alternatively, multi-touch display device 700 may give the newly attached object priority to the closest section, free or not, and, if the closest section is not available, move the object attached in that section to the closest free section in order to accommodate the newly attached object. If, in either case, a free section is not available, multi-touch display device 700 may resize all of the objects attached to organizational tool 701 such that organizational tool 701 may be repartitioned in order to create a free section for all attached objects.

FIG. 7B(a) illustrates how multi-touch display device 700 has partitioned organizational tool 701 into six sections to accommodate objects 702, 704, 706, 708, and 710. In some implementations, as multi-touch display device 700 attaches objects to organizational tool 701, multi-touch display device 700 maintains the angular orientation that the objects possessed upon being attached to organizational tool 701. Thus, multi-touch display device 700 attaches and displays objects 702, 704, 706, and 708 at various angles.

Multi-touch display device 700 may also orient all of the objects attached to organizational tool 701 to correspond with the orientation of the organizational tool 701. Referring to FIG. 7B(b), multi-touch display device 700 may orient each of objects 702, 704, 706, 708, and 710 to correspond with the orientation of organizational tool 701, such that each of objects 702, 704, 706, 708, and 710 appear with a vertical orientation. In one implementation, the multi-touch display device 700 may orient the objects attached to organizational tool 701 by, for example, determining the vertical axes of organizational tool 701 and objects 702, 704, 706, 708, and 710, and orienting attached objects 702, 704, 706, 708, and 710 such that their vertical axes align with the vertical axis of organizational tool 701. Multi-touch display device 700 may also utilize a similar process, except using the horizontal axes of organizational tool 701 and objects 702, 704, 706, 708, and 710.

In certain implementations, multi-touch display device 700 may cause each object to be oriented in correspondence with the orientation of organizational tool 701 upon attaching the object to organizational tool 701. In other implementations, multi-touch display device 700 may maintain the angular orientation that each object possesses upon being attached to organizational tool 701, as shown in FIG. 7B(a), and then concurrently reorient all of attached objects 702, 704, 706, 708, and 710 with regard to the orientation of organizational tool 701 upon detecting an input requesting a reorientation, as shown in FIG. 7B(b).

Figure 7C:
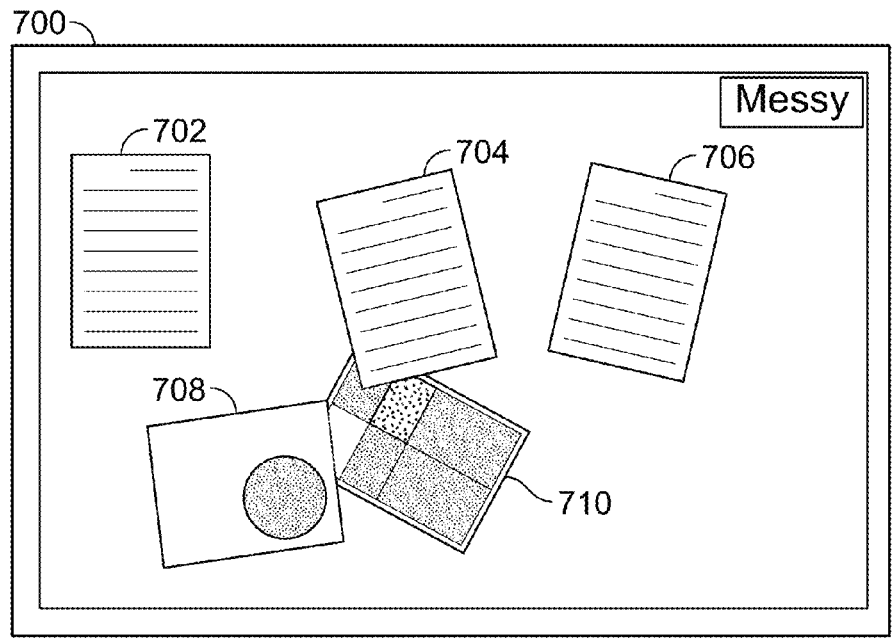
Figure 7C:
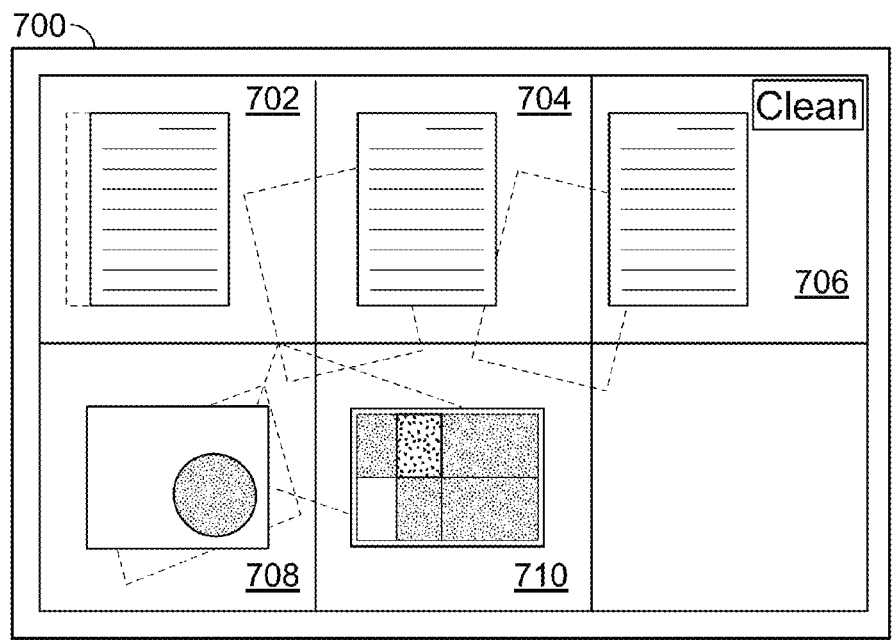

As illustrated in FIG. 7C(a), organizational tool 701 is operating in a free ("messy") attachment mode such that the multi-touch display device 700 preserves the angular orientation of objects upon attaching the objects to the organizational tool 701. Furthermore, multi-touch display device 700 attaches the objects to the organizational tool 701 at the positions occupied by the objects at the points in time when the multi-touch display device 700 determines to attach the objects to the organizational tool 701. Multi-touch display device 700 may display a button to indicate in which attachment mode organizational tool 701 is operating. Thus, in FIG. 7C(a), multi-touch display device 700 displays a "Messy" button in the top right-hand corner of organizational tool 701. In the event that the user eventually wishes to organize the objects that were attached in the free attachment mode, the organizational tool 701 provides a control to toggle the organizational tool 701 into an organized ("clean") attachment mode.

FIG. 7C(b) illustrates a possible result of a transition from a free attachment mode to an organized attachment mode. Thus, upon detecting an input from a user indicating a request to implement organized attachment mode, organizational tool 701 is partitioned into six sections to accommodate objects 702, 704, 706, 708, and 710. Furthermore, each object is assigned to the section closest to where it was originally attached in the free attachment mode, and is reoriented to correspond with the orientation of organizational tool 701. While operating organizational tool 710 in organized mode, multi-touch display device 700 may display a "Clean" button in the top right-hand corner of organizational tool 701.

Figure 8A:
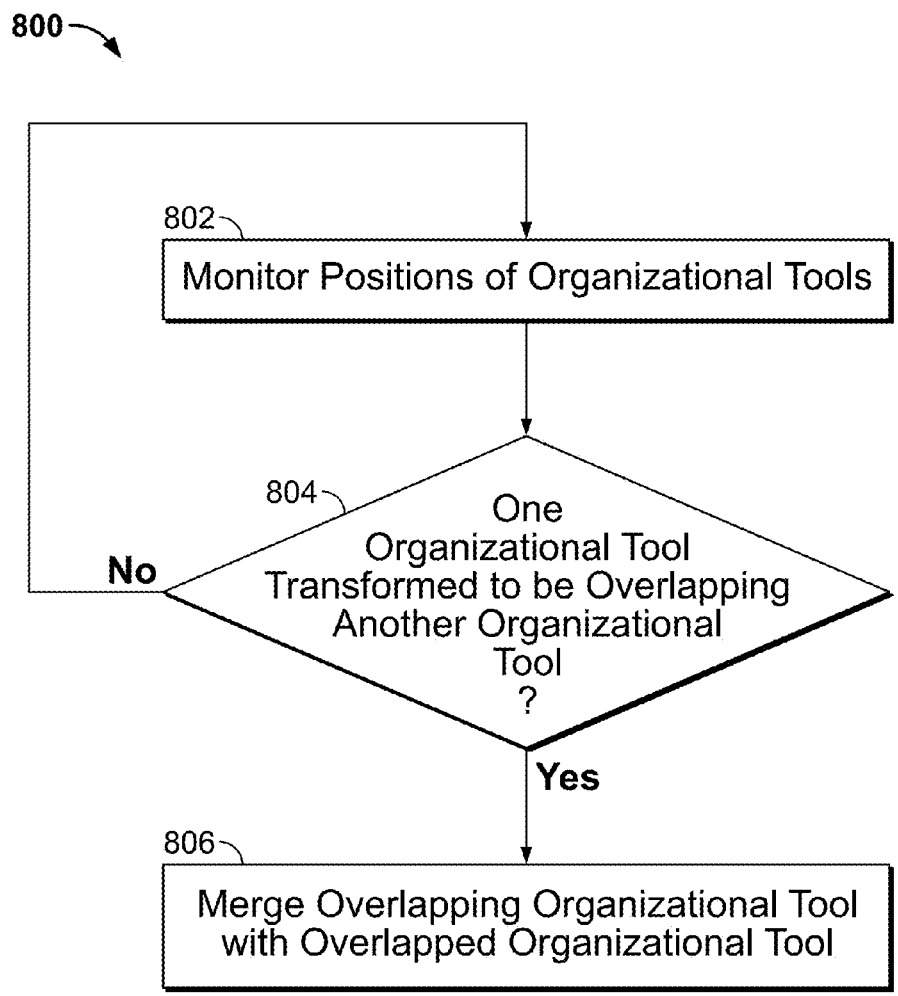
FIG. 8A is a flowchart of an example of a process for merging/composing two rectangular two-dimensional organizational tools.

FIG. 8A is a flowchart 800 of an example of a process for merging/composing two rectangular two-dimensional organizational tools. The process illustrated in flowchart 800 may be performed by, for example, the multi-touch display device 100 of FIGS. 1A-1K, the multi-touch display device 200 of FIGS. 2(a)-2(b), the multi-touch display device 300 of FIGS. 3(a)-3(b), the multi-touch display device 300 of FIGS. 4B-4E and 4G-4H, the multi-touch display device 510 of FIGS. 5B-5F, the multi-touch display device 600 of FIGS. 6A-6B, or the multi-touch display device 700 of FIGS. 7A-7B.

The multi-touch display device displays multiple organizational tools and monitors the position of each organizational tool (802). When the multi-touch display device manipulates one or more organizational tools, the multi-touch display device determines whether the translated organizational tool overlaps any other organizational tool(s) (804). If the multi-touch display device determines that the translated organizational tool does not overlap any other organizational tool(s), the multi-touch display device continues to monitor the position of each organizational tool. In contrast, when the multi-touch display device determines the translated organizational tool does overlap an organizational tool, multi-touch display device merges or composes the translated organizational tool with the overlapped organizational tools(s) (806).

In certain implementations, the multi-touch display device will compose the overlapping organizational tool with the overlapped organizational tool. To compose two or more overlapping organizational tools, the multi-touch display device, in effect, attaches the overlapping organizational tool to the overlapped organizational tool, similar to the way previously described multi-touch display devices attach an object to an organizational tool. When multi-touch display device 810 composes two or more organizational tools, multi-touch display device 810 maintains the existence of each of the organizational tools, but creates a relationship between them. Thus, because multi-touch display device 810 maintains the existence of each of the organizational tools, multi-touch display device 810 may separate two or more composed organizational tools.

Figure 8B:
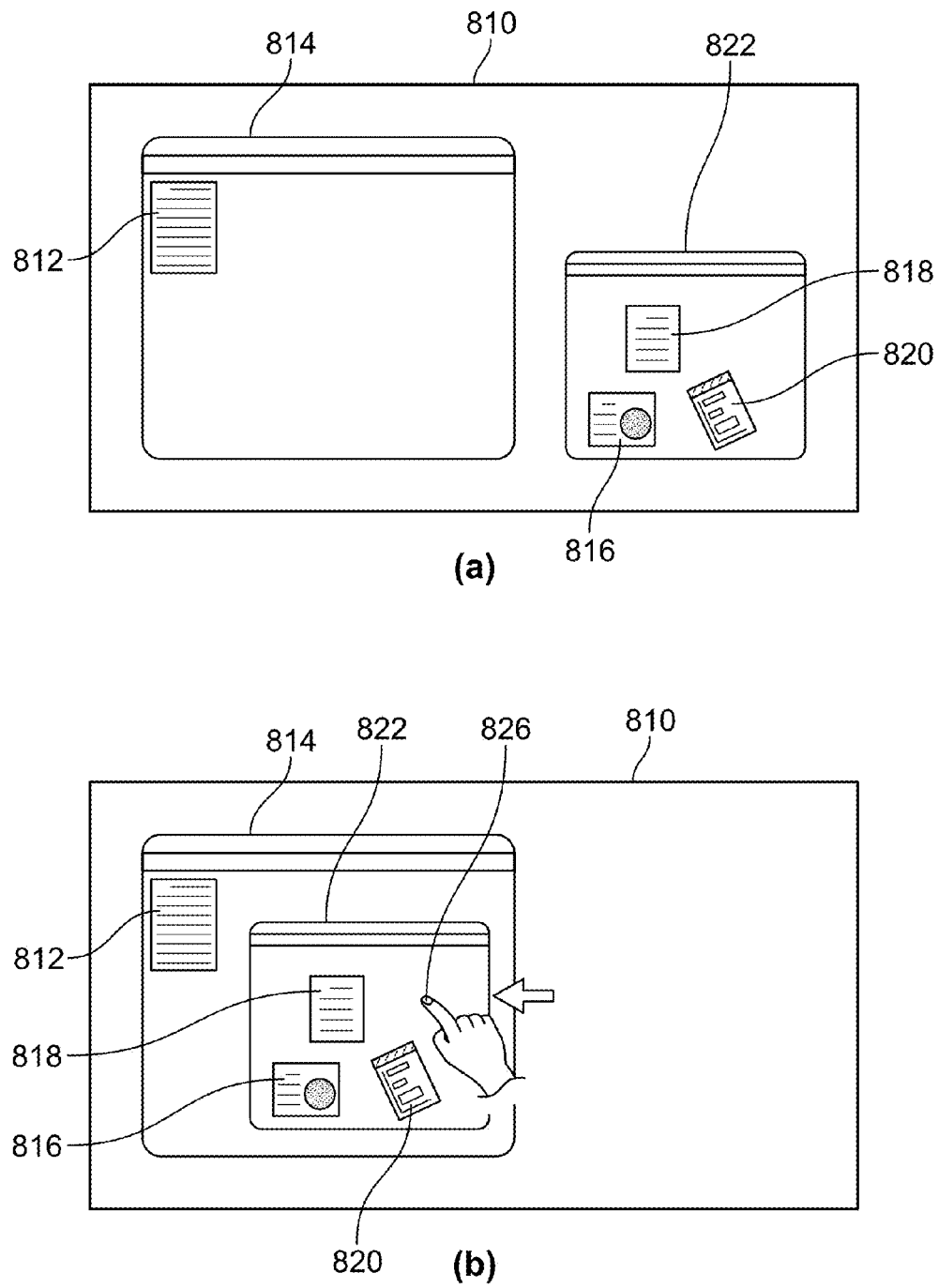
FIG. 8B is a diagram illustrating a multi-touch display device composing two overlapping organizational tools and detaching two composed organizational tools.
Figure 8B:
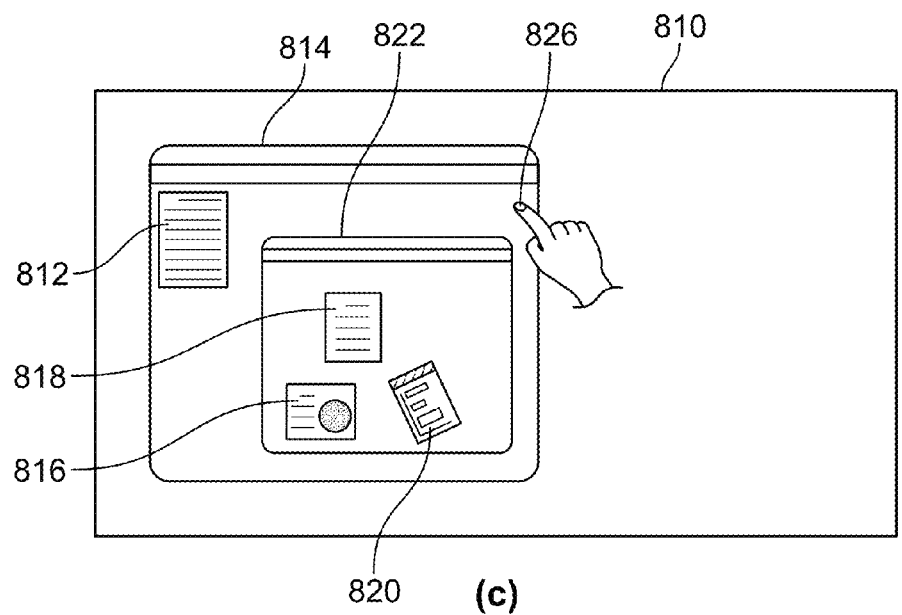
Figure 8B:
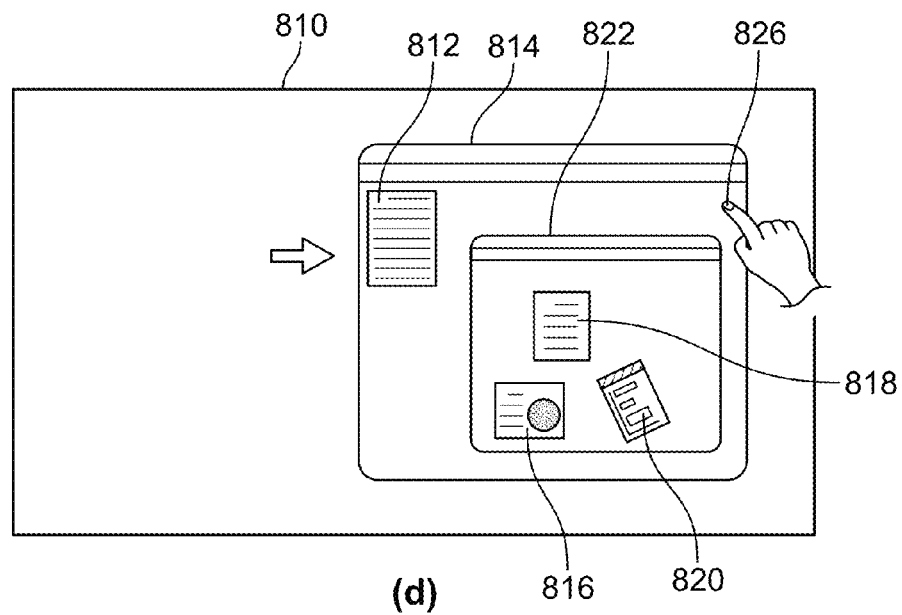
Figure 8B:
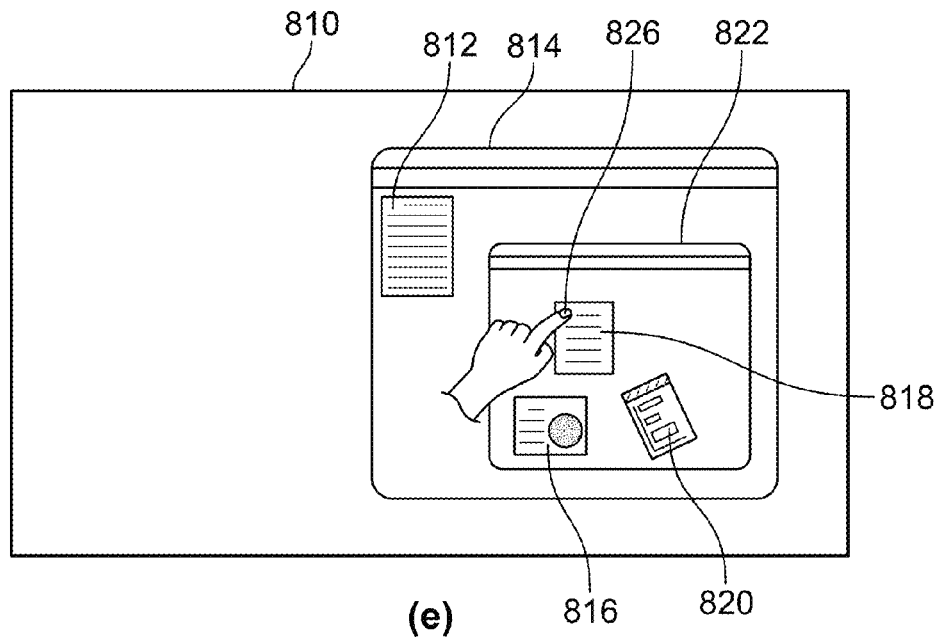
Figure 8B:
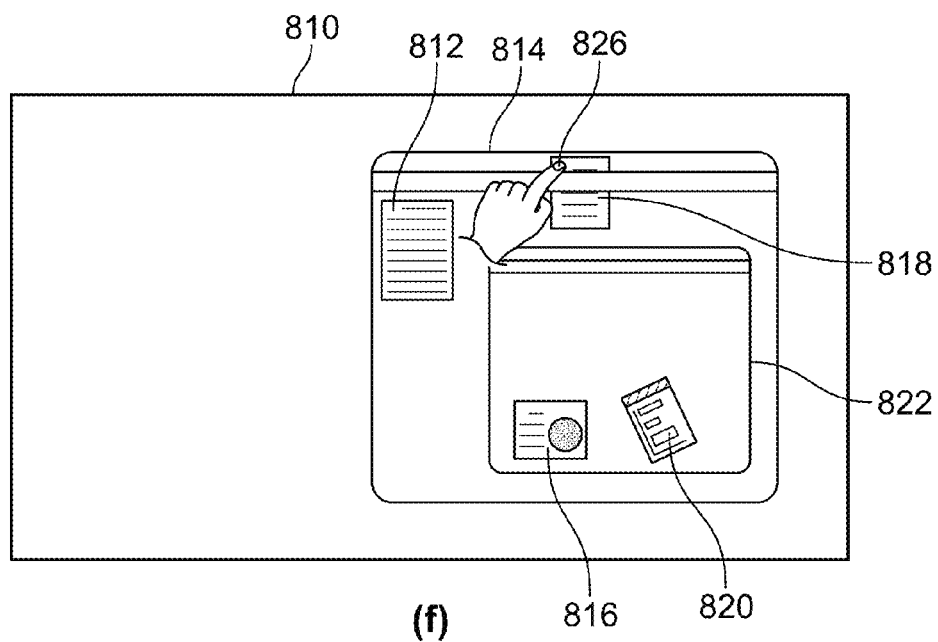
Figure 8B:
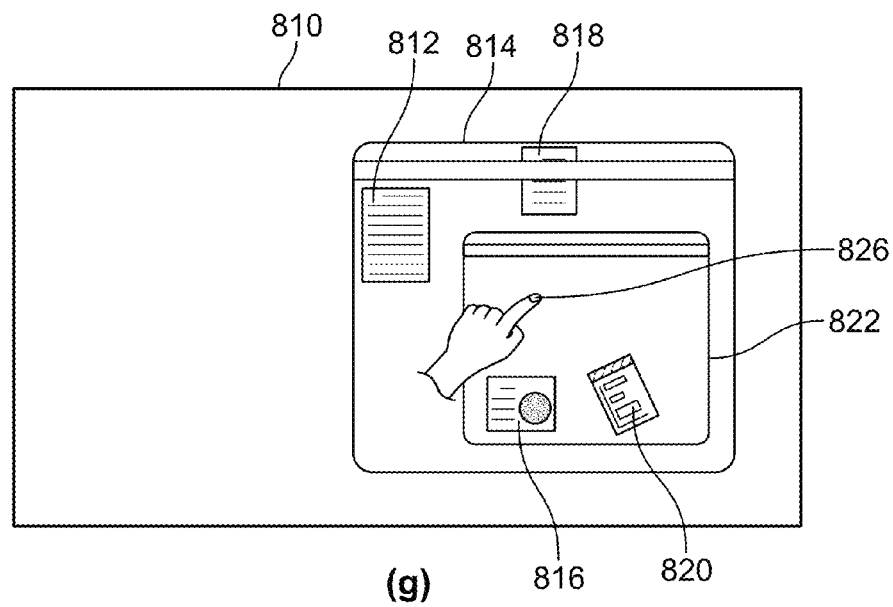
Figure 8B:
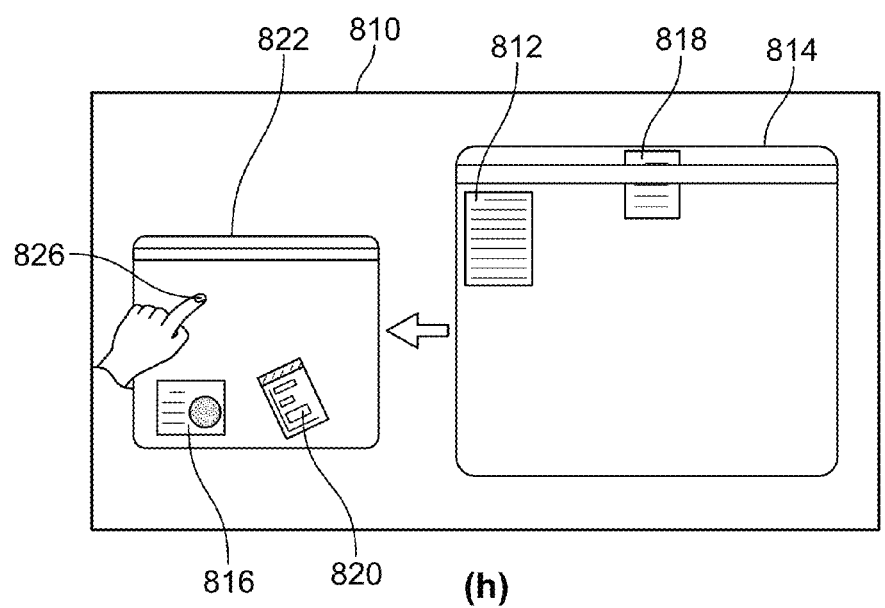

FIG. 8B illustrates a multi-touch display device composing two overlapping organizational tools and detaching two composed organizational tools. Referring to FIG. 8B(a), multi-touch display device 810 displays object 812 as attached to organizational tool 814, and objects 816, 818, and 820 as attached to organizational tool 822. As illustrated in FIG. 8B(b), a user has engaged the surface of multi-touch display device 810 with finger 826 at a point corresponding to organizational tool 822 and drags finger 826 across the surface of the screen. The multi-touch display device 810 detects the movement of finger 826, and translates organizational tool 822 to a point where organizational tool 822 overlaps organizational tool 814 in response. In this example, determining that organizational tool 822 overlaps organizational tool 814, multi-touch display device 810 composes organizational tool 822 with organizational tool 814. Thereafter, because organizational tool 822 is composed with organizational tool 814, multi-touch display device 810 translates organizational tool 822 along with organizational tool 814.

FIGS. 8B(c)-8B(d) illustrate transformations being applied to organizational tool 814. In FIG. 8B(c), a user has engaged the surface of multi-touch display device 810 with finger 826 at a point corresponding to organizational tool 814 and is dragging his finger along the multi-touch display device 810 in a rightward direction from a first point, as shown in FIG. 8B(c), to a second point, as shown in FIG. 8B(d). Multi-touch display device 810 detects this input by finger 826, associates the input with organizational tool 814, interprets the input as a request to translate organizational tool 814 by a distance corresponding to the distance from the first point to the second point, and translates organizational tool 814 by the detected distance of some function of the detected distance. Furthermore, because organizational tool 822 is composed with organizational tool 814, organizational tool 822, multi-touch display device 810 translates organizational tool 822 along with organizational tool 814, as shown in FIG. 8B(d).

FIGS. 8B(e)-8B(f) illustrate transition of an object between two composed organization tools. In FIG. 8B(e), a user has engaged the surface of multi-touch display device 810 with finger 826 at a first point corresponding to object 818. Multi-touch display device 810 detects the input of finger 826, associates the detected input with object 818, and determines whether any future movement of the detected input should trigger the detachment of object 818 from organizational tool 822. In this example, multi-touch display device 810 determines that future movement of the detected input should trigger the detachment of object 818.

Thereafter, as shown in FIG. 8B(f), the user drags finger 826 upward, from the first point to a second point, and disengages the surface of multi-touch display device 810. In response to detecting the movement of finger 826, multi-touch display device 810 translates object 818 by a distance corresponding to the distance from the first point to the second point, and detaches object 818 from organizational tool 822. However, in response to detecting that finger 826 has disengaged the surface of multi-touch display device 810, multi-touch display device 810 determines whether object 818 is overlapping any of the displayed organizational tools. As a consequence of detecting that object 818 overlaps organizational tool 814, multi-touch display device 810 then determines whether object 818 should be attached to organizational tool 814. In this example, multi-touch display device 810 determines that object 818 should be attached to organizational tool 814. Therefore, multi-touch display device 810 attaches object 818 to organizational tool 814.

Once stated differently, multi-touch display device 810 has ceased the relationship between object 818 and organizational tool 822, but created a relationship between object 818 and organizational tool 814. Thus, as shown in FIGS. 8B(g)-8B(h), if organizational tool 822 is transformed, apart from organizational tool 814, multi-touch display device 810 will not apply any corresponding transformations to object 818. In FIG. 8B(g), a user has engaged the surface of multi-touch display device 810 with finger 826 at a first point corresponding to organizational tool 822. Multi-touch display device 810 detects the input of finger 826, associates the detected input with organizational tool 822, and determines whether any future movement of the detected input should trigger the detachment of organizational tool 822 from organizational tool 814. In this example, multi-touch display device 810 determines that future movement of the detected input should trigger the detachment of organizational tool 822.

Thereafter, as shown in FIG. 8B(h), the user drags finger 826 leftward across the surface of multi-touch display device 810 from the first point to a second point. In response to detecting the movement of finger 826, multi-touch display device 810 translates organizational tool 822 a distance corresponding to the distance from the first point to the second point and detaches organizational tool 822 from organizational tool 814. Because multi-touch display device has detached object 818 from organizational tool 822, and subsequently attached object 818 to organizational tool 814, the translation of organizational tool 822 may have no visual effect on object 818.

In other implementations, the multi-touch display device will merge the overlapping organizational tool with the overlapped organizational tool. To merge two or more overlapping organizational tools, the multi-touch display device, in effect, dissolves the overlapping organizational tool into the overlapped organizational tool, such that the objects attached to the overlapping organizational tool are then attached to the overlapped organizational tool in a similar manner. When multi-touch display device 810 merges two or more organizational tools, multi-touch display device 810 deletes the overlapping organizational tool(s). Thus, because multi-touch display device 810 deletes the overlapping organizational tool(s), multi-touch display device 810 cannot separate merged organizational tools. Instead, multi-touch display device 810 provides the capability of splitting the overlapped organizational tool into multiple organizational tools.

Figure 8C:
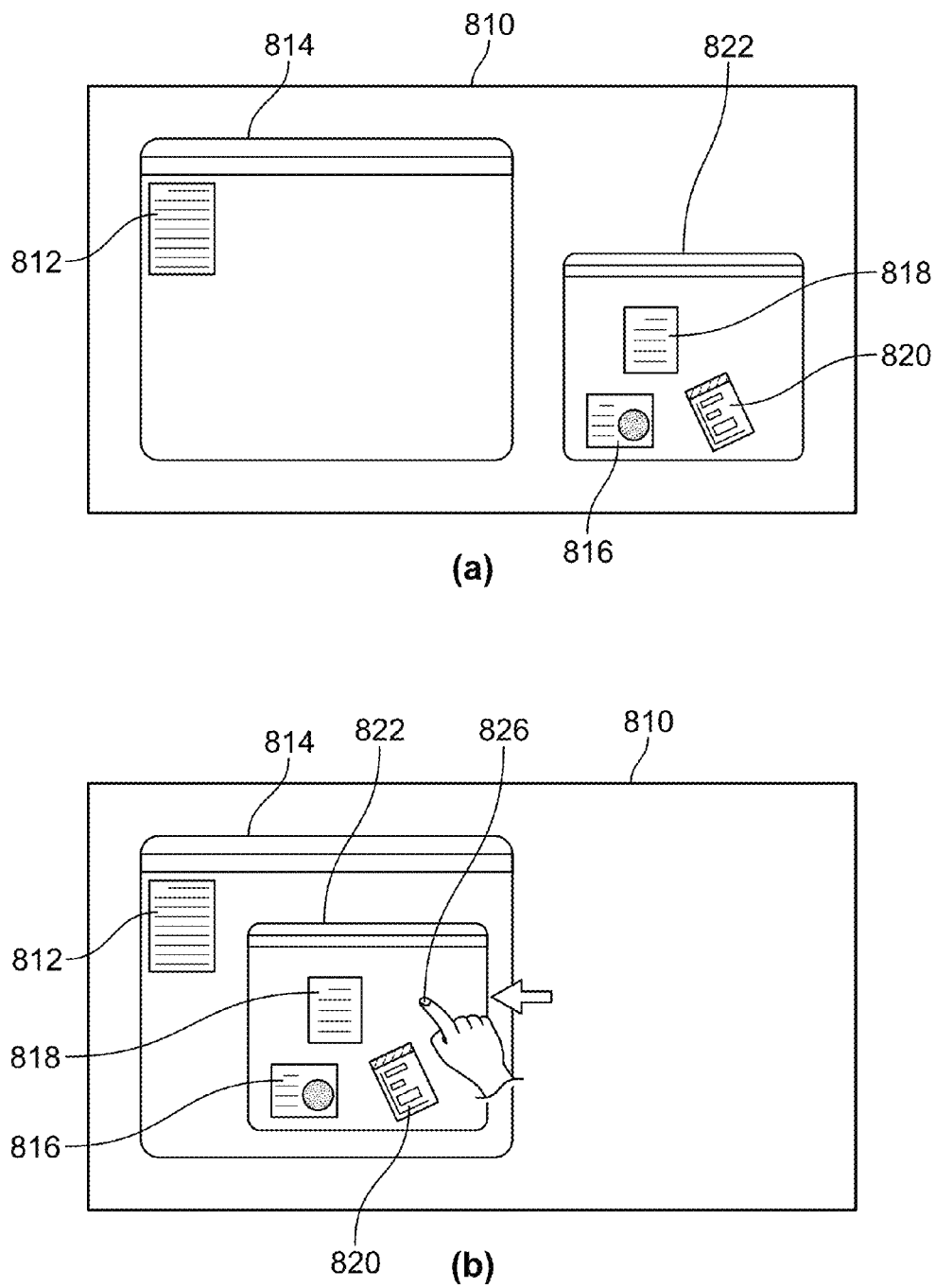
FIG. 8C is a diagram illustrating a multi-touch display device merging two overlapping organizational tools and splitting the single, merged organizational tool into multiple separate organizational tools.
Figure 8C:
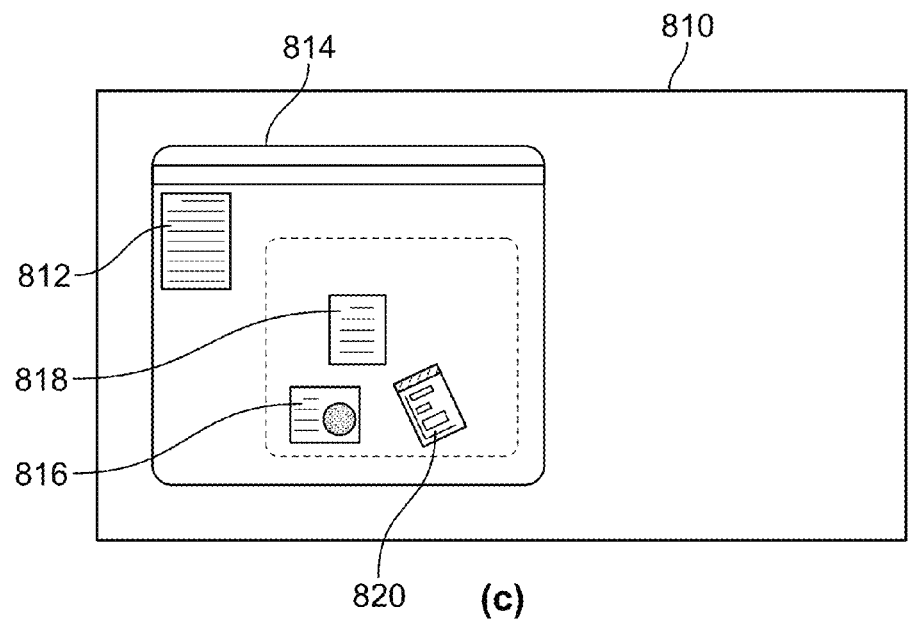
Figure 8C:
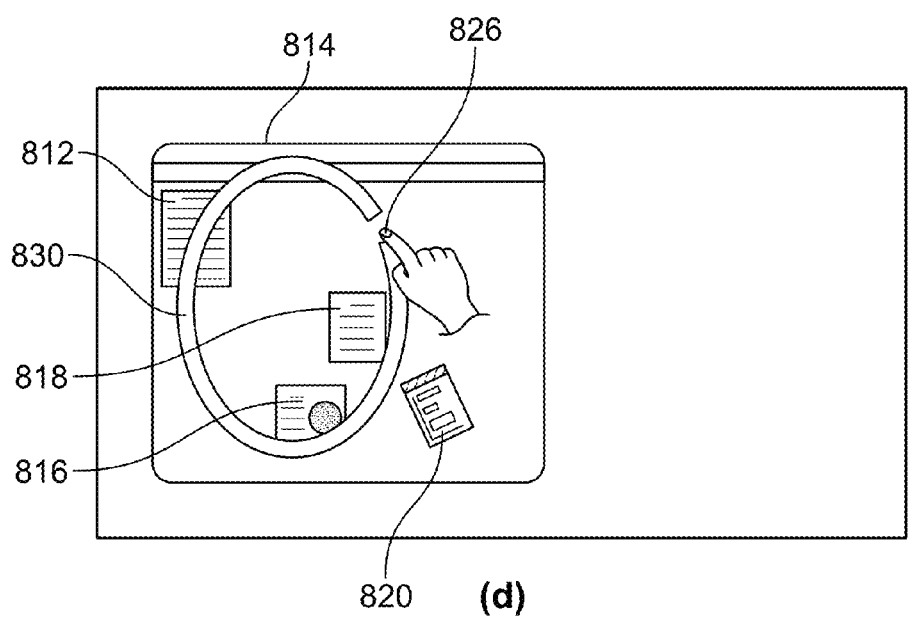
Figure 8C:
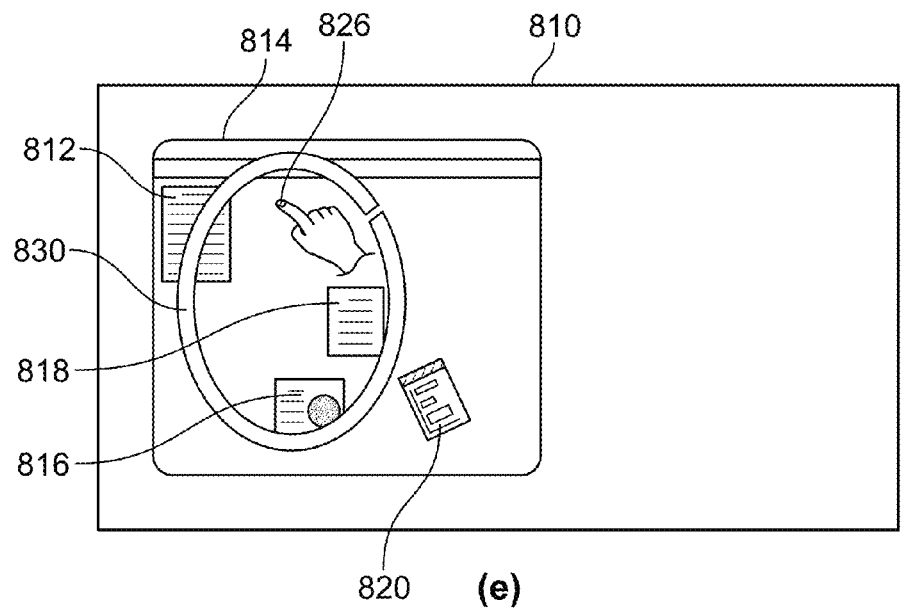
Figure 8C:
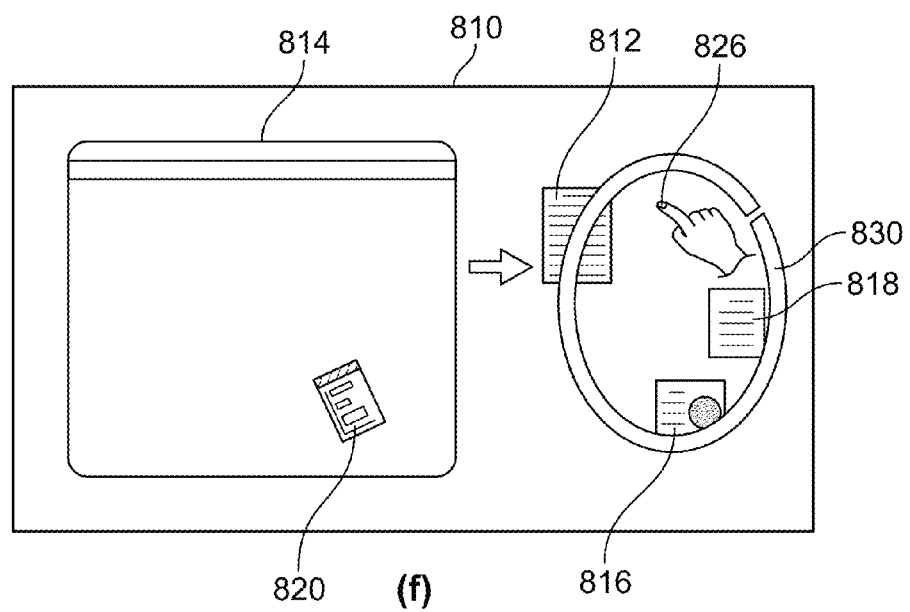
Figure 8C:
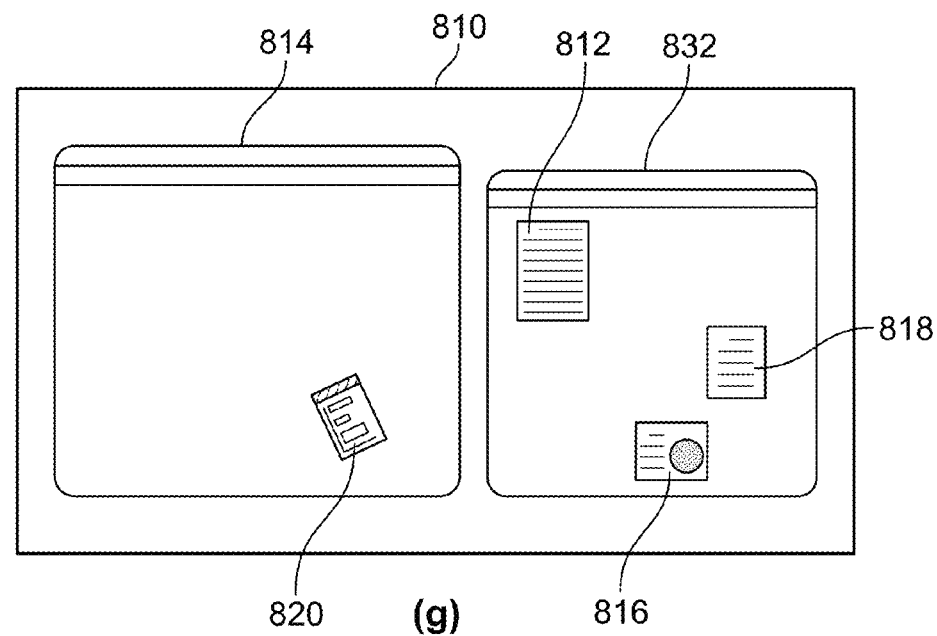
Figure 8C:
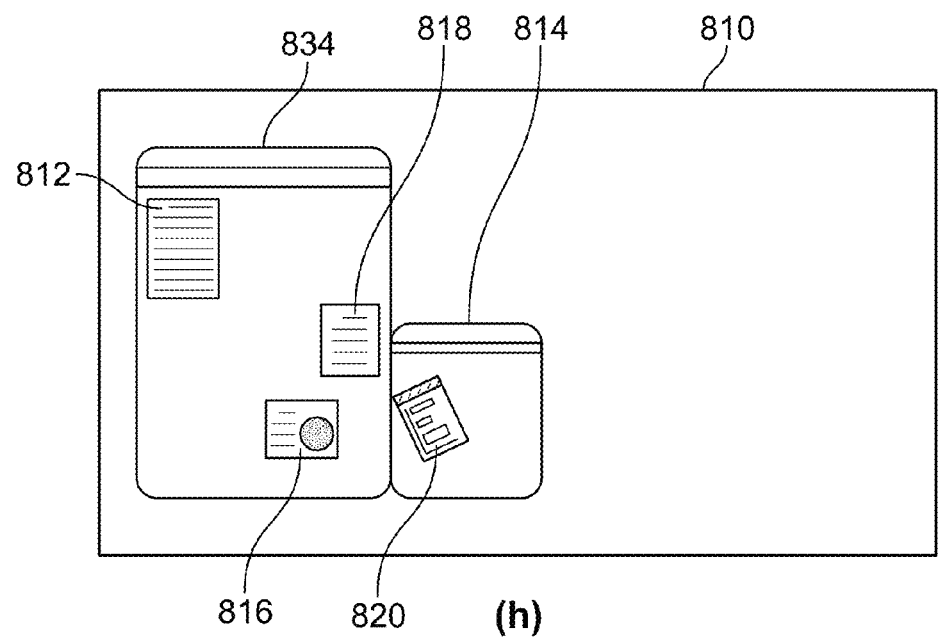
Figure 8C:
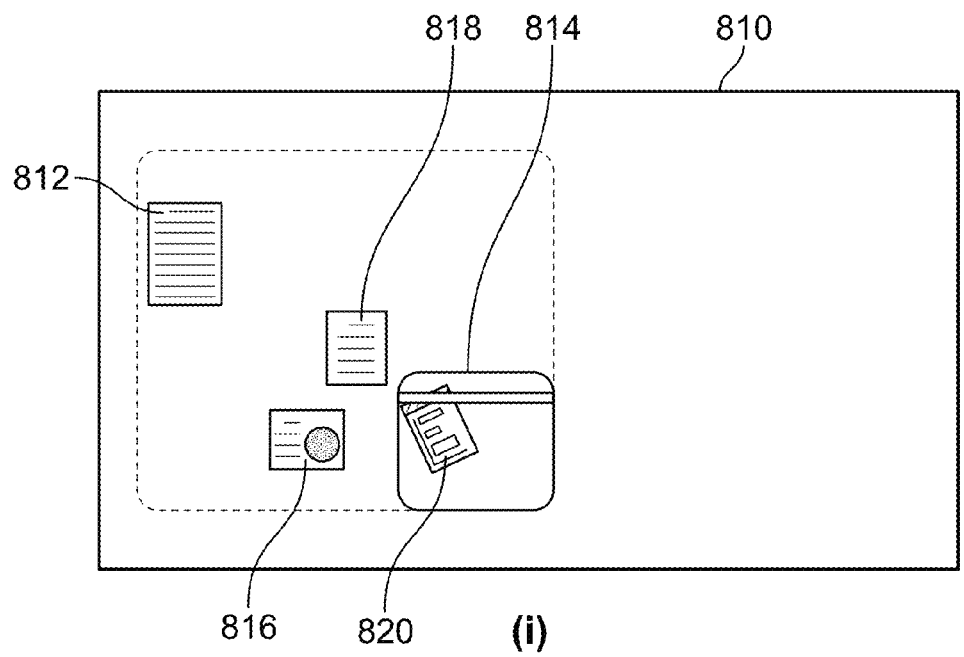

FIG. 8C illustrates a multi-touch display device merging two overlapping organizational tools and splitting the single, merged organizational tool into multiple separate organizational tools. Referring to FIG. 8C(a), multi-touch display device 810 object 812 attached to organizational tool 814, and objects 816, 818, and 820 to organizational tool 822. As illustrated in FIG. 8C(b), a user has engaged the surface of multi-touch display device 810 with finger 826 at a point corresponding to organizational tool 822 and drags finger 826 across the surface of the screen. The multi-touch display device 810 detects the movement of finger 826, and translates organizational tool 822 to a point where organizational tool 822 overlaps organizational tool 814 in response. In this example, determining that organizational tool 822 overlaps organizational tool 814, multi-touch display device 810 merges organizational tool 822 with organizational tool 814. As illustrated in FIG. 8C(c), because organizational tool 822 is merged with organizational tool 814, multi-touch display device 810 deletes organizational tool 822, and attaches objects 816, 818, and 820 to organizational tool 814 in the same manner in which they were attached to organizational tool 822.

In certain instances, a user may desire to split organizational tool 814 into multiple separate organizational tools. In order to separate organizational tool 814, multi-touch display device 810 may determine a group of objects to separate from organizational tool 814, and, in some instances, attach to a new, separate organizational tool. By separating a group of objects from organizational tool 814 concurrently, multi-touch display device 810 is providing a more efficient method than first creating a new organizational tool, followed by individually detaching each desired object from organizational tool 814 and attaching it to the new organizational tool.

FIG. 8C(d) illustrates one example of how multi-touch display device 810 may determine which objects to include in the group to be separated from organizational tool 814. A user has engaged the surface of multi-touch display device 810 with finger 826 at a point corresponding to organizational tool 814. Multi-touch display device 810 detects the input of finger 826, associates the detected input with organizational tool 814, and interprets the input as a request to separate organizational tool 814. The user drags finger 826 in a circle around a portion of organizational tool 814. In order to provide the user a visual indication of what portion of organizational tool 814 the user has selected, multi-touch display device 810 displays an annotation 830 corresponding to where the input of finger 826 has been detected.

FIGS. 8C(e)-8C(i) illustrate three variations of separating organizational tool 814 and/or objects attached to organizational tool 814. In some implementations, multi-touch display device 810 may detect the input from finger 826, and select those objects attached to organizational tool 814 that come in contact or are interior to the detected circular input. Stated differently, multi-touch display device 810 selects the objects 812, 818, and 820 that have been "lassoed" by the detected input, displayed as annotation 830.

With reference to FIG. 8C(e)-8C(g), in certain implementations, finger 826 may disengage the surface of multi-touch display device 810 after completing the desired selection. Therefore, after an initial disengagement of the detected input, multi-touch display device 810 maintains the display of annotation 830 and the selection of objects 812, 818, and 820, while monitoring for a subsequent input directing multi-touch display device 810 what to do with selected objects 812, 818, and 820. Thus, in FIG. 8C(e), finger 826 engages the surface of multi-touch display device 810 at a first point internal to the visual boundaries of annotation 830. Multi-touch display device 810 detects the input, and associates it with the selected objects 812, 818, and 820 and annotation 830.

In FIG. 8C(f), as the user drags finger 826 rightward across the surface of organizational tool 810, from the first point to a second point, multi-touch display device 810 detects the movement of finger 826, and translates the selected objects 812, 818, and 820 and annotation 830 a distance corresponding to the distance from the first point to the second point, where objects 812, 818, and 820 and annotation 830 do not overlap organizational tool 814. Referring to FIG. 8C(g), once finger 826 disengages the surface, multi-touch display device 810 creates a new organizational tool 832 of a proper size and shape and at a proper position to accommodate the selected objects. Once organizational tool 832 has been created, multi-touch display device 810 attaches selected objects 812, 818, and 820 to organizational tool 832. Concurrently, upon detecting the disengagement of finger 826, multi-touch display device 810 deletes annotation 830.

Alternatively, in FIG. 8C(h), upon detecting an initial disengagement of finger 826 after objects 812, 818, and 820 have been visually "lassoed," multi-touch display device 810 creates a new organizational tool 834 of a proper size and shape to accommodate selected objects 812, 818, and 820 at the point where objects 812, 818, and 820 have been visually "lassoed." In certain implementations, multi-touch display device 810 resizes organizational tool 814 so as to only occupy the space necessary to display the object 816, which was not selected. In other implementations, multi-touch display device 810 deletes organizational tool 814 altogether and creates another new organizational tool of a proper size and shape to accommodate non-selected object 816.

Alternatively, in FIG. 8C(i), upon detecting an initial disengagement of finger 826 after objects 812, 818, and 820 have been visually "lassoed," multi-touch display device 810 detaches the selected objects 812, 818, and 820 from organizational tool 814 and resizes organizational tool 814 so as to only occupy the space necessary to display the object 816, which was not selected.

Figure 9:
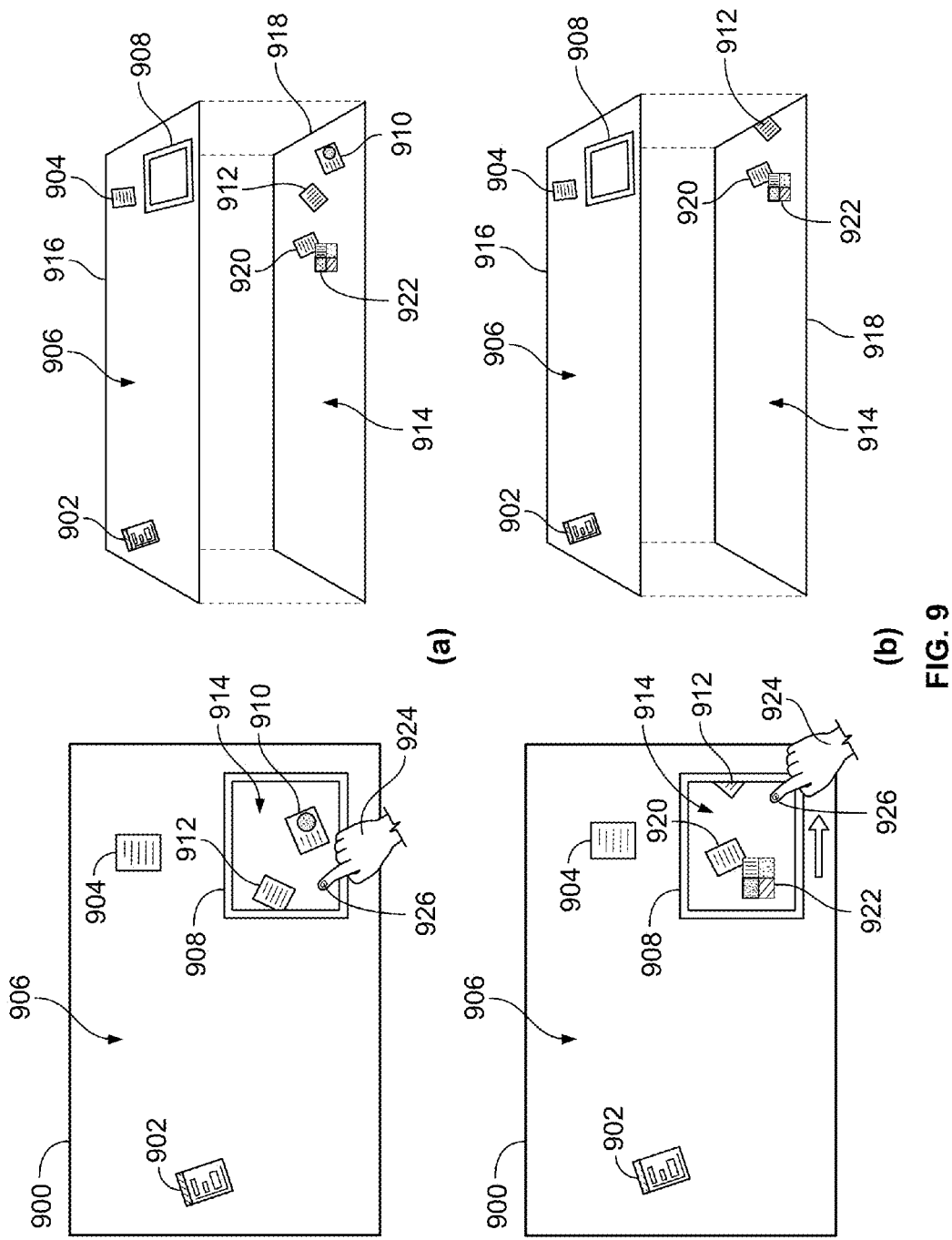
FIG. 9 is a diagram illustrating an alternative implementation of the rectangular two-dimensional organizational tool.
Figure 9:
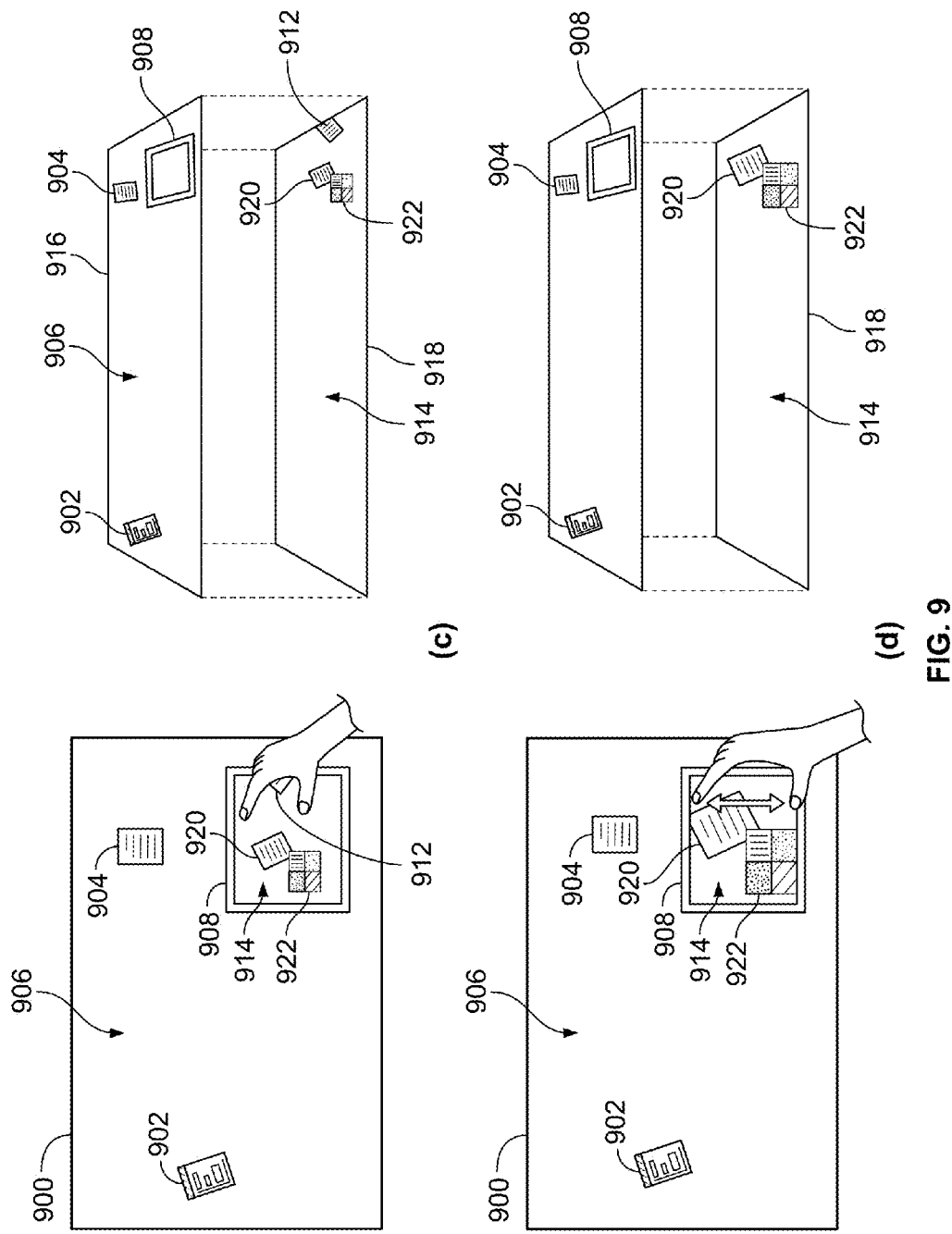

FIG. 9 illustrates an alternative implementation of the rectangular two-dimensional organizational tool. In this alternative implementation, the rectangular two-dimensional organizational tool may be implemented as a window through the canvas that provides a view into an organizational tool situated beneath (or behind) the canvas. In such an implementation, not only might the canvas be infinite workspace (or at least have an extent that is larger than the visual display of the multi-touch display device), but the organizational tool might provide a secondary, embedded infinite workspace (or at least have an extent that is larger than the visual display of the multi-touch display device). In effect, the multi-touch display device would operate as if there were two layers, wherein a lower layer further from the surface of the multi-touch display device may include the organizational tool and a higher layer closer to the surface of the multi-touch display device may include a canvass and a window through which to view the organizational tool.

FIG. 9(a) illustrates a multi-touch display device 900 displaying objects 902 and 904 associated with canvas 906. Multi-touch display device 900 also displays organizational tool 908 and objects 910 and 912 attached to organizational tool 914. Canvas 906, and therefore objects 902 and 904, and window 908, is on top of, or visually closer to the surface of multi-touch display device 900 than, organizational tool 914. Canvas 906 can be manipulated similar to any of the other canvasses described previously. Thus, canvas 906 may be shifted or resized, and objects 902 and 904, being associated with canvas 906, will be correspondingly shifted and resized. However, any manipulations of canvas 906, or the objects associated with it, may not affect organizational tool 914, or the objects attached to it. Furthermore, manipulations of canvas 906 may or may not affect the size and position of window 908.

Window 908 effectively provides a transparent area through which organizational tool 914 may be viewed and manipulated. Organizational tool 914 can be manipulated similar to any of the other organizational tools described previously. Thus, organizational tool 914 may be shifted or resized, and objects 910, 912, 920, and 922, being attached to organizational tool 914, will be correspondingly shifted and resized. However, only that area of organizational tool 914 directly "under" window 908 will be displayed by multi-touch display device 900. As a result, in FIG. 9(a), objects 920 and 922, are not displayed by multi-touch display device 900, because they are below canvas 906, which may be effectively opaque.

If a user wishes to view another portion of organizational tool 918, he may engage organizational tool 918 through window 908. For example, referring to FIG. 9(a), a user has engaged the surface of multi-touch display device 900 with finger 926 at a first point corresponding to window 908, and thus organizational tool 918. Multi-touch display device 900 detects the input of finger 926, associates the input with organizational tool 918. Referring to FIG. 9(b), as the user drags finger 926 across the multi-touch display device 900 in a leftward direction, from the first point to a second point, multi-touch display device 900 interprets the input as a request to translate organizational tool 918 by a distance corresponding to a distance from the first point to the second point, and translates organizational tool 918 by the detected distance or a function of the detected distance. Again, since objects 910, 912, 920, and 922 are attached to organizational tool 918, multi-touch display device 900 translates objects 910, 912, 920, and 922 along with organizational tool 918.

However, multi-touch display device 900 only displays that area of organizational tool 918 directly underneath window 908. Thus, as organizational tool 918 and objects 910, 912, 920, and 922 are translated, multi-touch display device 900 begins displaying objects 920 and 922 while ceasing to display object 910. Furthermore, since canvas 906 exists separately from organizational tool 918, these manipulations performed on the organizational tool 918 will not affect canvas 906 or the objects associated with it. Thus, canvas 906 and objects 902 and 904 remain unchanged from FIG. 9(a) to FIG. 9(b).

Likewise, a user may wish to change the scale of organizational tool 918. Referring to FIG. 9(c), a user has engaged the surface of multi-touch display device 900 with finger 926 and thumb 928 at a points corresponding to window 908, and thus organizational tool 918. Multi-touch display device 900 concurrently detects the inputs of finger 926 and thumb 928, and associates the inputs with organizational tool 918. Referring to FIG. 9(d), as the user drags finger 926 and thumb 928 away from each other across the multi-touch display device 900, multi-touch display device 900 interprets the input as a request to scale organizational tool 918, and scales the size of organizational tool 918 as a function of the movement of finger 926 and thumb 928. Again, since objects 910, 912, 920, and 922 are attached to organizational tool 918, multi-touch display device 900 scales objects 910, 912, 920, and 922 along with organizational tool 918.

Again, multi-touch display device 900 only displays that area of organizational tool 918 directly underneath window 908. Thus, as organizational tool and objects 910, 912, 920, and 922 are scaled, multi-touch display device 900 displays objects 920 and 922 larger while ceasing to display object 912. Furthermore, since canvas 906 exists separately from organizational tool 918, these manipulations performed on the organizational tool 918 will not affect canvas 906 or the objects associated with it. Thus, canvas 906 and objects 902 and 904 remain unchanged from FIG. 9(c) to FIG. 9(d).

One-Dimensional Linear Organizational Tool

As described above in connection with FIGS. 2(a)-2(b), a multi-touch display device may provide a one-dimensional linear organizational tool that enables manipulations similar to functionality provided by a clothes line or a short-order cook ticket line.

Figure 10:
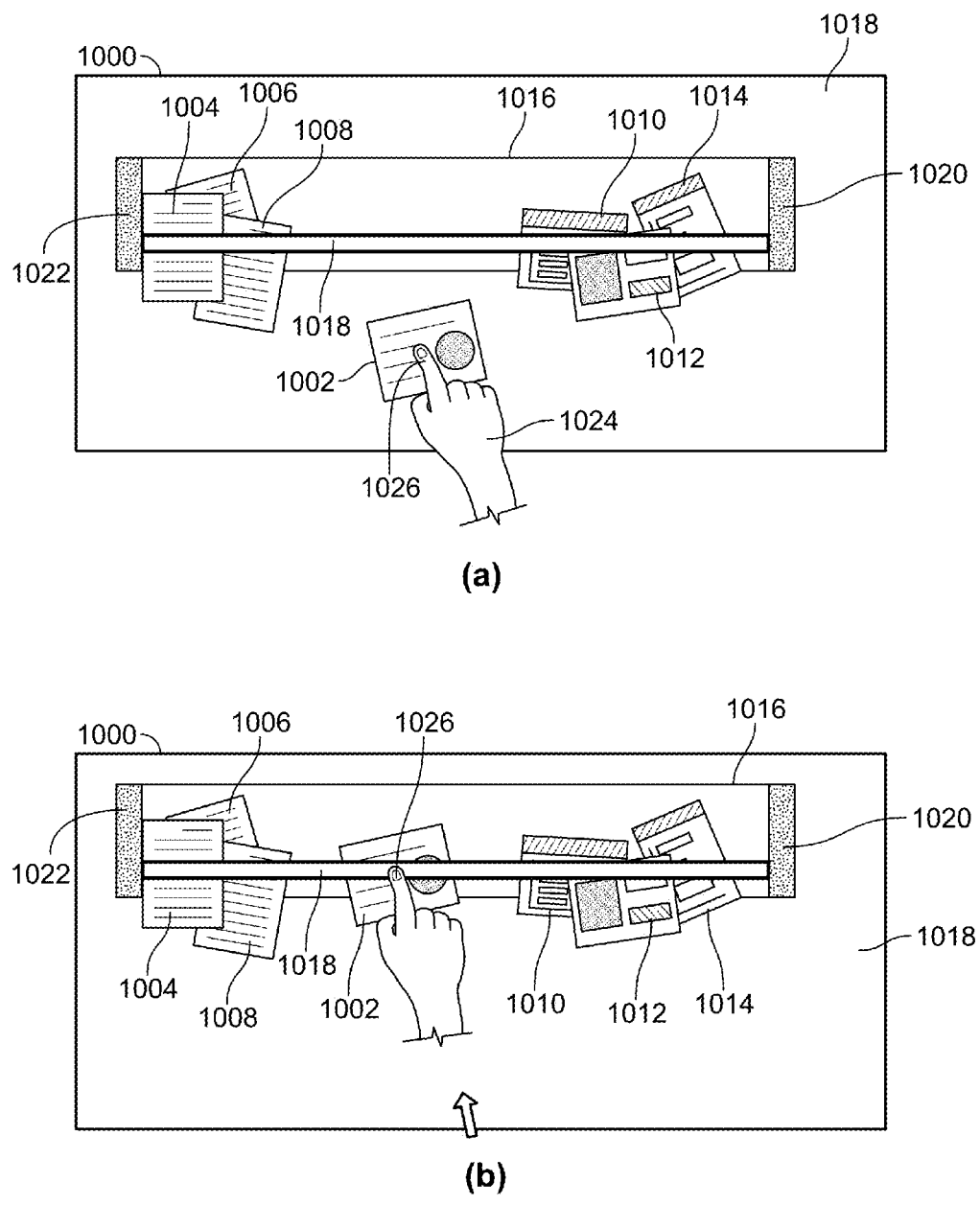
FIG. 10 is a diagram of a multi-touch display device that provides a one-dimensional linear organizational tool that illustrates techniques for attaching objects to the one-dimensional linear organizational tool.

FIG. 10 is a diagram of a multi-touch display device that provides a one-dimensional linear organizational tool that illustrates techniques for attaching objects to the one-dimensional linear organizational tool. In this example, multi-touch display device 1000 displays objects 1002, 1004, 1006, 1008, 1010, 1012, and 1014 and organizational tool 1016. Organizational tool 1016 includes an attachment strip 1018 and boundary handles 1020 and 1022. As described above, the extents of organizational tool 1016 and attachment strip 1018 may be greater than the visual display of organizational tool 1016. Boundary handles 1020 and 1022 define the boundaries of the visual display of organizational tool 1016, but the extent of organizational tool 1016 extends beyond boundary handles 1020 and 1022, even though the visual display of organizational tool 1016 is confined to the region between boundary handles 1020 and 1022. In effect, the greater extents of organizational tool 1016 and attachment strip 1018 allow for "off-screen" storage, such that multi-touch display device 1000 may reduce the area used to display organizational tool 1016 while, at the same time, preserving easy access to the objects attached to the organizational tool.

As illustrated in FIG. 10(a), objects 1004-1014 are attached to organizational tool 1016 through attachment strip 1018. Object 1002, meanwhile, remains unattached.

In FIG. 10(a), a user is engaging the surface of multi-touch display device 1000 with finger 1026 at a first point corresponding to object 1002. Multi-touch display device 1000 detects the input of finger 1026 and associates the detected input with object 1002.

Referring to FIG. 10(b), as the user drags finger 1026 across the surface from the first point to a second point, multi-touch display device 1000 detects the position of the finger 1026 and continuously updates the display of object 1002 to correspond with the detected position of finger 1026. Eventually, as a result of the detected motion of finger 1026, the multi-touch display device 1000 translates object 1002 by a distance corresponding to the distance from the first point to the second point, a position beneath attachment stripe 1018.

Subsequently, the user disengages finger 1026 from the surface of the multi-touch display device 1000, and the multi-touch display device detects that user 1024 has disengaged finger 1026 from the surface of multi-touch display device 1000. In response, the multi-touch display device determines whether object 1002 visually overlaps attachment strip 1018. Since object 1002 does visually overlap attachment strip 1018, multi-touch display device 1000 determines whether the disengagement of object 1002 triggers attachment of object 1002 to organizational tool 1016.

In certain implementations, the determination of whether the disengagement should trigger an attachment is based on a stored rule or set of rules. For example, a rule may specify that a disengagement of the surface while multi-touch display device 1000 concurrently detects a separate, continuous engagement of attachment strip 1018 will trigger an attachment of object 1002 to the organizational tool 1016. Alternatively or additionally, a rule may specify that a disengagement of the surface preceded by an engagement of the surface at a pressure greater that a predetermined threshold and at a point corresponding to where object 1002 overlaps the attachment strip 1018 will trigger an attachment of object 1002 to the organizational tool 1016. In this example, because finger 1026 disengaged the surface of multi-touch display device 1000 at a point corresponding to attachment strip 1018, multi-touch display device 1000 determines that object 1002 should be attached to organizational tool 1016. Therefore, multi-touch display device 1000 attaches object 1002 to organizational tool 1016.

Figure 11:
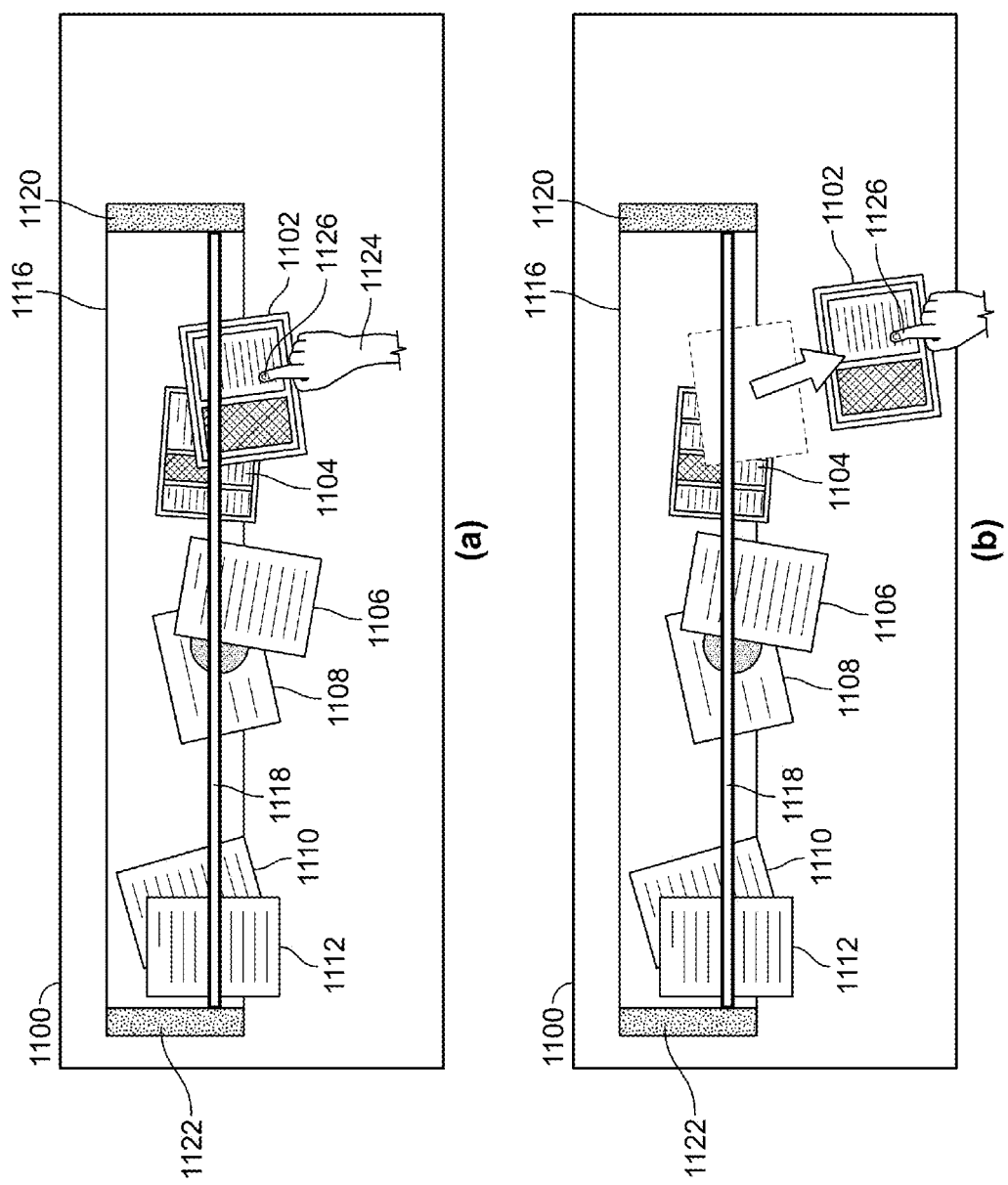
FIG. 11 is a diagram of a multi-touch display device that provides a one-dimensional linear organizational tool that illustrates techniques for detaching objects from the one-dimensional linear organizational tool
Figure 11:
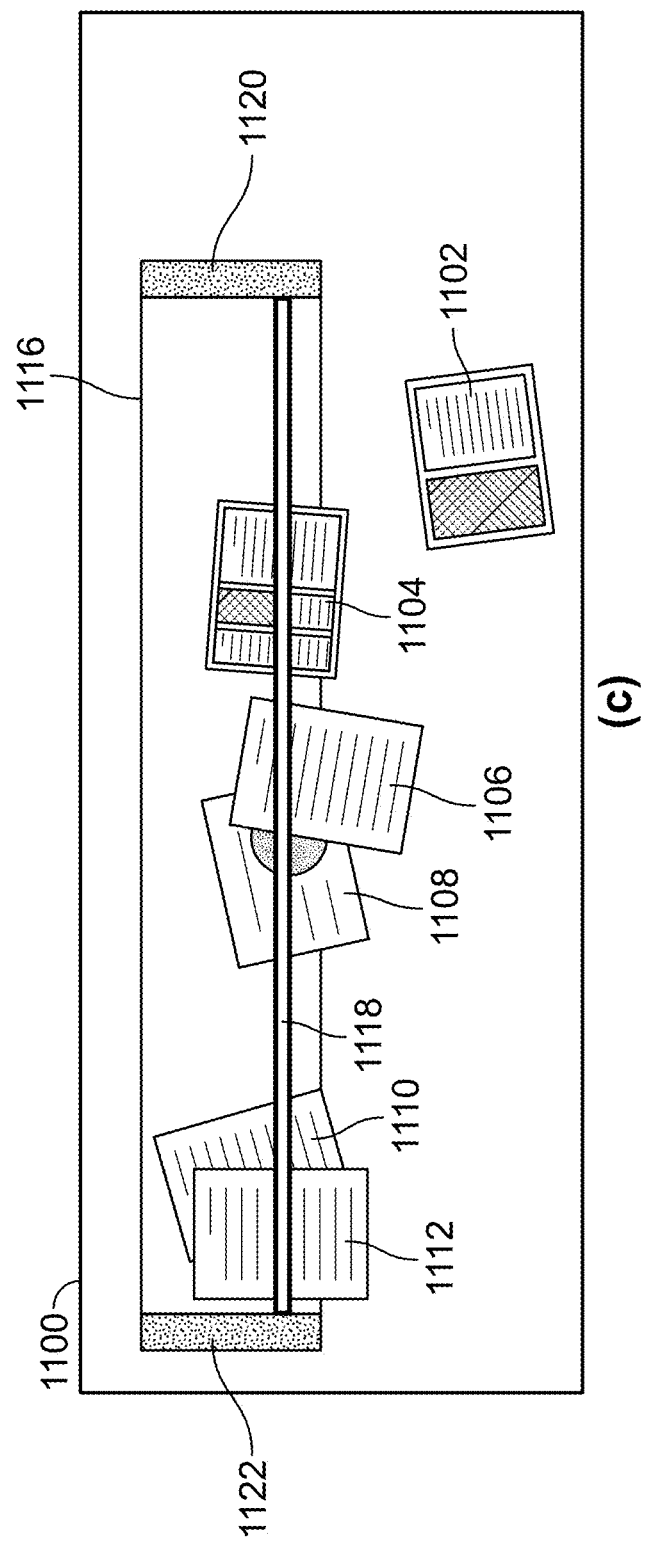

FIG. 11 is a diagram of a multi-touch display device that provides a one-dimensional linear organizational tool that illustrates techniques for detaching objects from the one-dimensional linear organizational tool. In this example, multi-touch display device 1100 displays objects 1102, 1104, 1106, 1108, 1110, and 1112 and organizational tool 1116. Organizational tool 1116 includes an attachment strip 1118.

Referring to FIG. 11(a), a user has engaged the surface of multi-touch display device 1100 with finger 1126 at a first point corresponding to object 1102. The multi-touch display device 1100 detects the input of finger 1126, and associates the input with object 1102.

After detecting the engagement of finger 1126, multi-touch display device 1100 determines whether any future movements of the finger 1126 should trigger a detachment of object 1102. In this example, multi-touch display device 1100 determines that object 1102 should be detached from organizational tool 1116. Thereafter, in reference to FIG. 11(b), the user drags finger 1126 across the surface of the multi-touch display device 1100 in a downward motion from the first point to a second point. In response to detecting the movement of finger 1126, multi-touch display device 1100 translates object 1102 by a distance corresponding to the distance from the first point to the second point. In some implementations, multi-touch display device 1110 detaches object 1102 from organizational tool 1116 when multi-touch display device 1100 detects that finger 1126 disengages the surface of multi-touch display device 1100 and determines that object 1102 no longer overlaps organizational tool 1116, as shown in FIG. 11(c).

As described above, a multi-touch display device may automatically adjust the angular orientation of an object upon attaching the object to an organizational tool. For example, in one implementation, the multi-touch display device may automatically adjust the angular orientation of an object upon attaching the object to the multi-touch display device such that the angular orientation of the object is consistent with the angular orientation of objects already attached to the organizational tool, irrespective of the angular orientation of the organizational tool itself. Alternatively, the multi-touch display device may automatically adjust the angular orientation of an object upon attaching the object to the multi-touch display device such that the angular orientation of the object is consistent with the angular orientation of the organizational tool itself.

Figure 12A:
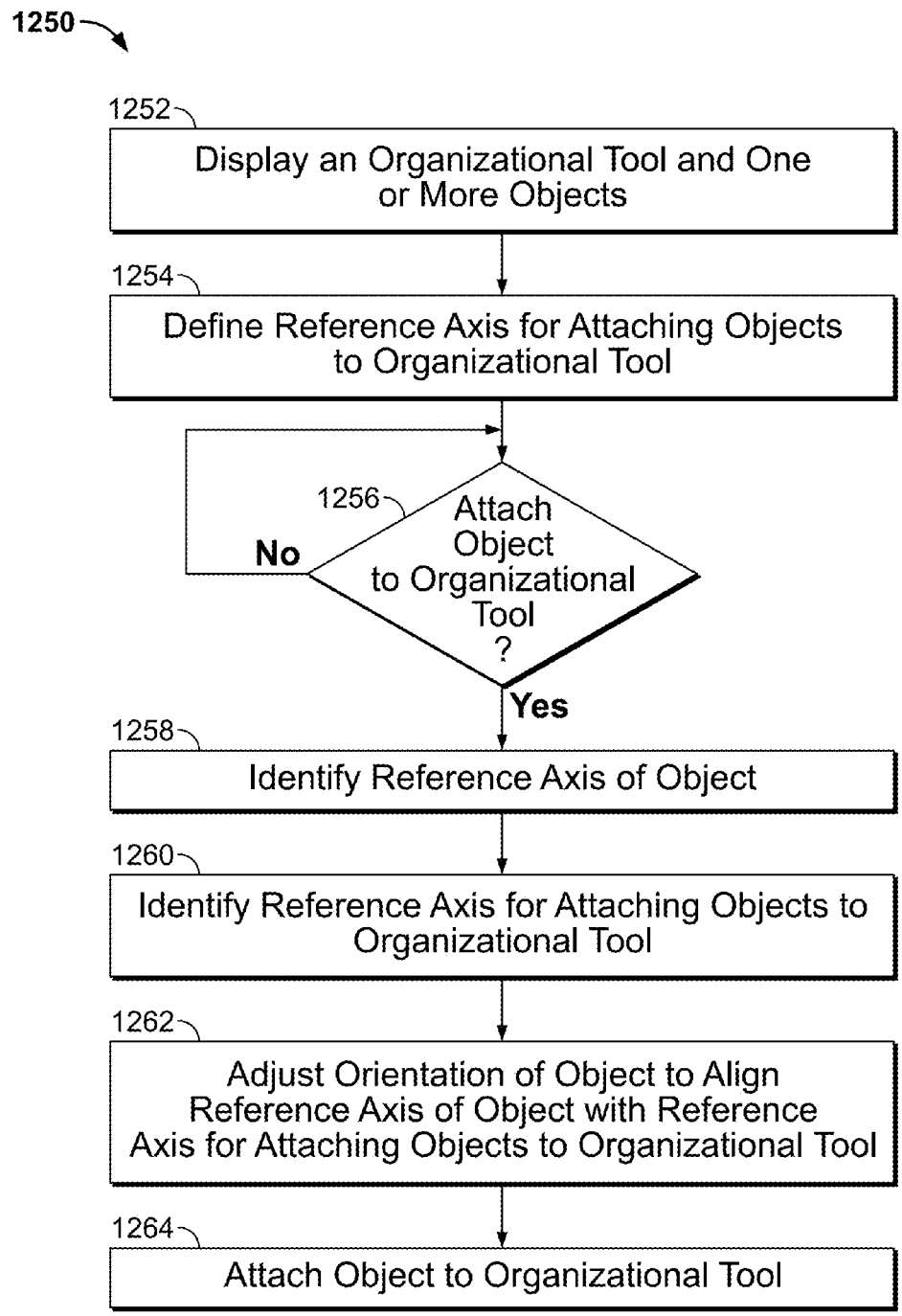
FIG. 12A is a flowchart of an example of a process for organizing objects attached to a linear one-dimensional organizational tool.

FIG. 12A is a flowchart 1250 of an example of a process for organizing objects attached to a linear one-dimensional organizational tool. The process illustrated in flowchart 1250 may be performed by, for example, the multi-touch display device 1000 of FIGS. 10(*a*)-10(*b*) or the multi-touch display device 1100 of FIGS. 11(*a*)-11(*c*).

The multi-touch display device displays an organizational tool and one or more objects (1252), and defines a reference axis for attaching objects to the organizational tool (1254). The multi-touch display device continuously determines whether the one or more objects being displayed should be attached to the organizational tool (1256). The multi-touch touch display device may make the attachment determination in a manner similar to those discussed above with regard to FIGS. 4A-4G and 10(*a*)-10(*b*).

If the multi-touch display device determines that one or more of the displayed objects should be attached to the organizational tool, the multi-touch display device identifies the reference axis of each object to be attached to the organizational too (1268). In some implementations, the multi-touch display device may determine the reference axis based on a vertical and/or horizontal axis of the object, stored and updated by the multi-touch display device. Alternatively, the multi-touch display device may determine the reference axis based on a comparison of multiple predetermined points of the object with regard to multiple predetermined points of the display surface of the multi-touch display device. Alternatively, the multi-touch display device determine the reference axis by detecting an input from a user indicating the reference axis. The multi-touch display device identifies the defined reference axis for attaching objects to the organizational tool (1260).

Next, the multi-touch display device adjusts the orientation of each object that is being attached to the organizational tool, such that the reference axes of the attached objects align with the defined reference axis for attaching objects to the organizational tool (1262). Once the multi-touch display device adjusts the object(s), the multi-touch display device attaches the object(s) to the organizational tool (1264).

Figure 12B:
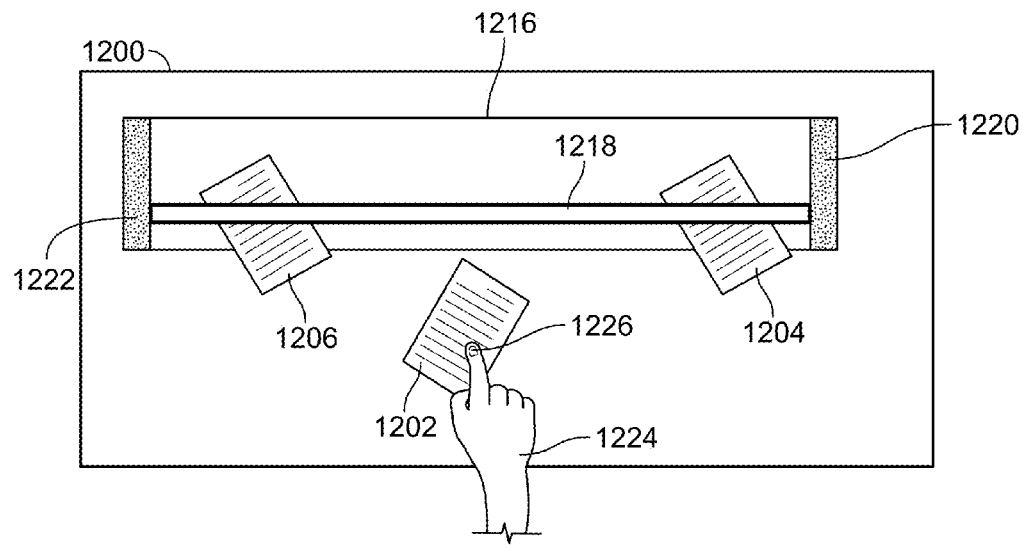
FIGS. 12B and 12C are diagrams of a multi-touch display device that illustrate two different examples the multi-touch display device automatically adjusting the angular orientation of an object upon attaching the objects to a one-dimensional linear organizational tool.
Figure 12B:
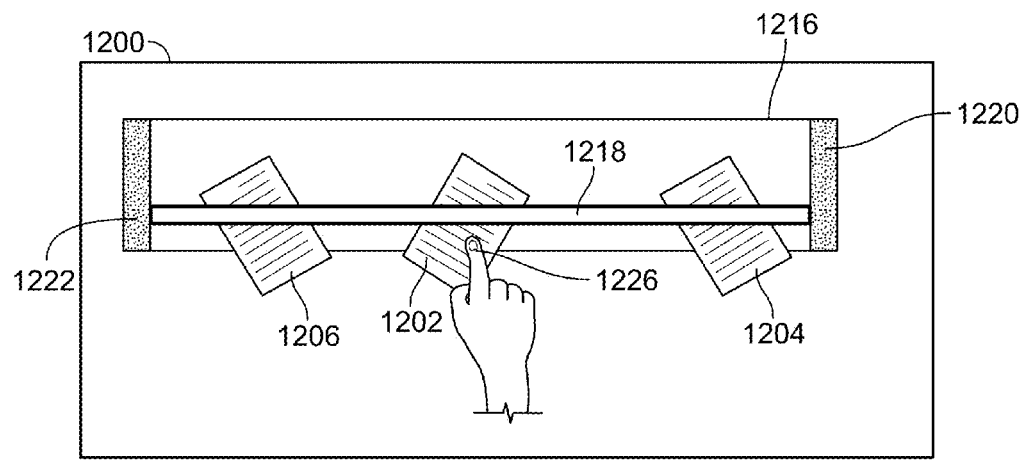
Figure 12B:
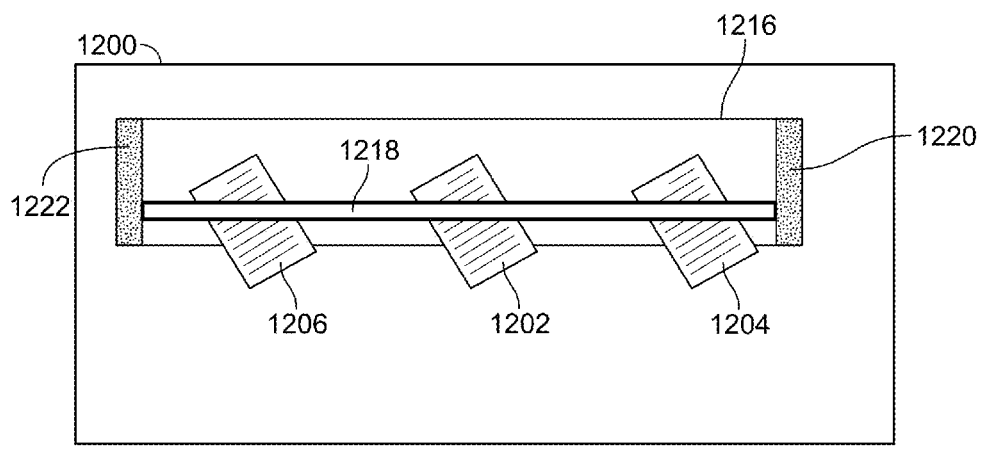
Figure 12C:
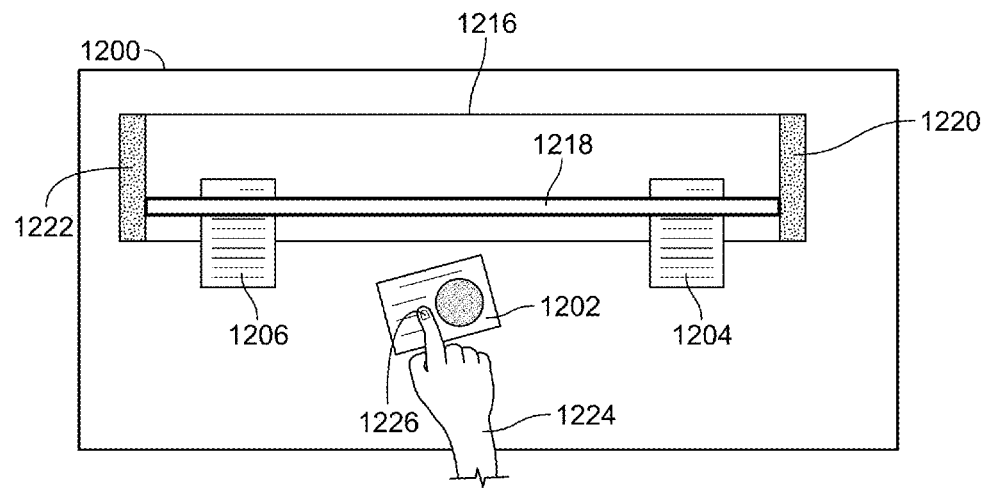
Figure 12C:
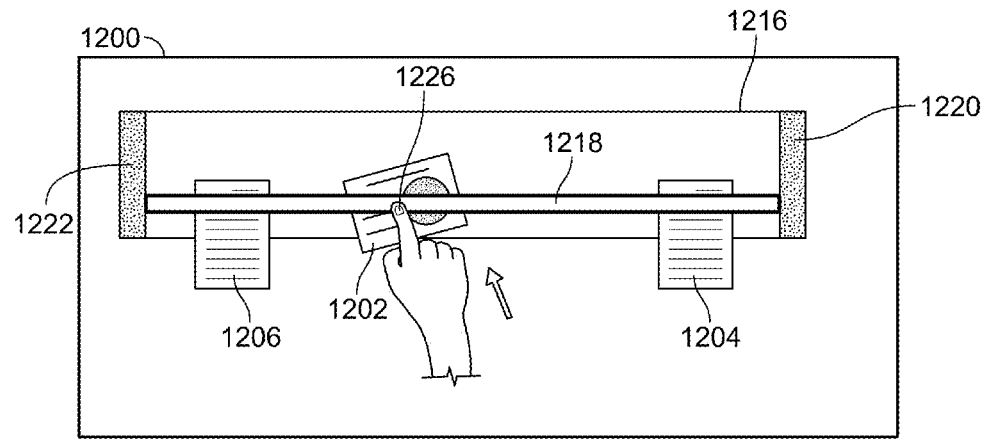
Figure 12C:
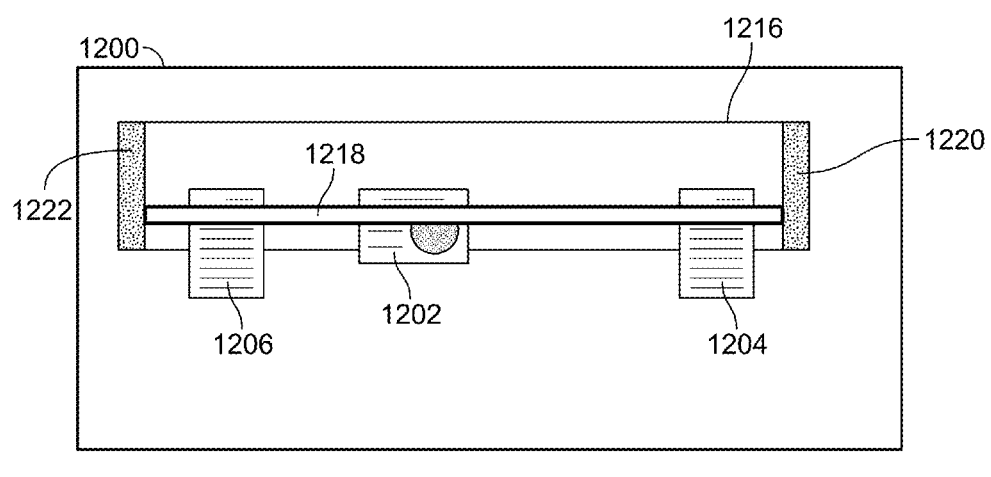

FIGS. 12B and 12C are diagrams of a multi-touch display device that illustrate two different examples the multi-touch display device automatically adjusting the angular orientation of an object upon attaching the objects to a one-dimensional linear organizational tool. In these figures, multi-touch display device 1200 displays objects 1202, 1204, and 1206 and organizational tool 1216. Organizational tool 1216 includes an attachment strip 1218 and boundary handles 1220 and 1222. Objects 1204 and 1206 are attached to organizational tool 1216 through attachment strip 1218.

Referring to FIG. 12B(*a*), object 1204 and object 1206 are attached to the one-dimensional linear organizational tool such that their angular orientations are consistent with one another, but not necessarily with the angular orientation of the one-dimensional linear organizational tool. Stated differently, the vertical and horizontal axes of each of objects 1204 and 1206 are consistent relative to one another, but are at, for example, approximately a 45-degree angle with respect to the vertical and horizontal axes of organizational tool 1216.

As illustrated in the sequence of FIGS. 12B(*a*)-12B(*c*), when the multi-touch display device 1200 attaches object 1202 to the one-dimensional organizational tool 1216, the multi-touch display device automatically adjusts the angular rotation of object 1202 such that it is consistent with the angular orientation of objects 1204 and 1206, but not necessarily with the angular orientation of the one-dimensional linear organizational tool. To adjust the angular rotation of object 1202, multi-touch display device 1200 may, for example, determine the vertical and/or horizontal axes of object 1202, determine the vertical and/or horizontal axes of objects 1204 and/or 1206, and rotate object 1202 such that its vertical and/or horizontal axes align with the vertical and/or horizontal axes of objects 1204 and/or 1206.

Referring to FIG. 12C(*a*), object 1204 and object 1206 are attached to the one-dimensional linear organizational tool such that their angular orientations are consistent with one another, and with the angular orientation of the one-dimensional linear organizational tool. Stated differently, the vertical and horizontal axes of each of objects 1204 and 1206 are both consistent with the vertical and horizontal axes of organizational tool 1216.

As illustrated in the sequence of FIGS. 12C(*a*)-12C(*c*), when the multi-touch display device 1200 attaches object 1202 to the one-dimensional organizational tool 1216, the multi-touch display device automatically adjusts the angular rotation of object 1202 such that it is consistent with the angular orientation of objects 1204 and 1206, and with the angular orientation of the one-dimensional linear organizational tool. To adjust the angular rotation of object 1202, multi-touch display device 1200 may, for example, determine the vertical and/or horizontal axes of object 1202, determine the vertical and/or horizontal axes of organizational tool 1216, and rotate object 1202 such that its vertical and/or horizontal axes align with the vertical and/or horizontal axes of organizational tool 1216.

As discussed above, one effect of an object being attached to an organizational tool is that when the multi-touch display device applies transformations to the organizational tool, the multi-touch display device also may apply transformations to the objects attached to the organizational tool as a consequence of their attachment. However, when the multi-touch display device applies a transformation to an organization tool, the transformations that the multi-touch display device applies to objects attached to the organizational tool may depend upon how the objects are attached to the organizational tool.

In some cases, the multi-touch display device may attach an object to an organizational tool at only a single point. In such cases, transformations applied to the organizational tool only impact an attached object (i.e., cause a corresponding transformation to be applied to the attached object) if the transformations applied to the organizational tool impact the point upon the organizational tool at which the object is attached.

The manner in which all objects are attached to a organizational tool may be set for a given organizational tool by the user or they may be automatically preset upon creation by the multi-touch display device. Alternatively, the manner in which objects are attached to a organizational tool may be detected separately for each object upon being attached to the organizational tool.

Figure 13:
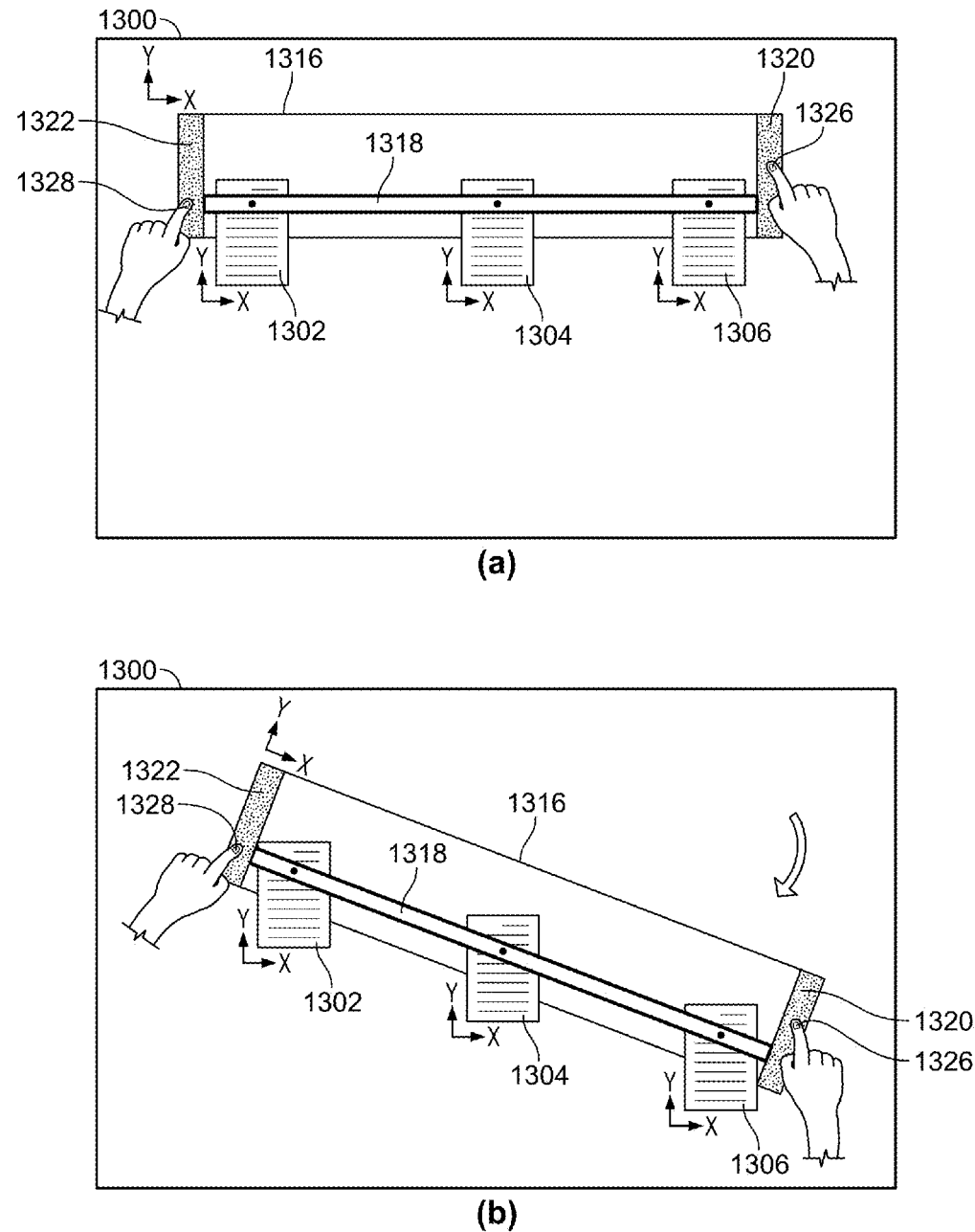
FIG. 13 is a diagram illustrating a multi-touch display device performing transformations to a one-dimensional linear organizational tool and its attached objects when the attached objects are attached to the organizational tool at only one point.
Figure 13:
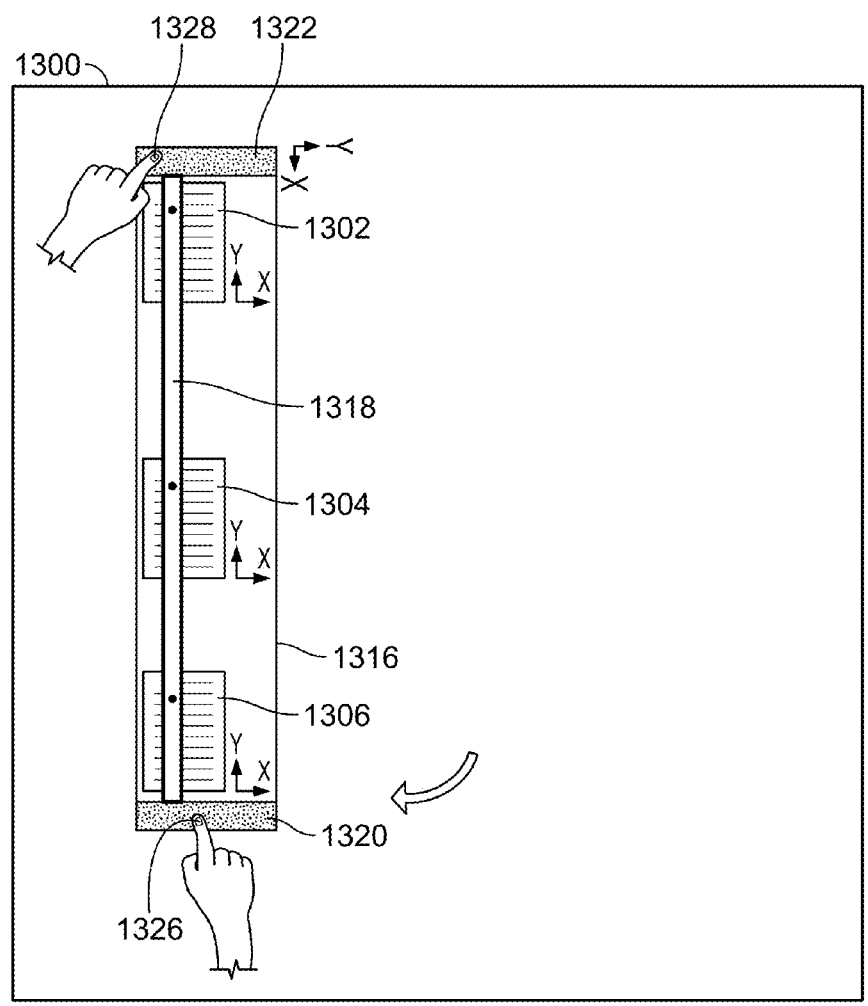

FIG. 13 illustrates a multi-touch display device performing transformations to a one-dimensional linear organizational tool and its attached objects when the attached objects are attached to the organizational tool at only one point. As illustrated in FIG. 13(a), objects 1302, 1304, and 1306 each are attached to organizational tool 1316 through attachment strip 1318 at one point. Therefore, when the multi-touch display device 1300 rotates organizational tool 1316 in response to detecting input by fingers 1326 and 1328 engaging the organizational tool, as shown in FIG. 13(b), the multi-touch display device 1300 corresponding translates each of displayed objects 1302, 1304, and 1306 only with regard to whether and how the rotation of organizational tool 1316 impacts the point upon the attachment strip 1318 at which objects 1302, 1304, and 1306 are attached. Thus, in FIG. 13(c), multi-touch display device 1300 has translated the position of objects 1302, 1304, and 1306 with regard to the point at which each is connected to attachment strip 1318, while maintaining the angular orientation (illustrated by the consistent x and y axes next to each object) of objects 1302, 1304, and 1306.

Alternative manners of attaching objects to organizational tool 1316 also may be employed. For example, objects may be attached to organizational tool 1316 at two or more points as opposed to a single point as illustrated in FIGS. 13(a)-13(c).

As discussed above, the extent of a one-dimensional linear organizational tool provided by a multi-touch display device may be greater than the visual display of the one-dimensional linear organizational tool itself. In such implementations, a preview screen may be provided by the multi-touch display device to provide a glimpse into the regions of the one-dimensional linear organizational tool that exist beyond the boundaries of the visual display of the one-dimensional linear organizational tool. Such a preview screen may serve to alert a user to (or remind the user of) the existence of objects attached to the one-dimensional linear organizational tool beyond the visual boundaries of the one-dimensional linear organizational tool. In addition, the preview screen also may portray to a user the spatial relationships between the objects attached to the one-dimensional linear organizational tool, whether or not the objects are within the boundaries of the visual display of the one-dimensional linear organizational tool, thereby providing the user with an indication of how far away certain objects attached to the one-dimensional linear organizational tool are from the region of the one-dimensional linear organizational tool currently within the boundaries of the visual display of the one-dimensional linear organizational tool.

Figure 14A:
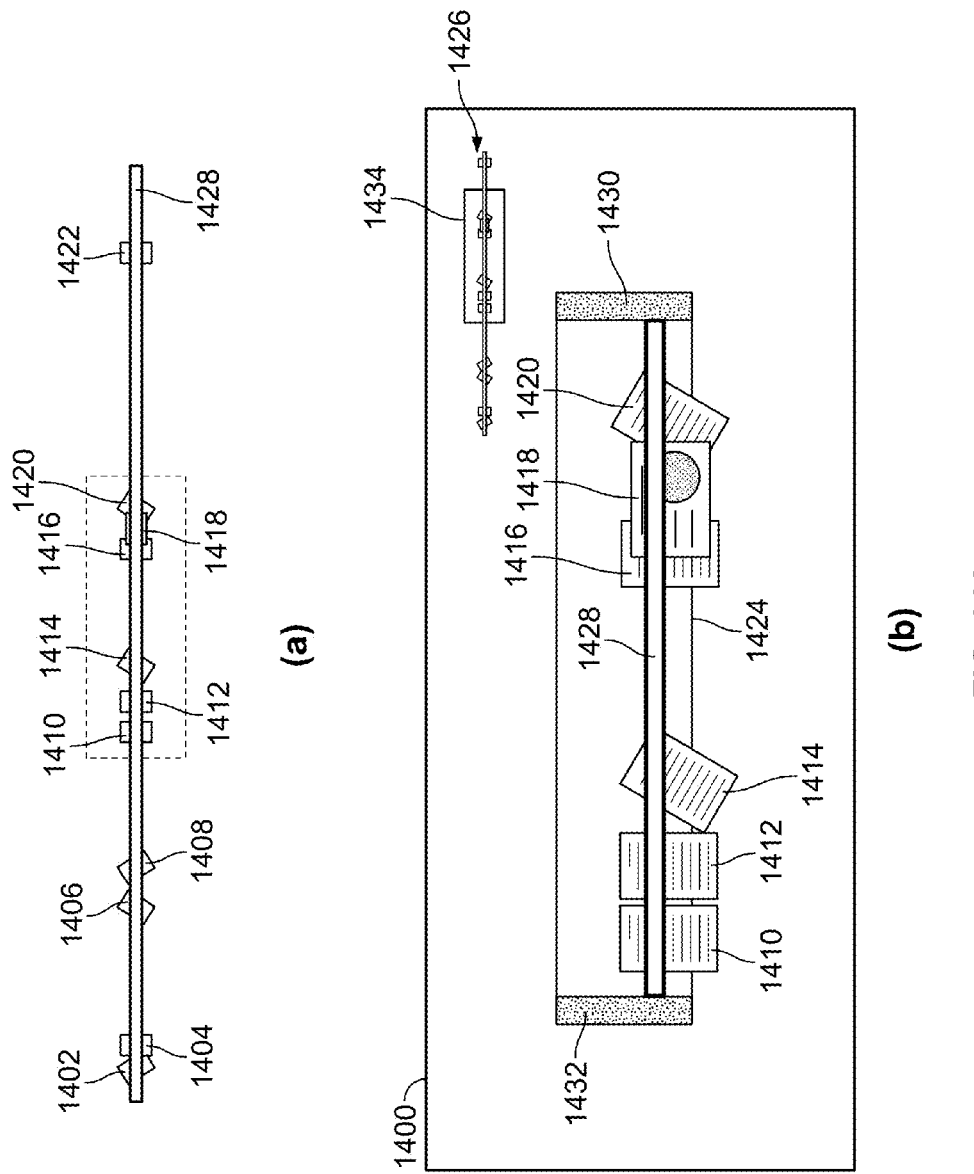
FIGS. 14A-14E are diagrams illustrating a multi-touch display device performing transformations to a one-dimensional linear organizational tool and displaying a preview screen of the one-dimensional linear organizational tool in accordance with the transformations.
Figure 14A:
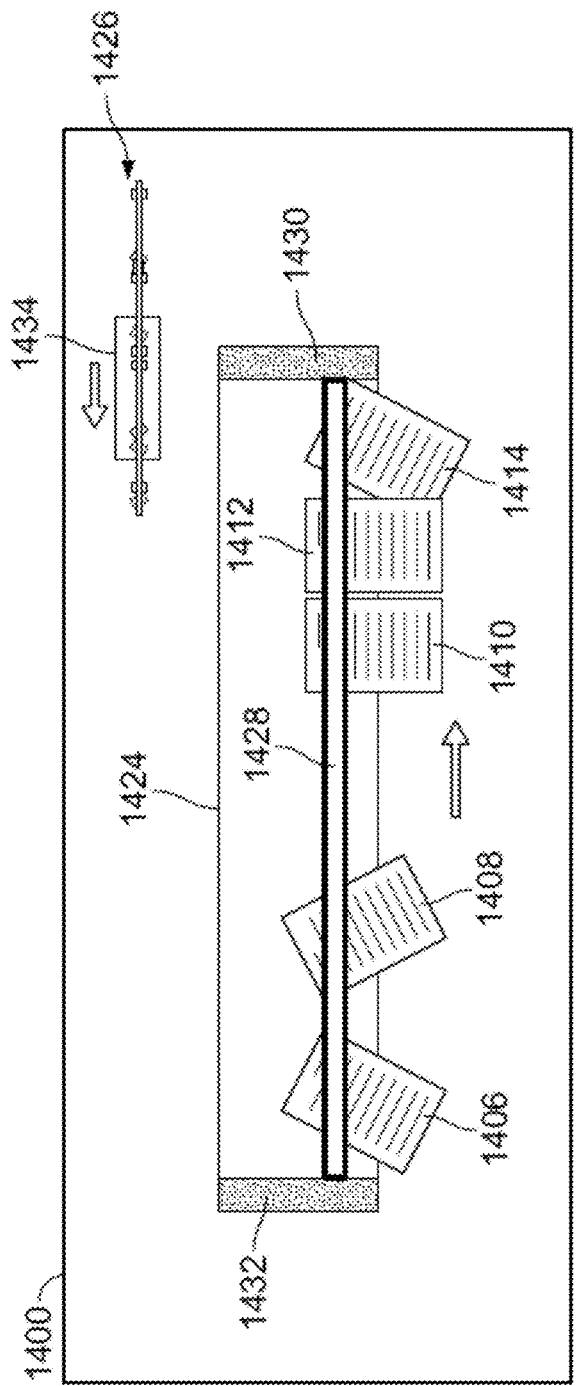

FIG. 14A is illustrative. FIG. 14A(a) is a schematic diagram of a one-dimensional linear organizational tool 1424. As illustrated in FIG. 14A(a), the one dimensional linear organizational tool 1424 includes an attachment strip 1428 and objects 1402, 1404, 1406, 1408, 1410, 1412, 1414, 1416, 1418, 1420, and 1422 are attached to the one-dimensional linear organizational tool via attachment strip 1428. Dashed box 1442 represents the region of the one-dimensional linear organizational tool 1424 that is displayed on the multi-touch display device. As illustrated in FIG. 14A(a), the extent of the one-dimensional linear organizational tool 1424 extends beyond the boundaries of the visual display of the one-dimensional linear organizational tool 1424. In particular, the one-dimensional linear organizational tool 1424 has a region to the left that extends beyond the boundaries of the visual display of the one-dimensional linear organizational tool 1424 and a region to the right that extends beyond the boundaries of the visual display of the one-dimensional linear organizational tool.

Because objects 1410, 1412, 1414, 1416, 1418, and 1420 are attached to the one-dimensional linear organizational tool 1424 within the boundaries of the visual display of the one-dimensional linear organizational tool 1424, objects 1410, 1412, 1414, 1416, 1418, and 1420 will be displayed by the multi-touch display device as being attached to the one-dimensional linear organizational tool 1424. In contrast, because objects 1402, 1404, 1406, 1408, and 1422 are attached to the one-dimensional linear organizational tool 1424 outside of the boundaries of the visual display of the one-dimensional linear organizational tool 1424, objects 1402, 1404, 1406, 1408, and 1422 will not be displayed by the multi-touch display device given the current boundaries of the visual display of the one-dimensional linear organizational tool 1424.

FIG. 14A(b) is a diagram of a multi-touch display device 1400 displaying the one-dimensional linear organizational tool 1424 depicted in the schematic diagram of FIG. 14A(a). As illustrated in FIG. 14A(b), the boundaries of the visual display of the one-dimensional linear organizational tool 1424 are defined by boundary handles 1430 and 1432 and are consistent with the boundaries of the visual display of the one-dimensional linear grouping tool 1424 depicted by the dashed box 1442 in FIG. 14A(a). As a consequence of the presently defined boundaries of the visual display of the one-dimensional organizational tool, multi-touch display device 1400 displays objects 1410, 1412, 1414, 1416, 1418, and 1420, but not objects 1402, 1404, 1406, 1408, and 1422.

Furthermore, to provide users with a glimpse of the full extent of the one-dimensional linear organizational tool 1424, multi-touch display device 1400 displays preview screen 1426, which provides a visual representation of the entirety of the one-dimensional linear organizational tool 1424 and the spatial relationships between objects attached to the one-dimensional organizational tool 1424. As illustrated in FIG. 14A(b), multi-touch display device 1400 provides window 1434 in connection with the preview screen 1426 to identify the portion of one-dimensional linear organizational tool 1424 and the objects attached thereto that the multi-touch display device 1400 currently is displaying between boundary handles 1430 and 1432.

As the multi-touch display device 1400 manipulates one-dimensional organizational tool 1424 in response to user input, the multi-touch display device 1400 also updates preview screen 1426 accordingly.

For example, referring to FIG. 14A(c), when the multi-touch display device 1400 translates attachment strip 1428 to the right, thereby bringing objects 1406 and 1408 within the boundaries of the visual display of one-dimensional organizational tool 1424 while expelling objects 1416, 1418, and 1420 from the visual display of one-dimensional organizational tool 1424, multi-touch display device 1400 also translates window 1434 to the left identify the portion of one-dimensional linear organizational tool now currently displayed between boundaries 1430 and 1432.

In some implementations, as users interact with objects attached to a one-dimensional linear organizational tool provided by a multi-touch display device, the multi-touch display device causes a preview screen displayed in connection with the one-dimensional linear organizational tool to be updated to visually distinguish the representations of the objects with which the users are interacting with from the visual representations of the other objects attached to the one-dimensional organizational tool. For example, if a user has selected an object attached to the one-dimensional organizational tool, the multi-touch display device may highlight (or otherwise visually distinguish) the corresponding visual representation of the selected object in the preview screen. Additionally or alternatively, when an object is newly attached to the one-dimensional organizational tool, the multi-touch display device may highlight (or otherwise visually distinguish) the visual representation of the newly attached object in the preview screen. Similarly, when an object recently has been removed from the one-dimensional organizational tool, the multi-touch display device may preserve the corresponding visual representation of the removed object within the preview screen, but the multi-touch display device may highlight (or otherwise visually distinguish) the recently detached object to reflect that the object has been detached from the one-dimensional linear organizational tool.

Figure 14B:
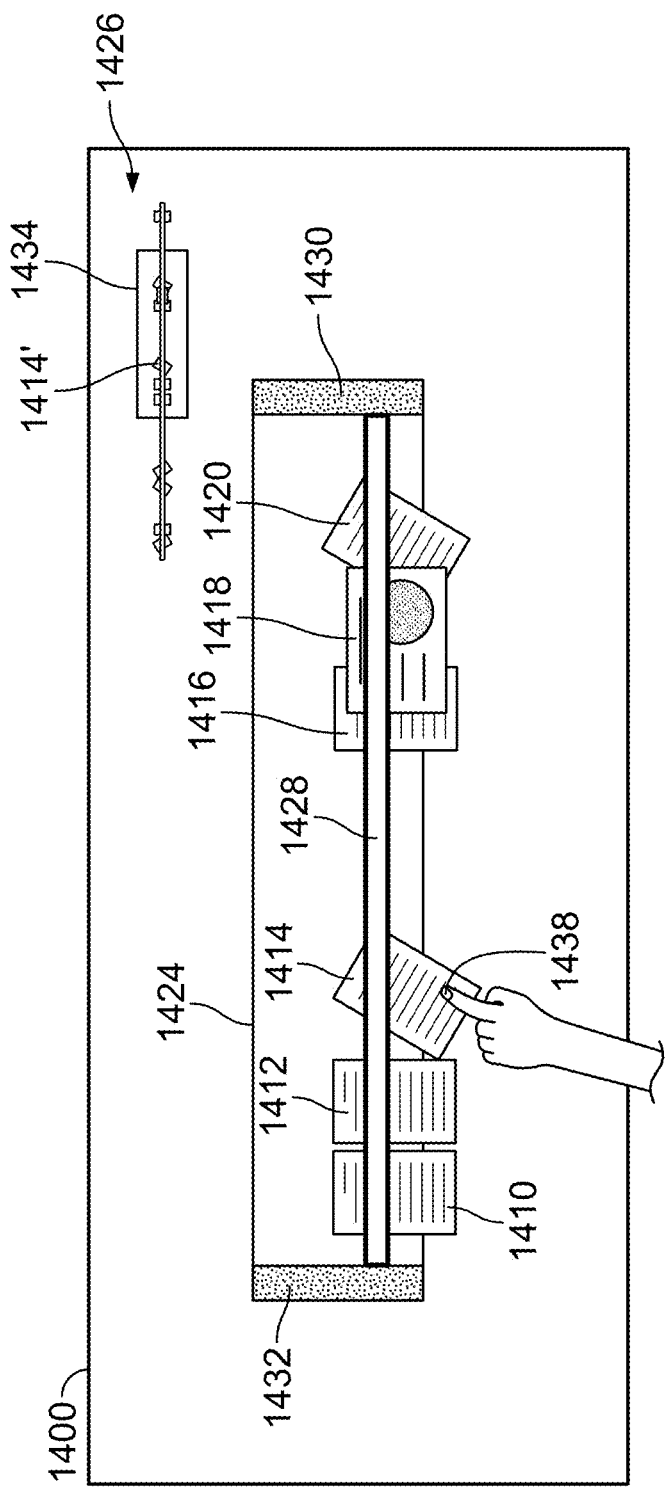

FIG. 14B is a diagram of a multi-touch display device 1400 that provides a one-dimensional linear organizational tool 1424 and corresponding preview screen 1426 and that visually distinguishes the visual representations of objects displayed in the preview screen 1426 in response to detecting user interaction with corresponding objects attached to the one-dimensional linear organizational tool 1424.

In particular, as illustrated in FIG. 14B, a user is engaging the surface of multi-touch display device 1400 with finger 1438 at a point corresponding to object 1414. Multi-touch display device 1400 detects the input of finger 1438 and associates the detected input with object 1414. Furthermore, in response to detecting this interaction with object 1414, multi-touch display device 1400 highlights the corresponding visual representation 1414' of object 1414 within preview screen 1426 to reflect that the user presently is interacting with object 1414. (In this example, the multi-touch display device visually distinguishes the visual representation 1414' of object 1414 within the preview screen 1426 from the other visual representations of attached objects within the preview screen by providing a dark outline and a light fill to the visual representation 1414' of object 1414.)

In addition to providing controls for translating the attachment strip of a one-dimensional linear organizational tool, the multi-touch display device also may provide controls for increasing and/or decreasing the scale of the one-dimensional linear organizational tool and the objects attached to it. In such implementations, when the multi-touch display device increases or decreases the scale of the one-dimensional linear organizational tool and the objects attached to it, the multi-touch display device also may update a preview screen provided in connection with the one-dimensional linear organizational tool.

Figure 14C:
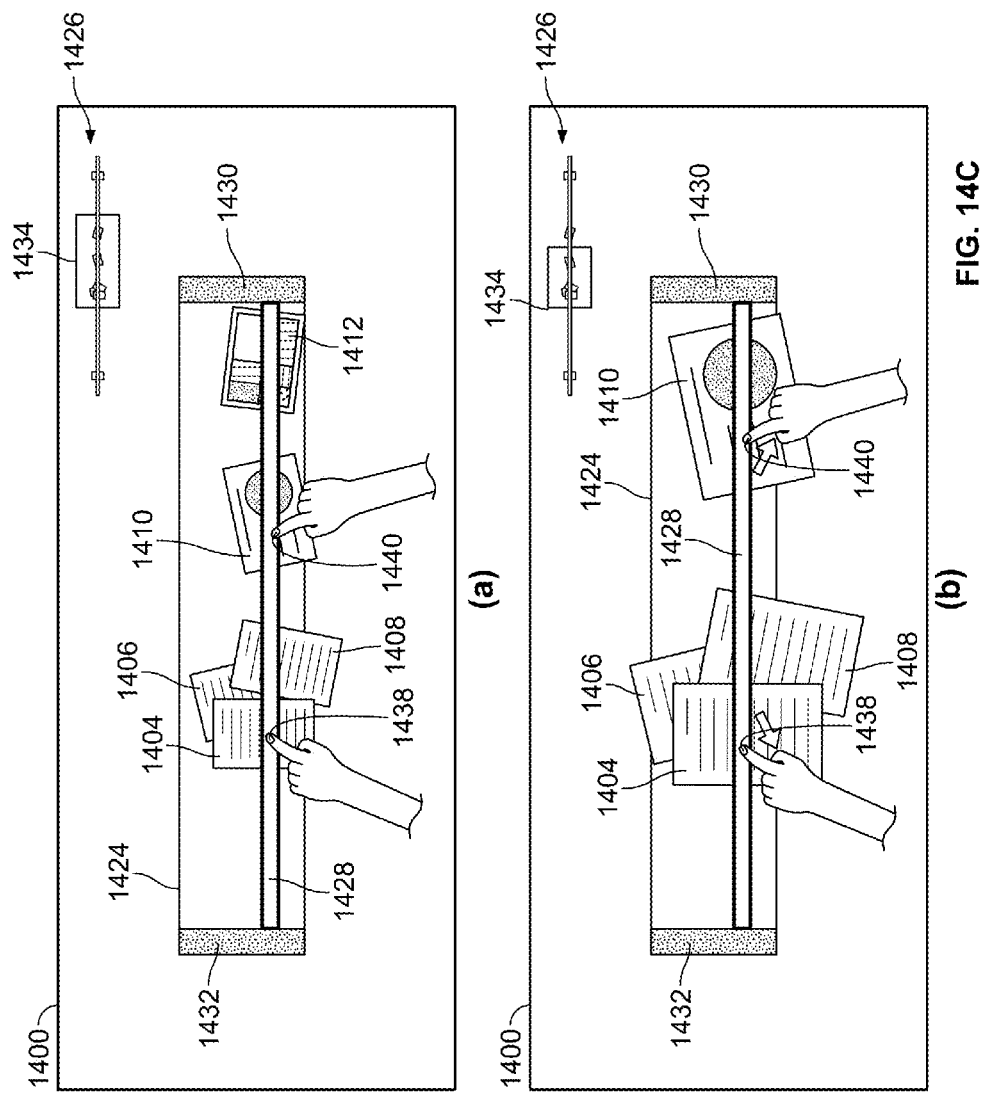

FIG. 14C is a sequence of diagrams of a multi-touch display device that provides controls for increasing or decreasing the scale of a one-dimensional linear organizational tool. As illustrated in the sequence of diagrams presented in FIG. 14C, in response to detecting that a user has engaged attachment strip 1428 with two fingers 1438 and 1440 and then moved the two fingers 1438 and 1440 further apart from each other, the multi-touch display device 1400 increases the scale of attachment strip 1428 and the objects attached to the attachment strip 1428 as a function of the detected movement of fingers 1438 and 1440. Similarly, though not illustrated, in response to detecting that a user has engaged attachment strip 1428 with two fingers and then moved the two fingers closer together, the multi-touch display device 1400 decreases the scale of the attachment strip 1428 and the objects attached to the attachment strip 1428 as a function of the detected movement of the fingers.

As illustrated in the sequence of diagrams presented in FIG. 14C, the visual effect of increasing the scale of attachment strip 1428 and the objects attached to the attachment strip is to zoom in on a shorter length of attachment strip 1428. As a result, object 1412 is expelled from the visual display of the one-dimensional organizational tool 1424 and the sizes of objects 1404, 1406, 1408, and 1410 are increased. Furthermore, in response to performing the scaling operation on the one-dimensional linear organizational tool, the multi-touch display device also modifies window 1434 provided in connection with preview window 1426 so as to identify the portion of the one-dimensional organizational tool 1424 now located between boundary handles 1430 and 1432. In particular, the multi-touch display device 1400 shortens the length of window 1434 to reflect that a shorter length of the one-dimensional linear organizational tool 1424 is located between boundary handles 1430 and 1432 as a consequence of the scaling operation.

Figure 14D:
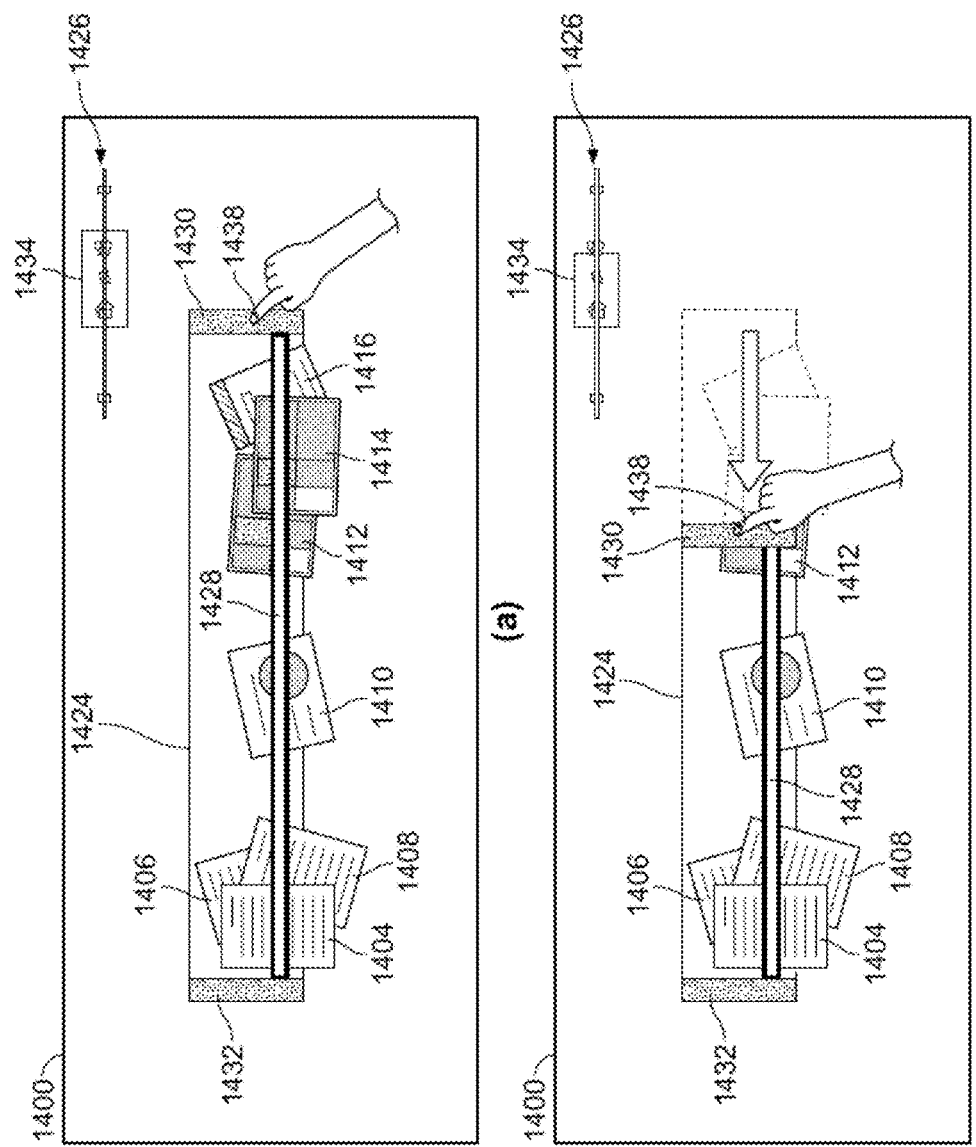

FIG. 14D is a sequence of diagrams of a multi-touch display device that provides controls for redefining the visual boundaries of a one-dimensional linear organizational tool. As illustrated in FIG. 14D(a), in response to detecting that a user has engaged boundary handle 1430 with finger 1438 at a first point, and then has moved finger 1438 in a leftward direction, from the first point to a second point, as shown in FIG. 14D(b), the multi-touch display device 1400 brings the visual boundaries of organizational tool 1424 closer together by a distance corresponding to the distance from the first point to the second point. Similarly, though not illustrated, in response to detecting that a user has engaged boundary handle 1430 with a finger and then moving the finger in a rightward direction, the multi-touch display device 1400 spreads the visual boundaries of organizational tool 1424 further apart as a function of the detected movement of the fingers.

As illustrated in the sequence of diagrams presented in FIG. 14D, the visual effect of bringing the visual boundaries of organizational tool 1424 closer together is to display a shorter length of attachment strip 1428, while attachment strip 1428 remains unaltered. As a result, objects 1414 and 1416 are expelled from the visual display of the one-dimensional organizational tool 1424, yet the sizes of 1404, 1408, 1410, and 1412 remain constant.

Furthermore, in response to redefining the visual boundaries of a one-dimensional linear organizational tool, the multi-touch display device also modifies window 1434 provided in connection with preview window 1426 so as to identify the portion of the one-dimensional organizational tool 1424 now located between boundary handles 1430 and 1432. In particular, the multi-touch display device 1400 shortens the length of window 1434 to reflect that a shorter length of the one-dimensional linear organizational tool 1424 is located between boundary handles 1430 and 1432 as a consequence of the redefining operation.

Figure 14E:
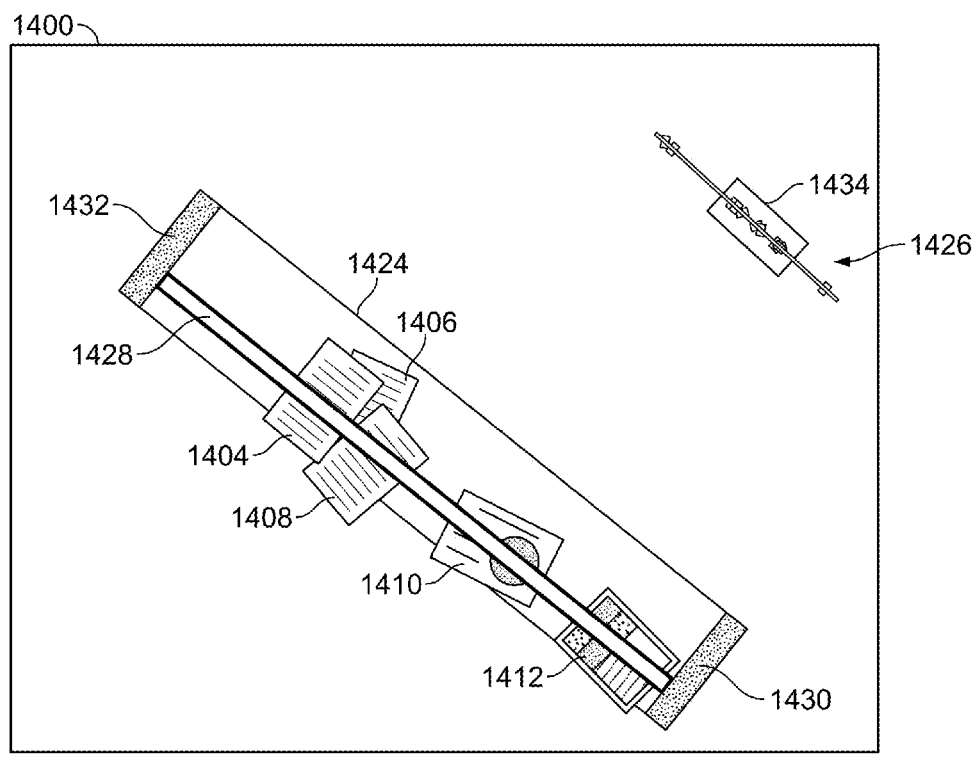

FIG. 14E illustrates a rotation of the organizational tool and the effect that the rotation has on the preview screen and window. In this example, multi-touch display device 1400 currently displays objects 1404, 1406, 1408, 1410, 1412, 1414, and 1416, organizational tool 1424, and preview screen 1426. Organizational tool 1424 includes an attachment strip 1428 and boundaries 1430 and 1432. Objects 1402, 1404, 1406, 1408, 1410, 1412, 1414, 1416, and 1418 are attached to organizational tool 1424 through attachment strip 1428. Preview screen 1426 indicates the current total utilized length of attachment strip 1428, and includes window 1434, which outlines the portion of attachment strip 1428 that is currently being displayed between boundaries 1430 and 1432.

As multi-touch display device 1400 rotates organizational tool 1424, it also rotates preview screen 1426 and window 1434 in order to maintain a visual correspondence between organizational tool 1424, preview screen 1426, and window 1434. Additionally, in this example objects 1402-1418 are attached to attachment strip 1428 in the two-point manner, such that multi-touch display device 1400 displays objects 1402-1418 so they will always visually maintain their absolute position with respect to organizational tool 1424. In other words, the angular orientation of objects 1402, 1404, 1406, 1408, 1410, 1412, 1414, 1416, and 1418 will rotate equivalent to the rotation of organizational tool 1424.

In some implementations, a multi-touch display device that provides a one-dimensional linear organizational tool may provide controls for increasing and/or decreasing the scale of one or more portions of the one-dimensional linear organizational tool and the objects attached to such portion(s), while preserving the pre-existing scale of the other portions and the objects attached to such other portions.

Figure 15:
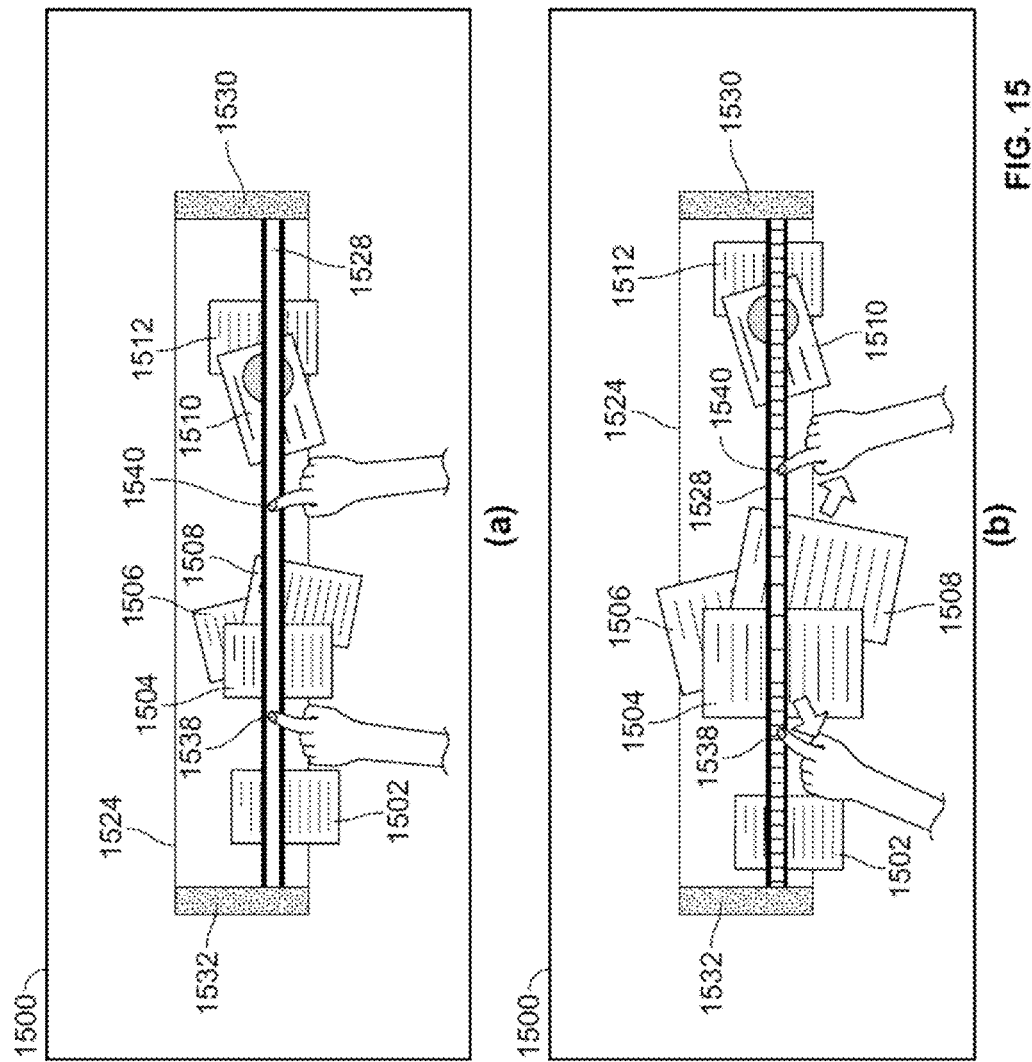
FIG. 15 is a sequence of diagrams of a multi-touch display device 1500 that provides a one-dimensional linear organizational tool 1524 and controls for increasing and/or decreasing the scale of one or more portions of the one-dimensional linear organizational tool.

FIG. 15 is a sequence of diagrams of a multi-touch display device 1500 that provides a one-dimensional linear organizational tool 1524 and controls for increasing and/or decreasing the scale of one or more portions of the one-dimensional linear organizational tool and the objects attached to such portion(s), while preserving the pre-existing scale of the other portions and the objects attached to such portions.

In FIG. 15(*a*), a user is engaging the surface of multi-touch display device 1500 with fingers 1538 and 1540 at points corresponding to attachment strip 1528. Multi-touch display device 1500 detects the inputs of fingers 1538 and 1540 and associates the detected inputs with organizational tool 1524 and attachment strip 1528. As the user increases the distance between fingers 1538 and 1540, as shown in FIG. 15(*b*), multi-touch display device 1500 detects the movement of fingers 1538 and 1540 and interprets the detected movement as a request to increase the scale of (e.g., stretch) the portion of organizational tool 1524 and the objects attached thereto between the points on attachment strip 1528 engaged by fingers 1538 and 1540 while preserving the scale of portions of the organizational tool and objects attached thereto outside of the range defined by fingers 1538 and 1540. As a result, the multi-touch display device 1500 maintains the points on the attachment strip engaged by fingers 1538 and 1540 substantially beneath fingers 1538 and 1540 while increasing the scale of attachment strip 1528 and the objects attached thereto in the region of attachment strip 1528 between fingers 1538 and 1540. Notably, the multi-touch display device preserves the pre-existing scale of the one-dimensional linear organizational tool and the objects attached thereto outside of the range defined by fingers 1538 and 1540. In some respects, this transformation enables manipulations similar to functionality provided by stretching a portion of a rubber band by holding the rubber band at two points and increasing the distance between the two points being held.

In order to enlarge the display of one-dimensional organizational tool 1524 between the two points engaged by fingers 1538 and 1540, multi-touch display device 1500 essentially zooms in on the portion of attachment strip 1528 between the two points contacted by fingers 1538 and 1540, while maintaining the scale for the remainder of the one-dimensional linear organizational tool 1524. In addition, multi-touch display device 1500 increases the size of objects attached between the two detected contact points (i.e. objects 1504, 1506, and 1508). Concurrently, multi-touch display device 1500 shifts the remainder of the attachment strip 1528 and its attached objects not between the two detected contact points (i.e. objects 1502, 1510, and 1512) in the direction of the motion of the detected inputs, so as to make room for the increased size of the zoomed portion. In other words, as the scale of objects 1504, 1506, and 1508 is increased, multi-touch display device 1500 shifts object 1502 left and objects 1510 and 1512 right to allow for the increase.

Multi-touch display device 1500 may utilize this alternative method for scaling a one-dimensional linear organizational tool by default, or only when a special mode is set. Furthermore, when it detects the disengagement of the detected inputs, multi-touch display device 1500 may maintain the scale of the attachment strip 1528 or, alternatively, multi-touch display device 1500 may return attachment strip 1528 to its previous scale, much like a rubber band snaps back to its previous state when the contact points on the rubber band are released.

Figure 16A:
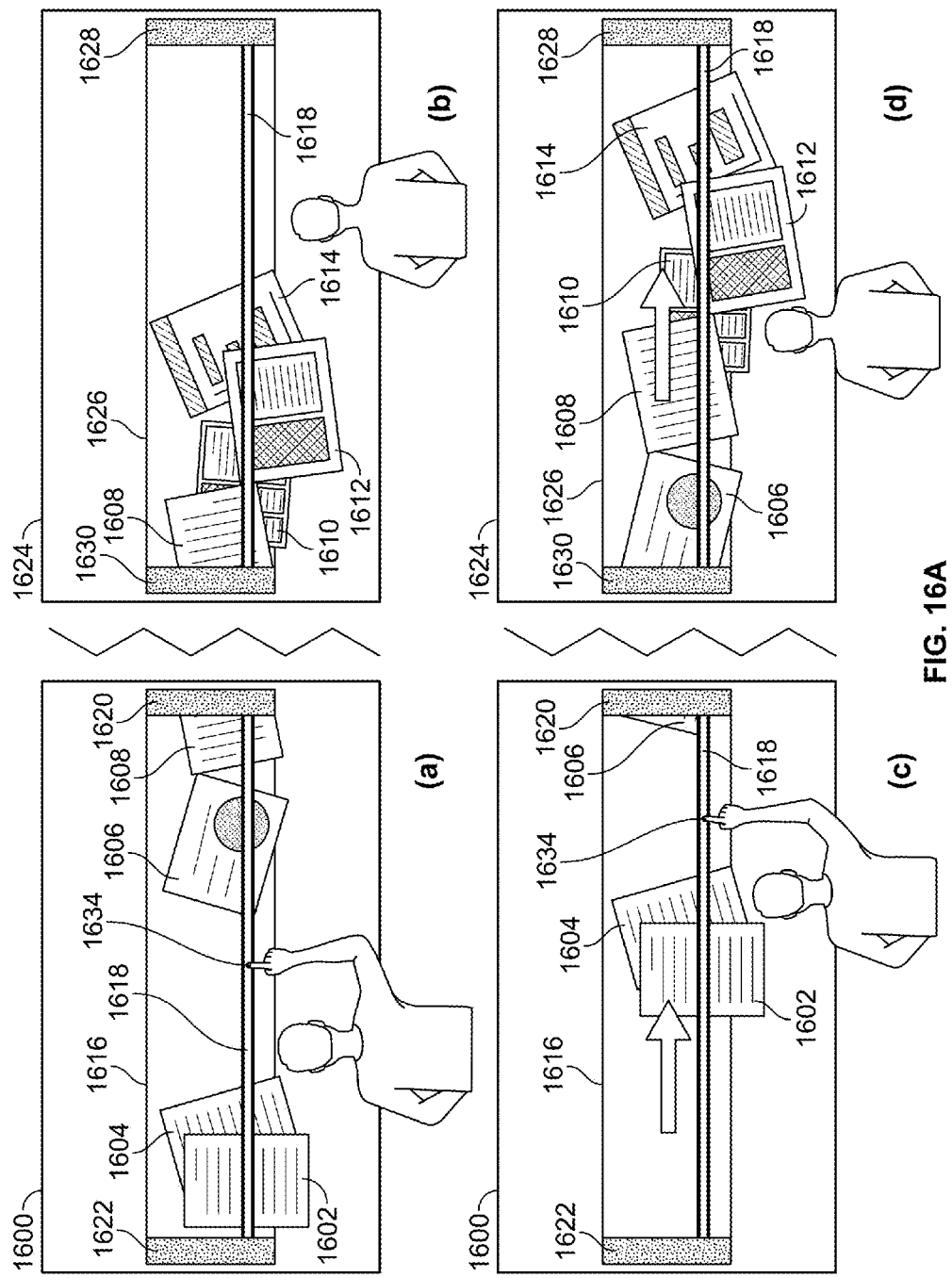
FIGS. 16A and 16B illustrate how different parts of a single attachment strip may be viewed through multiple organizational tools, possibly on more than one multi-touch display device.
Figure 16B:
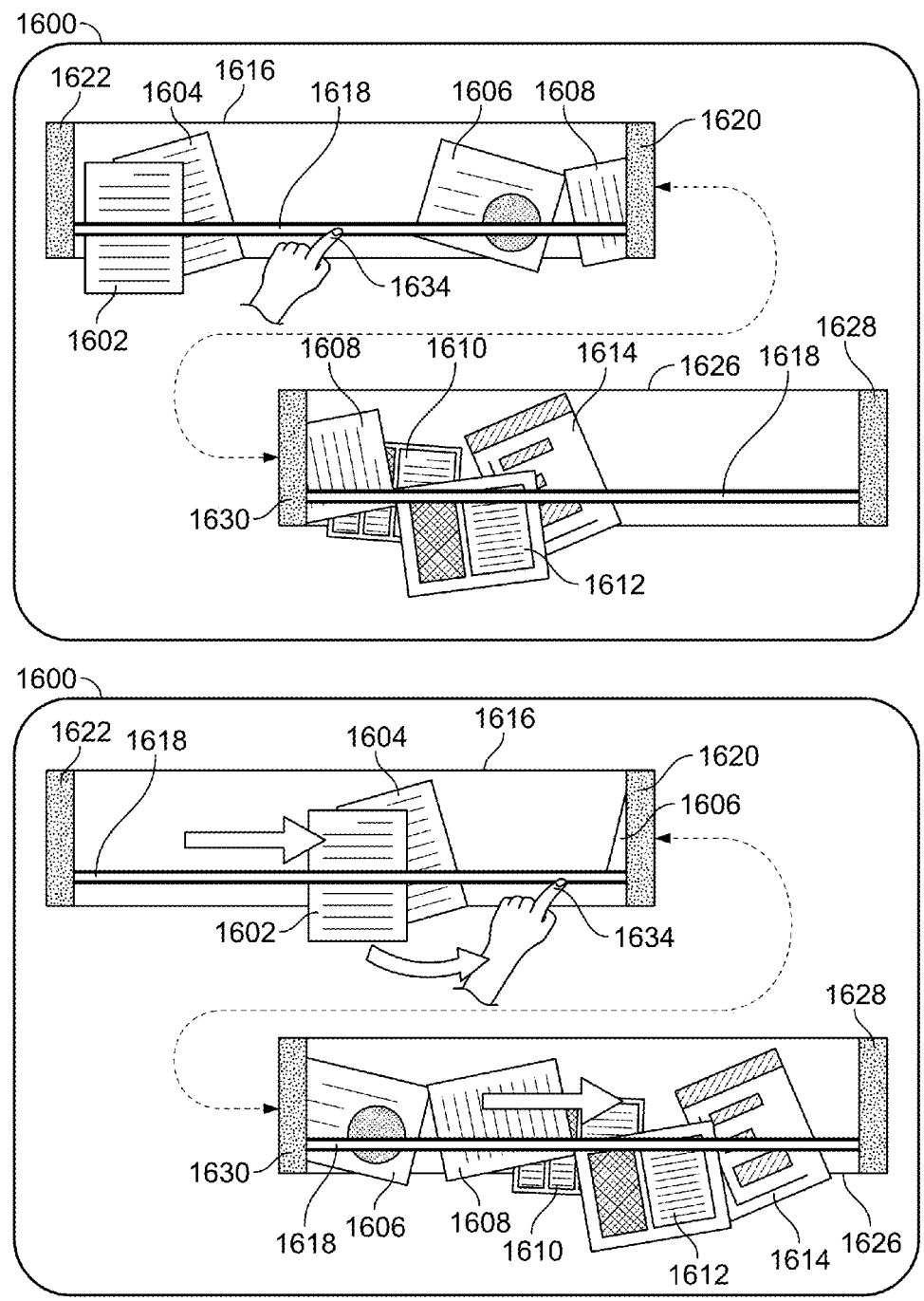

FIGS. 16A and 16B illustrate how different parts of a single attachment strip may be viewed through multiple organizational tools, possibly on more than one multi-touch display device.

FIG. 16A illustrates two separate multi-touch display devices, or two portions of the same multi-touch display device, displaying a single attachment strip through two organizational tools. Alternatively, the multi-touch display device(s) may display a single attachment strip through separate instances of the same organizational tool, to the same effect. The two separate multi-touch display devices may be in the same room, or they may be on separate continents. In certain implementations, two separate multi-touch display devices may facilitate such a parallel view with a communication link between the two multi-touch display devices. For example, two multi-touch display devices, each connected to the Internet through a standard Internet Service Provider (ISP), may set up a communication link and share a single attachment strip. In response to any manipulation done to the attachment strip, the multi-touch display device(s) may concurrently reflect the manipulation through both organizational tools to two different users.

FIG. 16A(*a*) is a diagram of a multi-touch display device 1600 displaying the one-dimensional linear organizational tool 1616. The boundaries of the visual display of the one-dimensional linear organizational tool 1616 are defined by boundary handles 1620 and 1622. As a consequence of the presently defined boundaries of the visual display of the one-dimensional organizational tool, multi-touch display device 1600 displays objects 1602, 1604, 1606, and 1608. Likewise, FIG. 16A(*b*) is a diagram of a multi-touch display device 1624 displaying the one-dimensional linear organizational tool 1626. The boundaries of the visual display of the one-dimensional linear organizational tool 1626 are defined by boundary handles 1628 and 1630. As a consequence of the presently defined boundaries of the visual display of the one-dimensional organizational tool, multi-touch display device 1624 displays objects 1608, 1610, 1612, and 1614.

In FIG. 16A(*a*), a user is engaging the surface of multi-touch display device 1600 with finger 1634 at a first point corresponding to attachment strip 1618. Multi-touch display device 1600 detects the input of finger 1634 and associates the detected input with attachment strip 1618. Referring to FIG. 16A(*c*), as the user drags finger 1634 across the surface, from the first point to a second point, multi-touch display device 1600 detects the position of the finger 1634 and translates attachment strip 1618 by a distance corresponding to the distance from the first point to the second point. Thus, the multi-touch display device 1600 translates attachment strip 1628 to the right by the detected distance or a function of the detected distance, thereby expelling object 1608 from the visual display of one-dimensional organizational tool 1600. Concurrently, multi-touch display device 1600 communicates the translation of attachment strip 1628 to multi-touch display device 1624. Upon receiving the translation information from multi-touch display device 1600, as shown in FIG. 16A(d), multi-touch display device 1624 translates attachment strip 1628 to the right by the detected distance or a function of the detected distance, thereby bringing objects 1606 and 1608 within the boundaries of the visual display of one-dimensional organizational tool 1626.

FIG. 16B illustrates a similar concept as FIG. 16A, except organizational tools 1616 and 1626 are displayed on the same multi-touch display device. Thus, referring to FIG. 16B(a), a user is engaging the surface of multi-touch display device 1600 with finger 1634 at a first point corresponding to attachment strip 1618. Multi-touch display device 1600 detects the input of finger 1634 and associates the detected input with attachment strip 1618. Referring to FIG. 16B(b), as the user drags finger 1634 across the surface, from the first point to a second point, multi-touch display device 1600 detects the position of the finger 1634 and translates attachment strip 1618 by a distance corresponding to the distance from the first point to the second point. Thus, the multi-touch display device 1600 translates attachment strip 1628 to the right by the detected distance or a function of the detected distance, thereby expelling object 1608 from the visual display of one-dimensional organizational tool 1600. Concurrently, multi-touch display device 1624 translates attachment strip 1628 to the right by the detected distance or a function of the detected distance, thereby bringing objects 1606 and 1608 within the boundaries of the visual display of one-dimensional organizational tool 1626.

Two-Dimensional Rotary Organizational Tool

As described above in connection with FIGS. 3(*a*)-3(*b*), a multi-touch display device may provide a two-dimensional rotary organizational tool that enables manipulations similar to functionality provided by a Lazy Susan.

Figure 17:
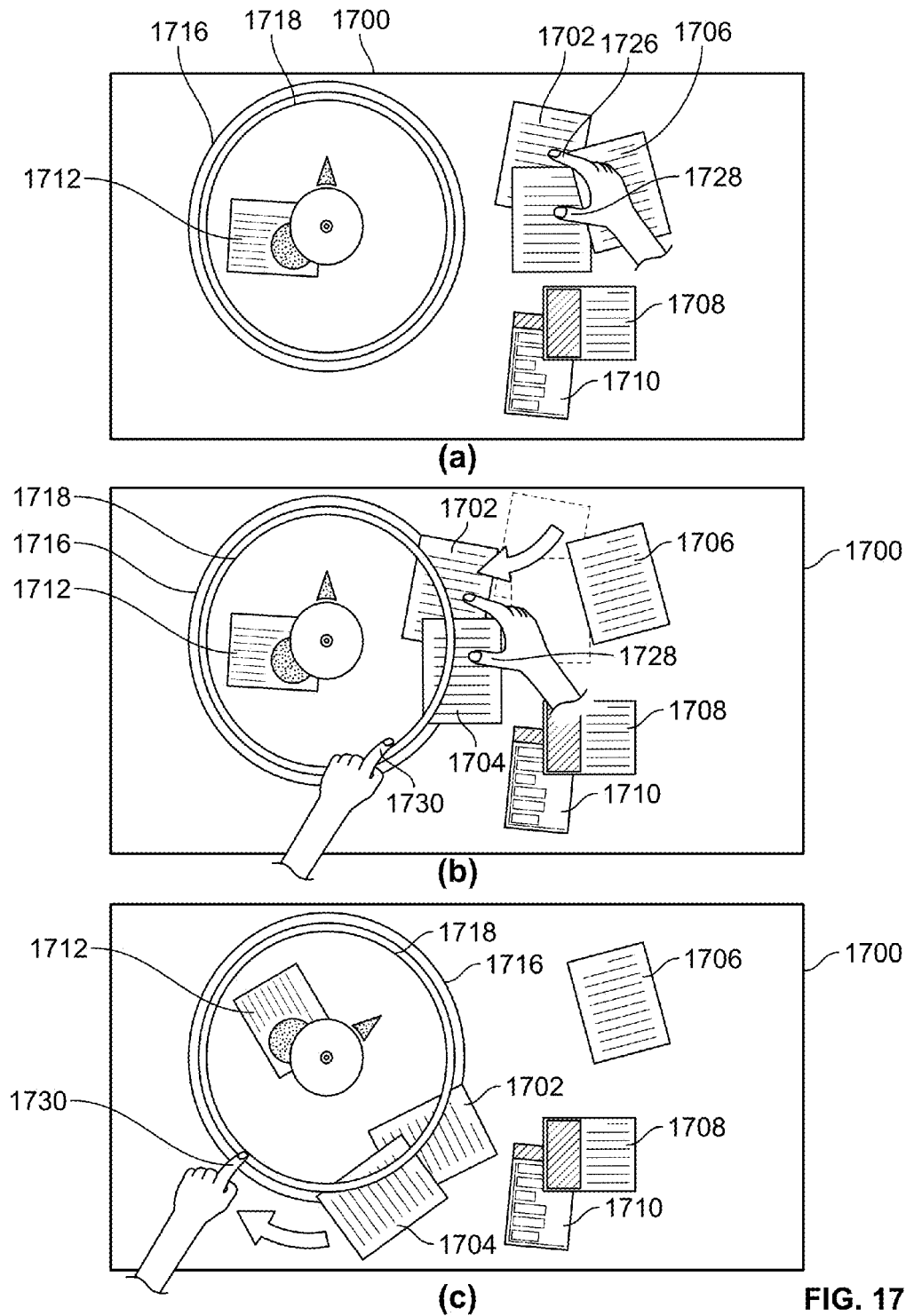
FIG. 17 is a diagram of a multi-touch display device that provides a two-dimensional rotary organizational tool that illustrates techniques for attaching objects to the two-dimensional rotary organizational tool.

FIG. 17 is a diagram of a multi-touch display device that provides a two-dimensional rotary organizational tool that illustrates techniques for attaching objects to the two-dimensional rotary organizational tool. In this example, multi-touch display device 1700 displays objects 1702, 1704, 1706, 1708, 1710, and 1712 and organizational tool 1716. Organizational tool 1716 includes an control strip 1718. As described above, the control strip 1718 provides a mechanism for manipulating organizational tool 1716. In some implementations, control strip 1718 will appear on top of objects attached to organizational tool 1716 in order to provide a convenient way to manipulate organizational tool 1716. Again, multi-touch display device 1700 may, in some implementations, interpret an input to control strip 1716 as a request to rotate organizational tool 1716 about its center. As such, no matter how large multi-touch display device 1700 displays organizational tool 1716, a user may engage control strip 1716 to rotate organizational tool 1716, and have convenient access to all objects attached to organizational tool 1716 without having to change his position with relation to multi-touch display device 1700 or the overall position of organizational tool 1716 with relation to the displayed workspace.

As illustrated in FIG. 17(*a*), object 1712 is attached to organizational tool 1716. Objects 1702, 1704, 1706, 1708, and 1710, meanwhile, remain unattached.

In FIG. 17(*a*), a user is engaging the surface of multi-touch display device 1700 with fingers 1726 and 1728 at distinct points along the surface of the multi-touch display device 1700, each point corresponding to a point on the surface of objects 1702 and 1704, respectively. Multi-touch display device 1700 detects the input of fingers 1726 and 1728 at a first pair of points and associates the detected inputs with objects 1702 and 1704, respectively.

Referring to FIG. 17(*b*), as the user drags fingers 1726 and 1728 across the surface, from the first pair of points to a second pair of points, multi-touch display device 1700 detects the position of the fingers 1726 and 1728 and translates objects 1702 and 1704 by a distance corresponding to a distance between the first pair of points and the second pair of points. In addition, while continuing to engage objects 1702 and 1704, the user also engages the surface of multi-touch display device 1700 with finger 1730 at a third point corresponding to control strip 1718. Eventually, as a result of the detected motion of fingers 1726 and 1728, the multi-touch display device 1700 translates objects 1702 and 1704, respectively, to a position overlapping organizational tool 1716 and beneath control stripe 1718.

Subsequently, the user disengages fingers 1726 and 1728 from the surface of the multi-touch display device 1700, and the multi-touch display device detects that the user has disengaged fingers 1726 and 1728 from the surface of multi-touch display device 1700. In response, the multi-touch display device determines whether objects 1702 and 1704 visually overlap organizational tool 1716. Since objects 1702 and 1704 do visually overlap organizational tool 1716, multi-touch display device 1700 determines whether the disengagement of objects 1702 and 1704 triggers attachment of objects 1702 and 1704 to organizational tool 1716.

In certain implementations, the determination of whether the disengagement should trigger an attachment is based on a stored rule or set of rules. For example, a rule may specify that a disengagement of the surface while multi-touch display device 1000 concurrently detects a separate, continuous engagement of control strip 1718 will trigger an attachment of objects 1702 and 1704 to the organizational tool 1716. Alternatively or additionally, a rule may specify that a disengagement of the surface preceded by an engagement of the surface at a pressure greater than a predetermined threshold and at points corresponding to where objects 1702 and 1704 overlap the organizational tool 1716 will trigger an attachment of objects 1702 and 1704 to the organizational tool 1716.

In this example, because finger 1730 was engaging organizational tool 1700 at the time when fingers 1726 and 1728 relinquished control of objects 1702 and 1704, respectively (or within a threshold period of time within the time at which fingers 1726 and 1728 relinquished control of 1702 and 1704), multi-touch display device 1700 determines that objects 1702 and 1704 should be attached to organizational tool 1716. Therefore, multi-touch display device 1700 attaches objects 1702 and 1704 to organizational tool 1716.

Referring now to FIG. 17(*c*), as the user drags finger 1730 in a clockwise fashion across the surface of multi-touch display device 1700, from the third point to a fourth point, multi-touch display device 1700 detects the movement of finger 1730, interprets the detected movement as a request to rotate organizational tool 1716 by an angular distance corresponding to the distance from the first point to the second point, and rotates organizational tool 1716 by the detected distance or a function or the detected distance. In this example, objects 1702, 1704, and 1712 each are attached to organizational tool 1716 at two or more points. Therefore, when the multi-touch display device 1700 rotates organizational tool 1716, the multi-touch display device 1700 correspondingly rotates each of displayed objects 1702, 1704, and 1712 as well.

Figure 18:
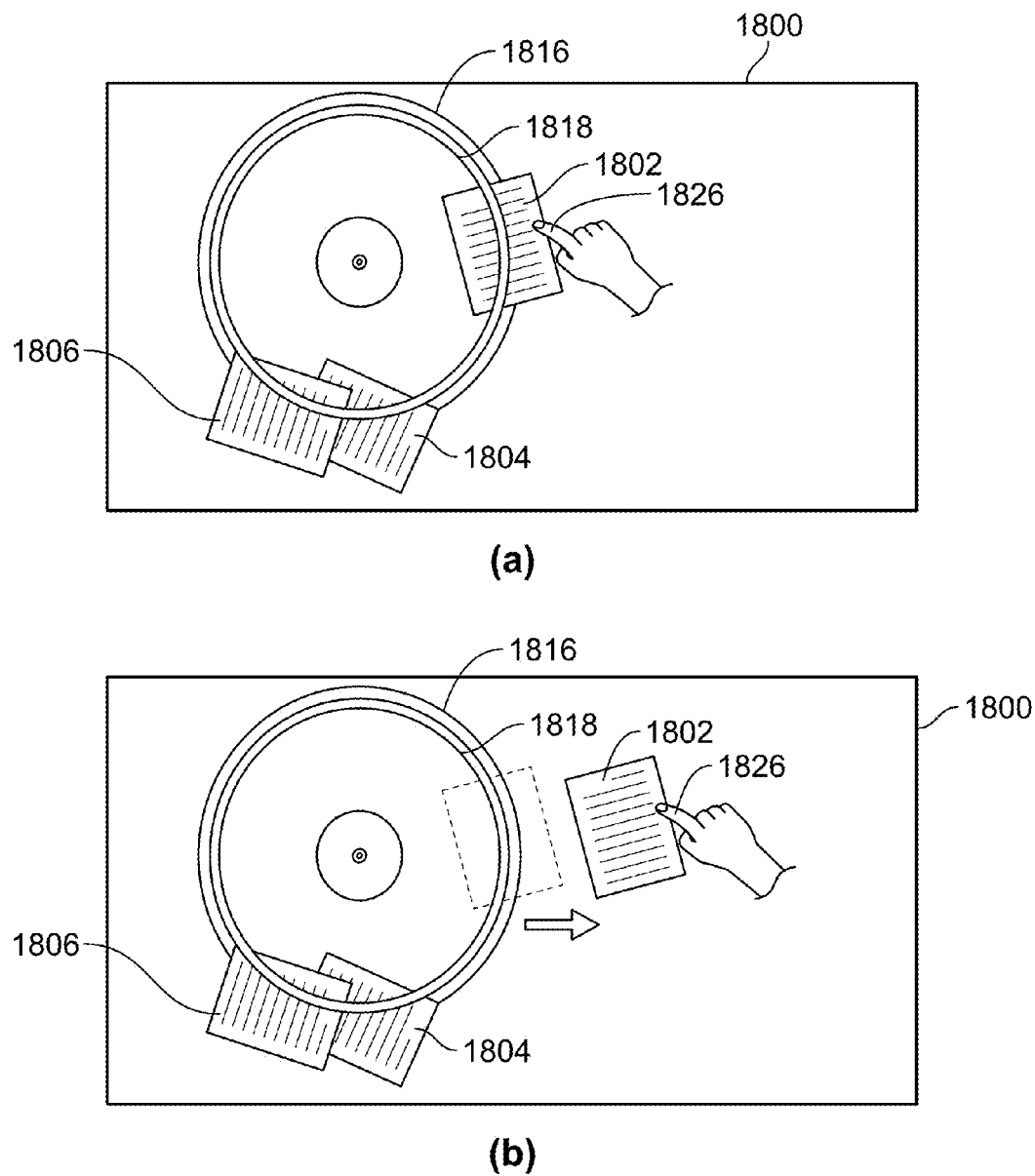
FIG. 18 is a diagram of a multi-touch display device that provides a two-dimensional rotary organizational tool that illustrates techniques for detaching objects from the two-rotary organizational tool.

FIG. 18 is a diagram of a multi-touch display device that provides a two-dimensional rotary organizational tool that illustrates techniques for detaching objects from the two-rotary organizational tool. In this example, multi-touch display device 1800 displays objects 1802, 1804, and 1806 and organizational tool 1816. Organizational tool 1816 includes a control strip 1818.

Referring to FIG. 18(*a*), a user has engaged the surface of multi-touch display device 1800 with finger 1826 at a first point corresponding to object 1802. The multi-touch display device 1800 detects the input of finger 1826, and associates the input with object 1802.

After detecting the engagement of finger 1826, multi-touch display device 1800 determines whether any future movements of the finger 1826 should trigger a detachment of object 1802. In this example, multi-touch display device 1800 determines that object 1802 should be detached from organizational tool 1816. Thereafter, in reference to FIG. 18(*b*), the user drags finger 1826 across the surface of the multi-touch display device 1800 in a rightward motion from the first point to a second point. In response to detecting the movement of finger 1826, multi-touch display device 1800 translates object 1802 by a distance corresponding to a distance from the first point to the second point. In some implementations, multi-touch display device 1810 detaches object 1802 from organizational tool 1816 when multi-touch display device 1800 detects that finger 1826 disengages the surface of multi-touch display device 1800 and determines that object 1802 no longer overlaps organizational tool 1816.

Figure 19:
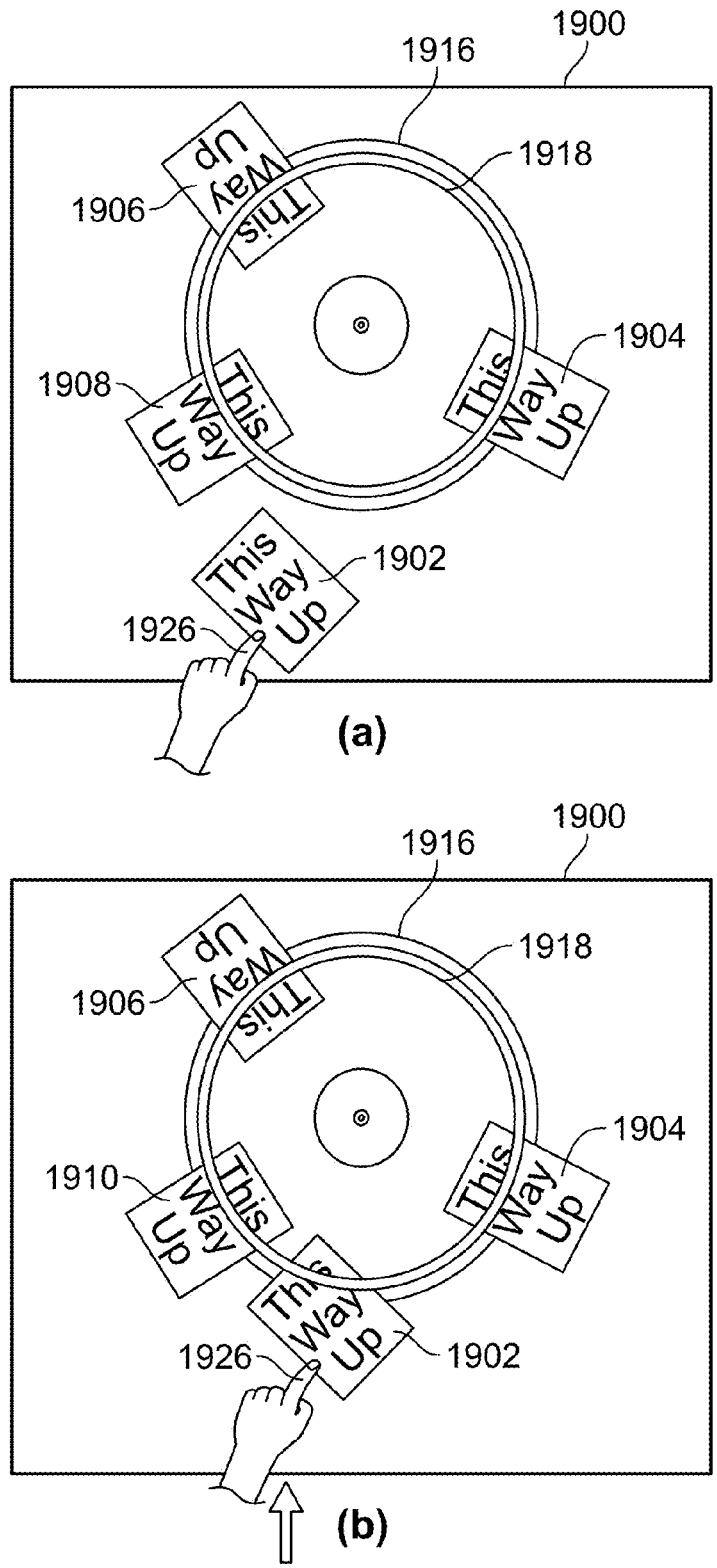
FIGS. 19(a)-19(d) are diagrams of a multi-touch display device that illustrate an example of the multi-touch display device automatically adjusting the angular orientation of an object upon attaching the object to a two-dimensional rotary organizational tool.
FIGS. 19(e)-19(f) are diagrams of a multi-touch display device automatically adjusting the angular orientation of an object upon detaching the object from a two-dimensional rotary organizational tool.
Figure 19:
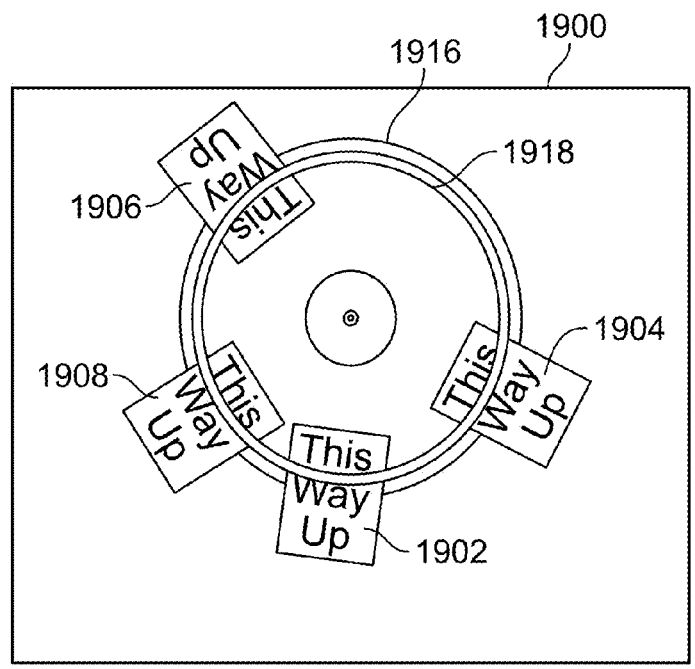
Figure 19:
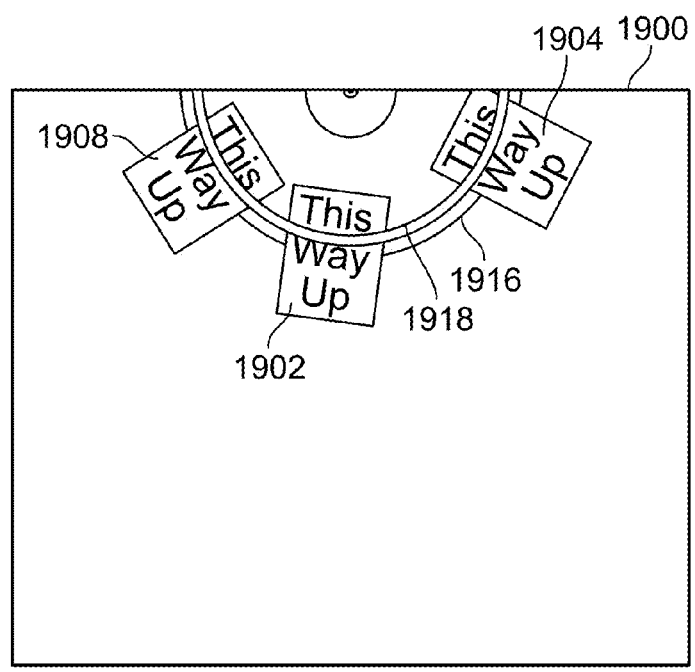
Figure 19:
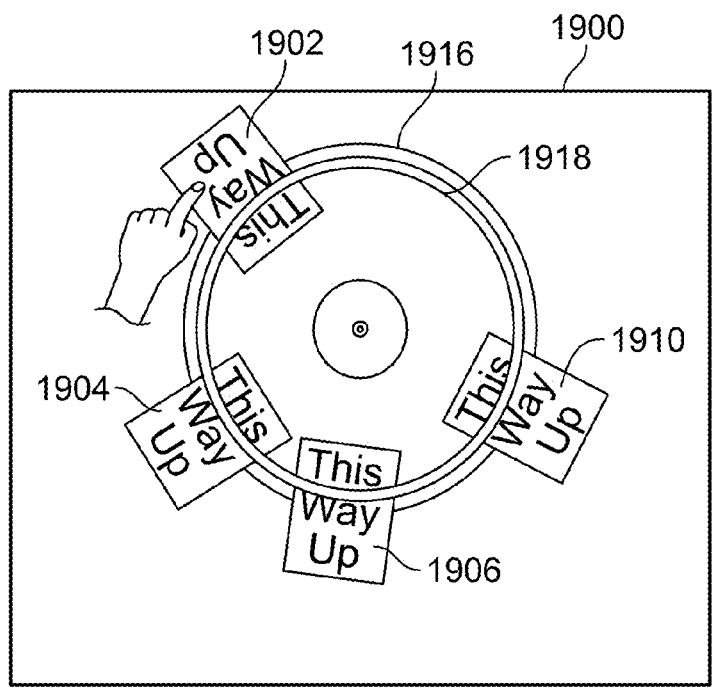
Figure 19:
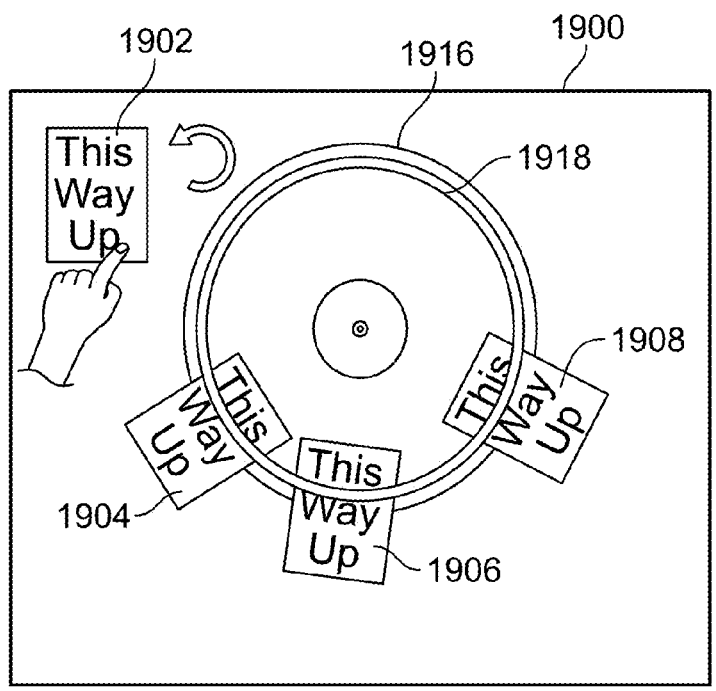

FIGS. 19(*a*)-19(*c*) are diagrams of a multi-touch display device that illustrate an example of the multi-touch display device automatically adjusting the angular orientation of an object upon attaching the object to a two-dimensional rotary organizational tool. In these figures, multi-touch display device 1900 displays objects 1902, 1904, 1906, and 1908 and organizational tool 1916. Organizational tool 1916 includes an control strip 1918. Objects 1904, 1906, and 1908 are attached to organizational tool 1916.

Referring to FIG. 19(*a*), objects 1904, 1906, and 1908 are attached to the two-dimensional rotary organizational tool such that their angular orientations are consistent with radial axes of the two-dimensional rotary organizational tool. Stated differently, the vertical axes of each of objects 1904, 1906, and 1908 is parallel to corresponding radial axes of organizational tool 1916, and the horizontal axes of each of objects 1904, 1906, and 1908 is orthogonal to corresponding radial axes of organizational tool 1916.

As illustrated in the sequence of FIGS. 19(*a*)-19(*c*), when the multi-touch display device 1900 attaches object 1902 to the organizational tool 1616 (shown in FIG. 19(*c*)) the multi-touch display device automatically adjusts the angular rotation of object 1902 such that it is consistent with a corresponding radial axis of organizational tool 1916. To adjust the angular rotation of object 1902, multi-touch display device 1900 may, for example, determine the vertical and/or horizontal axes of object 1902, determine the corresponding radial axis of organizational tool 1616 at the point at which object 1902 is being attached, and rotate object 1902 such that its vertical axes of object 1902 is parallel to the corresponding radial axis of organizational tool 1616 and/or the horizontal axis of object 1902 is orthogonal to the corresponding radial axis of organizational tool 1616.

The multi-touch display device 1900 adjusting the angular rotation of object 1902 to be consistent with a corresponding radial axis of organizational tool 1916 is important where, as shown in FIG. 19(*d*), multi-touch display device 1900 displays organizational tool 1916 at the top portion of multi-touch display device 1900 and such that multi-touch display device 1900 only displays a bottom portion of organizational tool 1916. When multi-touch display device 1900 makes the angular rotation of the objects attached to organizational tool 1916 to be consistent with a corresponding radial axis of organizational tool 1916, multi-touch display device 1900 will display the attached objects such that a user will have access to attached objects at an orientation appropriate for the user to properly view the object. Alternatively, multi-touch display device 1900 displays organizational tool 1916 at the bottom portion of multi-touch display device 1900 and such that multi-touch display device 1900 only displays a top portion of organizational tool 1916. In such an example, multi-touch display device 1900 may rotate the angular orientation of each attached object one hundred and eighty degrees with respect to the corresponding radial axis of organizational tool 1916, in order to produce a similar visual effect as shown in FIG. 19(*d*).

In certain implementations, multi-touch display device 1900 may also determine a preferred orientation for objects that are detached from organizational tool 1916, such that multi-touch display device 1900 displays the detached object consistent with the orientation of multi-touch display device 1900 with respect to the user, and automatically rotate the detached object to the preferred orientation. As illustrated in the sequence of FIGS. 19(*e*)-19(*f*), multi-touch display device 1900 automatically adjusting the angular orientation of an object upon detaching object 1902 from organizational tool 1916. To adjust the angular rotation of object 1902, multi-touch display device 1900 may, for example, determine the vertical and/or horizontal axes of multi-touch display device 1900 with relation to the viewing angle of the viewer, determine the vertical and/or horizontal axes of the object 1902, and rotate object 1902 such that its vertical axes and/or horizontal axes corresponds to the vertical and/or horizontal axes of multi-touch display device 1900.

As discussed above, one effect of an object being attached to an organizational tool is that when the multi-touch display device applies transformations to the organizational tool, the multi-touch display device also may apply transformations to the objects attached to the organizational tool as a consequence of their attachment. However, when the multi-touch display device applies a transformation to an organization tool, the transformations that the multi-touch display device applies to objects attached to the organizational tool may depend upon how the objects are attached to the organizational tool.

In some cases, the multi-touch display device may attach an object to an organizational tool at only a single point. In such cases, transformations applied to the organizational tool only impact an attached object (i.e., cause a corresponding transformation to be applied to the attached object) if the transformations applied to the organizational tool impact the point upon the organizational tool at which the object is attached.

The manner in which all objects are attached to a organizational tool may be set for a given organizational tool by the user or they may be automatically preset upon creation by the multi-touch display device. Alternatively, the manner in which objects are attached to a organizational tool may be detected separately for each object upon being attached to the organizational tool.

Figure 20:
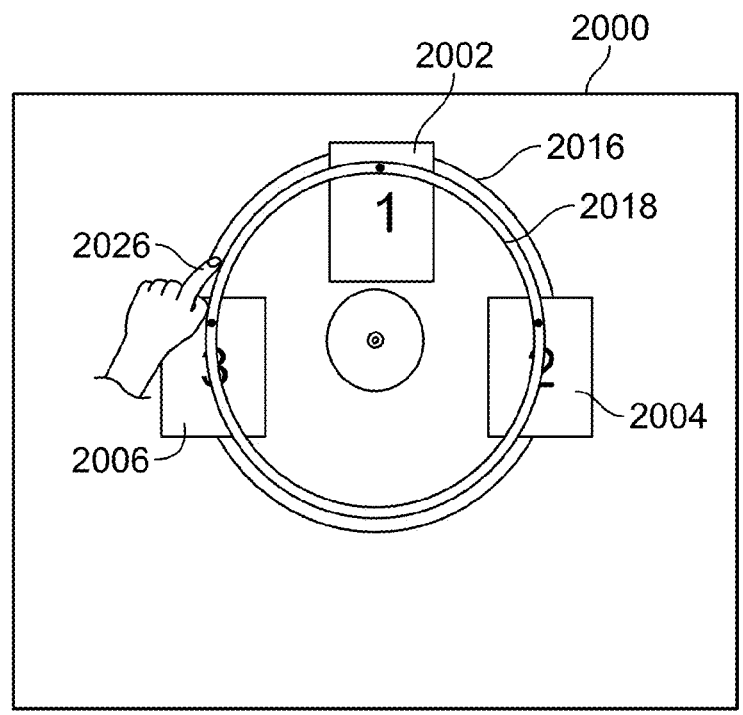
FIG. 20 is a diagram illustrating a multi-touch display device performing transformations to an organizational tool and its attached objects when the attached objects are attached to the organizational tool at only one point.
Figure 20:
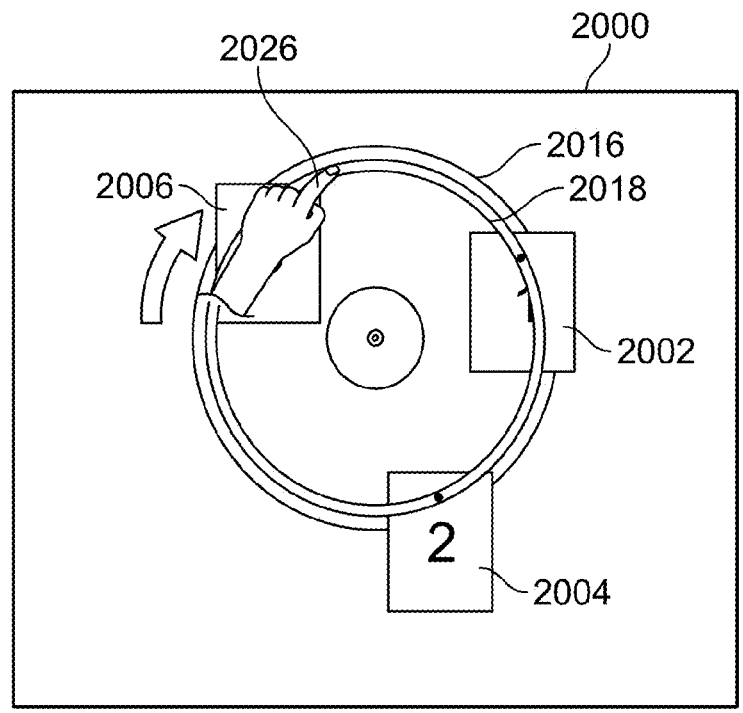

FIG. 20 illustrates a multi-touch display device performing transformations to an organizational tool and its attached objects when the attached objects are attached to the organizational tool at only one point. As illustrated in FIG. 20(a), objects 2002, 2004, and 2006 each are attached to organizational tool 2016 at one point. Therefore, when the multi-touch display device 2000 rotates organizational tool 2016 in response to detecting input by finger 2026 engaging the organizational tool, as shown in FIG. 20(b), the multi-touch display device 2000 corresponding translates each of displayed objects 2002, 2004, and 2006 only with regard to whether and how the rotation of organizational tool 2016 impacts the point upon the organizational tool 2016 at which objects 2002, 2004, and 2006 are attached.

In some implementations, a multi-touch display device may provide controls for further organizing objects attached to an organizational tool provided by the multi-touch display device even after the objects have been attached to the organizational tool. For example, the multi-touch display device may attach an object to the organizational tool such that the object is attached to the organizational tool at the position occupied by the object on the organizational tool at the point in time when the multi-touch display device determined to attach the object to the organizational tool irrespective of how many other objects also are attached to the organizational tool at the same or similar positions. Furthermore, the multi-touch display device may preserve the angular orientation of the an object upon attaching the object to an organizational tool. This may lead to a cluttering of the organizational tool as more and more objects are attached to the organizational tool. Therefore, the multi-touch display device may provide controls for rearranging the objects attached to an organizational tool into a more organized fashion.

Figure 21:
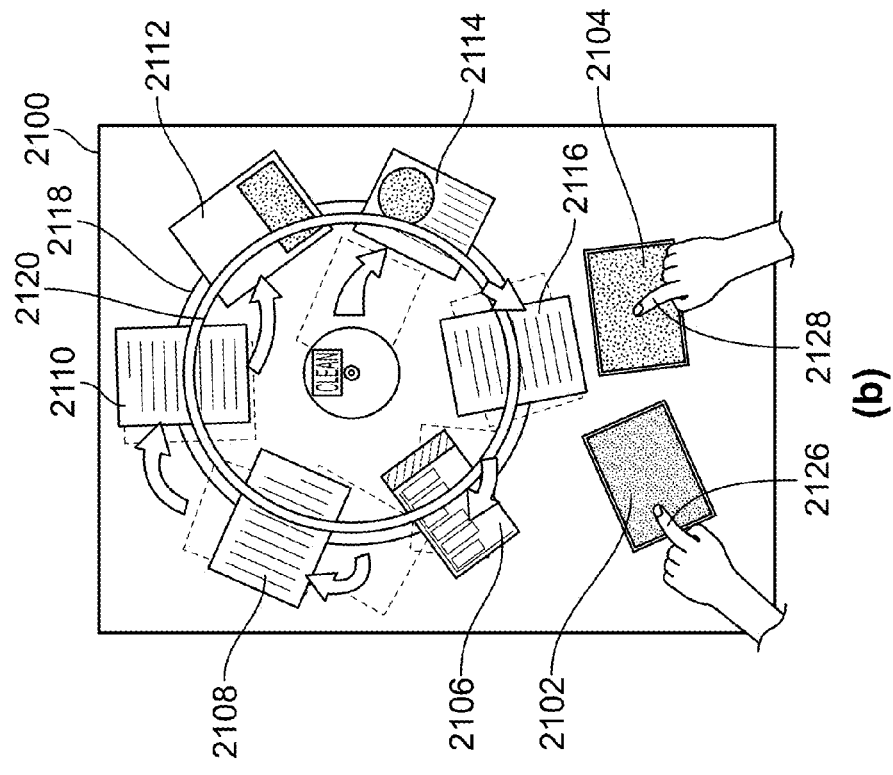
FIG. 21 is a diagram illustrating a multi-touch display device providing controls for organizing objects attached to an organizational tool.
Figure 21:
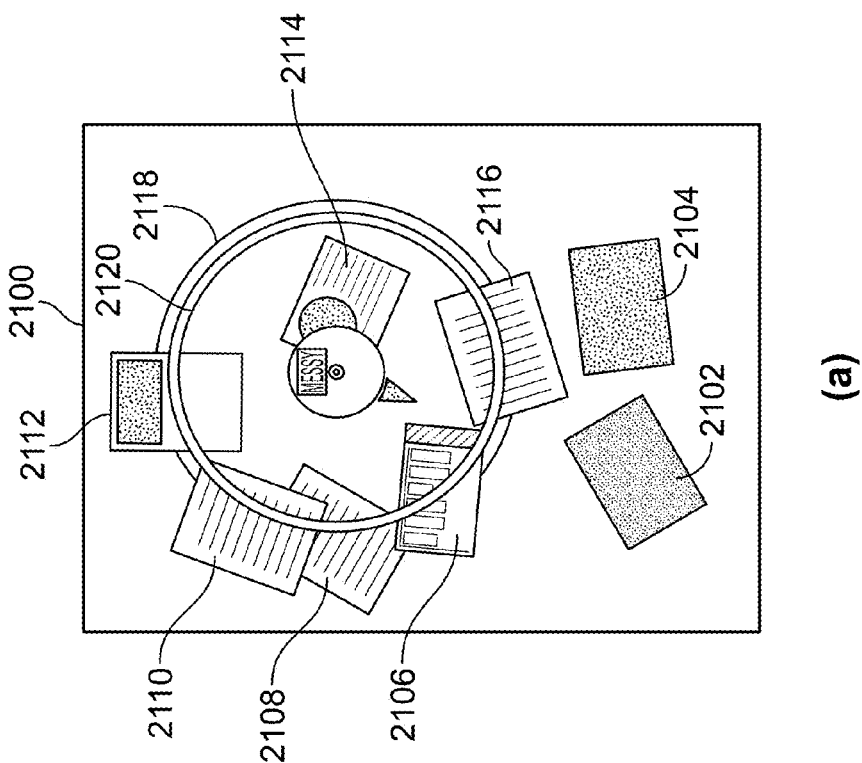
Figure 21:
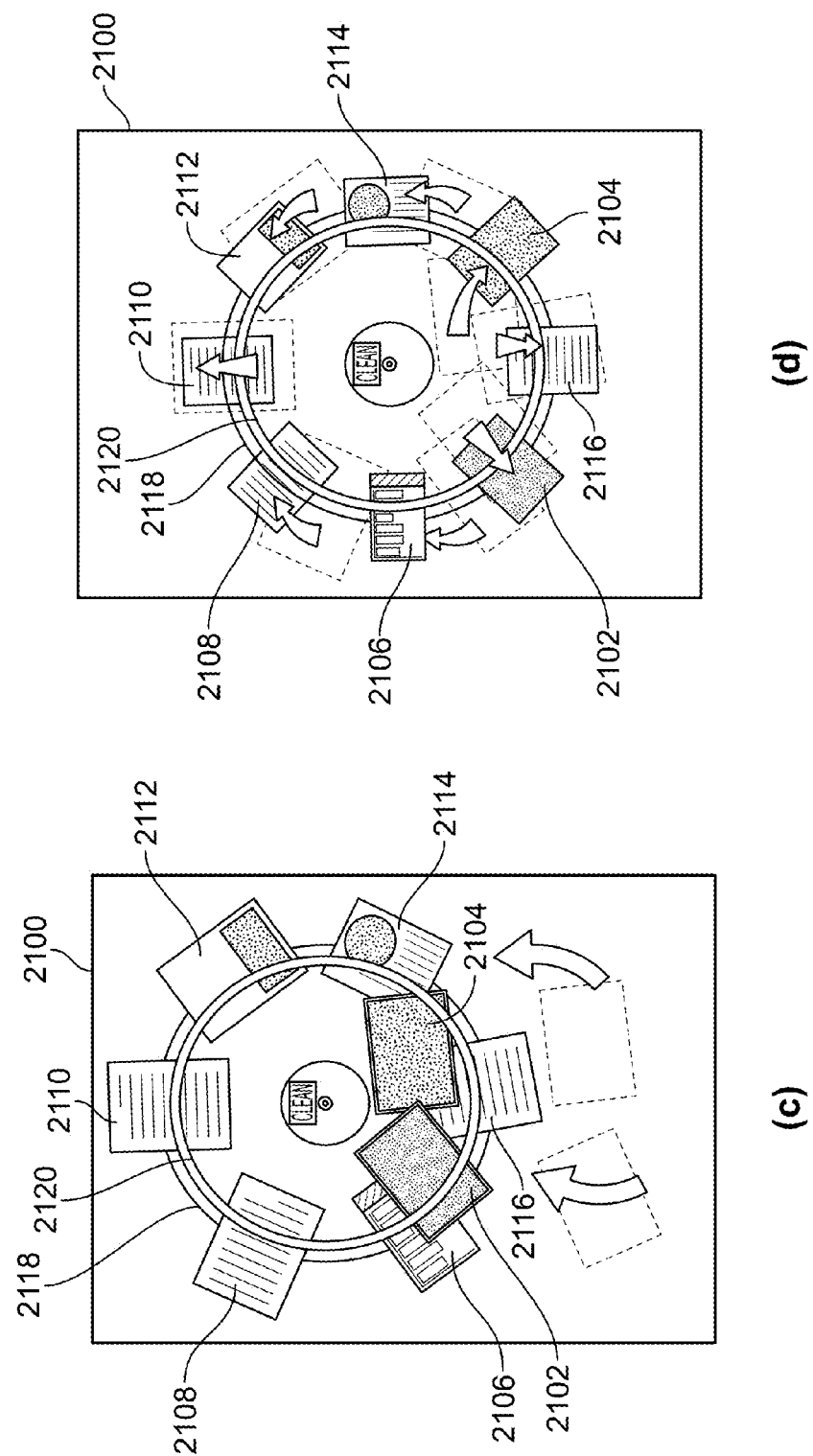

FIG. 21 illustrates a multi-touch display device providing controls for organizing objects attached to an organizational tool.

As illustrated in FIG. 21(a), organizational tool 2118 is operating in a free ("messy") attachment mode such that the multi-touch display device 2100 preserves the angular orientation of objects upon attaching the objects to the organizational tool 2118 and such that the objects are attached to the organizational tool 2118 at the positions occupied by the objects at the points in time when the multi-touch display device 2100 determines to attach the objects to the organizational tool. Multi-touch display device 2100 may display a button to indicate in which attachment mode organizational tool 2118 is operating. Thus, in FIG. 21(a), multi-touch display device 2100 displays a "Messy" button in the center of organizational tool 2118. In the event that the user eventually wishes to organize the objects that were attached in the free attachment mode, the organizational tool 2118 provides a control to toggle the organizational tool 2118 into an organized ("clean") attachment mode.

FIG. 21(b) illustrates a possible result of a transition from a free attachment mode to an organized attachment mode. Thus, upon detecting an input from a user indicating a request to implement organized attachment mode, organizational tool 2118 is partitioned into sections (similar in this example to pie slices of organizational tool 2118) to accommodate objects 2106, 2108, 2110, 2112, 2114, and 2116. Furthermore, each object is assigned to the section closest to where it was originally attached in the free attachment mode, and is reoriented such that it is consistent with a corresponding radial axis of organizational tool 2118 (similar to the reorientation discussed above with regard to FIGS. 19(a)-19(c)). While operating organizational tool 2118 in organized mode, multi-touch display device 2100 may display a "Clean" button in the center of organizational tool 2118.

Furthermore, in FIG. 21(b), a user is engaging the surface of multi-touch display device 2100 with fingers 2126 and 2128 at points corresponding to objects 2102 and 2104, respectively, and drags fingers 2126 and 2128 to points where objects 2102 and 2104 overlap organizational tool 2118. Multi-touch display device 2100 detects the input of fingers 2126 and 2128, associates the detected inputs with objects 2102 and 2104, respectively, and continues to update the position of objects 2102 and 2104 with respect to the detected inputs. The user disengages fingers 2126 and 2128 at the point where objects 2102 and 2104 multi-touch display device 2100 displays the objects 2102 and 2104 as shown in FIG. 21(c).

Multi-touch display device 2100 detects the disengagement of fingers 2126 and 2128, and determines that objects 2102 and 2104 should be attached to organizational tool 2118. In order to attach objects 2102 and 2104 to organizational tool 2118 in organized mode, however, multi-touch display device 2100 rearranges the already attached objects 2102, 2104, 2106, 2108, 2110, 2112, 2114, and 2116. To do so, multi-touch display device 2100 first resizes all attached objects 2102, 2104, 2106, 2108, 2110, 2112, 2114, and 2116 so that they may be evenly spaced along the outer circumference of organizational tool 2118. Objects that are engaged by user 2124 may be given priority to the position at which they are moved, and all other objects are moved to the next nearest available position. Thus, in FIG. 21(d), multi-touch display device 2100 gives positional priority to objects 2102 and 2104 with regard to the point at which they are disengaged, respectively. Multi-touch display device 2100 shifts objects 2106, 2108, 2110, 2112, 2114, and 2116, which were already attached to organizational tool 2118 and were not engaged by the user, to the next closest position that is available around the circumference. Finally, multi-touch display device 2100 reorients each attached object such that each object is consistent with a corresponding radial axis of organizational tool 2118.

The described systems, methods, and techniques may be implemented in digital electronic circuitry, computer hardware, firmware, software, or in combinations of these elements. Apparatuses embodying these techniques may include appropriate input and output devices, a computer processor, and a tangible computer-readable storage medium on which a computer program or other computer-readable instructions are stored for execution by one or more processing devices (e.g., a programmable processor).

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

Multi-touch display devices encompass a wide variety of display devices and associated systems and components. Some multi-touch display devices require physical contact with a surface of the multi-touch display device in order to receive input. For example, such a multi-touch display device may receive input by detecting contact with a surface of the multi-touch display device by a finger, a stylus, some other mechanical, electro-mechanical, or magnetic input mechanism and/or any combination of multiple such input mechanisms at the same time. Furthermore, some such multi-touch display devices may be configured such that the surface that receives input may appear to be the same surface on which the multi-touch display device displays objects (whether or not the surface that receives input actually is the same surface as the surface on which the multi-touch display device displays objects). Alternatively, other such multi-touch display devices may receive input on a surface that is clearly remote and distinct from the surface on which the multi-touch display device displays objects. One example of such a multi-touch display system is a multi-point input capable standalone tablet that provides input to a remote and distinct display.

Other multi-touch display devices do not require physical contact with the surface of the multi-touch display device in order to receive input. For example, such multi-touch display devices may receive input by detecting the presence of a finger, a stylus, some other mechanical, electro-mechanical, or magnetic input mechanism and/or any combination of multiple such input mechanisms in the vicinity of the surface of the multi-touch display device even when such input mechanisms are not in physical contact with the surface of the multi-touch display device.

Furthermore, the various different transformations and annotations disclosed herein may be implemented by any other type of multi-point computing system configured to receive multiple inputs at the same, including, for example, systems configured to receive concurrent input from multiple pointing devices (e.g., multiple computer mice) and/or concurrent input from one or more pointing devices and another input device (e.g., a keyboard). Moreover, some of the various different transformations and annotations disclosed herein are not limited to implementation on a multi-touch device and thus may be implemented on a single-point device.

Various modifications may be made. For example, useful results still may be achieved if steps of the disclosed techniques are performed in a different order. Moreover, useful results may be achieved by combining various steps or components of the various disclosed techniques in a different manner and/or if components of the disclosed systems are combined in a different manner and/or replaced or supplemented by other components.

What is claimed is:

1. On a multi-input display device, a computer implemented method comprising:
    attaching each object of a set of objects to a corresponding position along a one dimensional extent of a target element such that transformations applied to the target element also are applied to the set of objects, the set of objects being attached to a common attachment strip of the target element;
    displaying, within an area of a display of the multi-input display device, a portion of the target element that includes less than all of the one-dimensional extent of the target element, a subset of the set of objects being attached to corresponding positions along the one-dimensional extent of the target element that fall within the portion of the target element, and not displaying in the area one or more objects not included within the subset of the set of objects;
    displaying a representation of a region of the target element that extends beyond the portion displayed in the area, the representation depicting the corresponding position of at least one of the one or more objects not included within the subset of the set of objects along the one-dimensional extent of the target element, the representation identifying both the portion of the target element that is displayed and the subset of objects that are displayed as a consequence of displaying the portion of the target element.

2. The method of claim 1, wherein the representation of the region of the target element that extends beyond the portion displayed in the area is displayed in a representation area of the multi-input display device that is smaller than the area of the display device for displaying the portion of the target element.

3. The method of claim 2, further comprising:
    associating the representation of the region of the target element that extends beyond the portion displayed in the area with the portion of the target element such that the representation of the region of the target element is relocated when the portion of the target element is relocated;
    detecting user interaction with the portion of the target element for relocating the portion of the target element;
    in response to detecting the user interaction with the portion of the target element for relocating the portion of the target element, relocating the portion of the target element to a different position on the multi-input display device;
    in response to relocating the portion of the target element to the different position, relocating each object of the subset of the set of objects to a corresponding different position on the multi-input display device; and
    in response to relocating the portion of the target element and relocating the subset of the set of objects, relocating the representation of the region of the target element to a corresponding new position on the multi-input display device.

4. The method of claim 2 further comprising:
    associating the representation of the region of the target element that extends beyond the portion displayed in the area and the portion of the target element such that the representation of the region of the target element is correspondingly rotated when the portion of the target element is rotated;

detecting user interaction with the portion of the target element for rotating the portion of the target element;

in response to detecting the user interaction with the portion of the target element for rotating the portion of the target element, rotating the portion of the target element on the multi-input display device; and in response to rotating the portion of the target element on the multi-input display device, correspondingly rotating the representation of the region of the target element.

5. The method of claim 2 further comprising:

detecting user interaction with the portion of the target element for translating the target element and the subset of the set of objects;

in response to detecting the user interaction with the portion of the target element for translating the target element and the subset of the set of objects, translating the target element and the subset of the set of objects within the area of the display of the multi-input display device such that a different portion of the target element and a different subset of the set of objects each associated with a corresponding position along the different portion of the target element are displayed within the area of the display of the multi-input display device; and in response to translating the target element and the subset of the set of objects, updating the representation of the region of the target element to identify both the different portion of the target element and the different subset of the set of objects that are displayed as a consequence of displaying the different portion of the target element.

6. The method of claim 2 further comprising:

detecting user interaction with the portion of the target element for decreasing a scale of the portion of the target element;

in response to detecting the user interaction with portion of the target element for decreasing the scale of the portion of the target element, decreasing the scale of the portion of the target element within the area of the display of the multi-input display device such that a larger portion of the target element and a different subset of the set of objects each associated with a corresponding position along the larger portion of the target element are displayed within the area of the display of the multi-input display device; and in response to decreasing the scale of the portion of the target element, updating the representation of the region of the target element to identify the larger portion of the target element and the different subset of the set of objects displayed within the area of the display of the multi-input display device.

7. The method of claim 2 further comprising:

detecting user interaction with the portion of the target element for increasing a scale of the portion of the target element;

in response to detecting the user interaction with the portion of the target element for increasing the scale of the portion of the target element, increasing the scale of the portion of the target element within the area of the display of the multi-input display device such that a smaller portion of the target element and a different subset of the set of objects each associated with a corresponding position along the smaller portion of the target element are displayed within the area of the display of the multi-input display device; and in response to increasing the scale of the portion of the target element within the area of the multi-input display device, updating the representation of the region of the target element to identify the smaller portion of the target element and the different subset of the set of objects displayed within the area of the display of the multi-input display device.

8. The method of claim 1, further comprising:

detecting that an input mechanism has engaged a particular one of the objects of the subset of the set of objects that fall within the portion of the target element; and in response to detecting that the input mechanism has engaged the particular object, updating the representation of the region of the target element to visually distinguish a representation of the particular object from respective representations of the other objects of the set of objects to reflect that the particular object has been engaged by the input mechanism.

9. The method of claim 1, further comprising:

displaying a new object on the multi-input display device;

detecting that an input mechanism has engaged the new object;

in response to detecting that the input mechanism has engaged the new object, monitoring movement of the input mechanism while the input mechanism remains engaged with the new object;

transforming the new object as a function of the monitored movement of the input mechanism while the input mechanism remains engaged with the new object;

after transforming the new object, detecting that the input mechanism has disengaged the new object;

in response to detecting that the input mechanism has disengaged the new object and as a consequence of transforming the new object, determining that at least a portion of the new object is overlapping the portion of the target element;

in response to determining that the at least portion of the new object is overlapping the portion of the target element, attaching the new object to a corresponding position on the target element that is overlapped by the new object such that transformations applied to the target element also are applied to the new object; and in response to attaching the new object and to corresponding position on the target element that is overlapped by the new object, updating the representation of the region of the target element to visually distinguish a representation of the new object from respective representations of the other objects of the set of objects to reflect that a relationship between the new object and the target element has been newly established.

10. The method of claim 1, further comprising:

detecting that an input mechanism has engaged a particular one of the objects of the set of objects;

in response to detecting that the particular object has been engaged by the input mechanism, determining whether future movements by the input mechanism while the input mechanism remains engaged with the particular object are to terminate a relationship between the particular object and a corresponding position on the target element;

determining that future movements by the input mechanism are to terminate the relationship between the particular object and the corresponding position on the target element;

detecting movement of the input mechanism while the input mechanism remains engaged with the particular object;

terminating the relationship between the target element and the particular object such that the relationship between the particular object and the corresponding position on the target element is no longer maintained when transformations are applied to the target element; and in response to terminating the relationship between the target element and the particular object, updating the representation of the region of the target element to visually distinguish a representation of the particular object from respective representations of the other objects of the set of objects to reflect that the relationship between the particular object and the target element has been newly terminated.

* * * * *